US006890181B2

(12) United States Patent
Warneke et al.

(10) Patent No.: US 6,890,181 B2
(45) Date of Patent: May 10, 2005

(54) METHODS AND SYSTEMS FOR MULTIMEDIA EDUCATION

(75) Inventors: Fred Warneke, St. Paul, MN (US); Tristan Warneke, St. Paul, MN (US); Tom Shaff, St. Paul, MN (US); Jeff Johnston, St. Paul, MN (US); Noah Bratzel, St. Paul, MN (US); Avis Gustason, St. Paul, MN (US); Becky Tschida, St. Paul, MN (US); John Manning, New Brighton, MN (US); Bill Sterling, deceased, late of St. Paul, MN (US); by Dawn Sterling, legal representative, St. Paul, MN (US)

(73) Assignee: Indivisual Learning, Inc., St. Paul, MN (US)

( * ) Notice: Subject to any disclaimer, the term of this patent is extended or adjusted under 35 U.S.C. 154(b) by 0 days.

(21) Appl. No.: 10/192,831

(22) Filed: Jul. 10, 2002

(65) Prior Publication Data

US 2003/0027112 A1 Feb. 6, 2003

Related U.S. Application Data

(63) Continuation of application No. PCT/US01/01279, filed on Jan. 12, 2001.
(60) Provisional application No. 60/175,750, filed on Jan. 12, 2000.

(51) Int. Cl.[7] .............................................. G09B 19/00
(52) U.S. Cl. ...................................... 434/167; 434/156
(58) Field of Search ................................ 434/167, 156, 434/157, 236, 178

(56) References Cited

U.S. PATENT DOCUMENTS

| 3,605,284 | A | | 9/1971 | Kay | |
|---|---|---|---|---|---|
| 3,885,326 | A | | 5/1975 | Robinson et al. | |
| 4,247,995 | A | * | 2/1981 | Heinberg | 434/185 |
| 5,256,067 | A | * | 10/1993 | Gildea et al. | 434/169 X |
| 5,297,801 | A | * | 3/1994 | Croker | 273/430 X |
| 5,405,150 | A | * | 4/1995 | Loder | 273/430 X |
| 5,492,473 | A | * | 2/1996 | Shea | 434/156 X |
| 5,727,950 | A | * | 3/1998 | Cook et al. | 434/350 |
| 5,788,502 | A | * | 8/1998 | Shea | 434/157 X |
| 5,813,863 | A | * | 9/1998 | Sloane et al. | 434/236 X |
| 5,820,386 | A | * | 10/1998 | Sheppard, II | 434/322 X |
| 5,836,771 | A | * | 11/1998 | Ho et al. | 434/362 X |
| 6,120,297 | A | * | 9/2000 | Morse, III et al. | 434/169 X |
| 6,190,178 | B1 | | 2/2001 | Oh | 434/323 |
| 6,299,452 | B1 | * | 10/2001 | Wasowicz et al. | 434/178 X |
| 6,343,935 | B1 | * | 2/2002 | Clements | 434/156 |
| 6,461,166 | B1 | * | 10/2002 | Berman | 434/323 |
| 6,554,617 | B1 | * | 4/2003 | Dolan | 434/169 |

FOREIGN PATENT DOCUMENTS

GB      2321120      7/1998  ........... G06F/17/00

OTHER PUBLICATIONS

EP Search Report for App. No. 01 942463,9–2221 (Mar. 30, 2004), 9 pgs.
* cited by examiner Primary Examiner—Jessica Harrison
Assistant Examiner—Chanda L. Harris
(74) Attorney, Agent, or Firm—Schwegman, Lundberg, Woessner & Kluth, P.A.

(57) ABSTRACT

Methods and systems for delivering multimedia learning modules to one or more students in a computer based education environment. The multimedia education system includes a host server, communication link connecting the host server to a remote computer, and software operable on the host server and remote computer. Methods include providing: a set of global knowledge/vocabulary words with high interest expository text and graphics; a contextual definition for at least one of the words; or an additional set of vocabulary words presented as a pair of synonyms for a new stimulus word. A method includes causing a student to select an appropriate synonym to replace the stimulus word based on another high interest expository text. A method includes providing a game scenario including a multisensory scenario, wherein the student must select an appropriate synonym or a pair of synonyms from a number of synonyms to complete a task in a game.

44 Claims, 78 Drawing Sheets

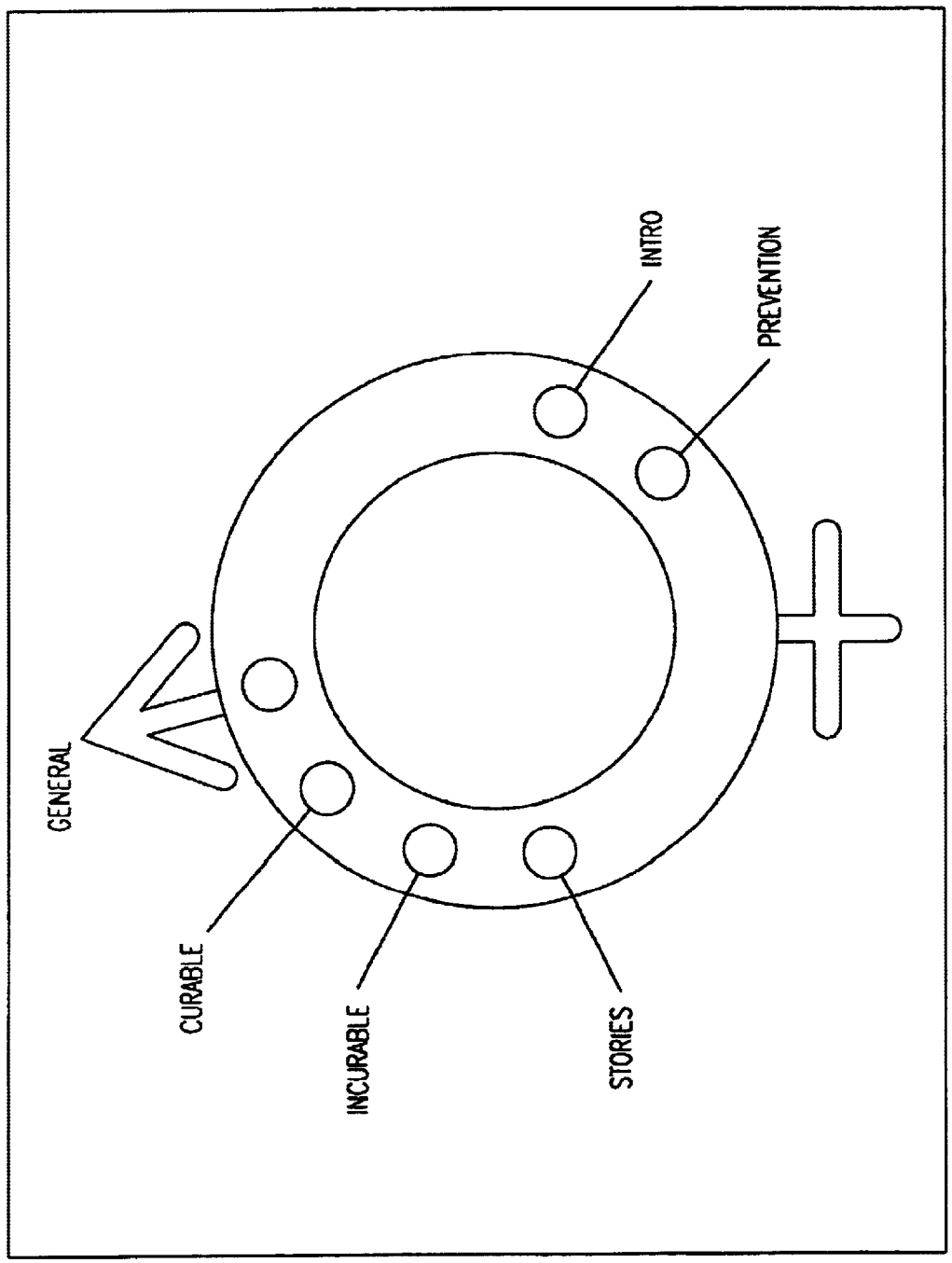

GENERAL INTRO

GENERAL INTRO

SEXUALLY TRANSMITTED DISEASES ARE AMONG THE MOST COMMON INFECTIOUS DISEASES IN AMERICA TODAY.

GENERAL INTRO

CAUSES
NOT CAUSES
WHY LEARN

SEXUALLY TRANSMITTED DISEASES, OR STDs, USED TO BE KNOW AS VENEREAL DISEASES, OR VD. THE NAME IS FROM VENUS, THE GREEK GODDESS OF LOVE. ALL IRONY ASIDE, THE TERM APPLIED MAINLY TO GONORRHEA AND SYPHILIS, THE TWO MOST WELL KNOWN VENEREAL DISEASES UP UNTIL THE LATE 1970's. IN POPULAR IMAGINATION AN DEFINED VD. IT HAD EVERY THING: A LONG HISTORY, INSIDIOUS EFFECTS, A NOTORIOUS REPUTATION. THERE WERE FAMOUS CASES LIKE THE GANGSTER AL CAPONE; HIS BRAIN FRIED BY UNTREATED SYPHILIS, UNTIL PENICILLIN WAS AVAILABLE IN THE 1940s THERE WAS NO CURE.
SINCE THE EARLY 1908s, AIDS HAS MADE HEADLINES, THE IMAGE OF A DODDERING GANGSTER WAS REPLACED BY AN IMAGE OF A HANDSOME GAY YOUNG MAN WITHERING AWAY—A VICTIM OF AN... ONE STEREOTYPE SIMPLY REPLACED ANOTHER. VD BECAME STD.

MORE

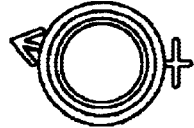

FIG. 5N

GENERAL INTRO

CAUSES
NOT CAUSES
WHY LEARN

SEXUALLY TRANSMITTED DISEASES, OR STDs, USED TO BE KNOW AS VENEREAL DISEASES, OR VD. THE NAME IS FROM VENUS, THE GREEK GODDESS OF LOVE. ALL IRONY ASIDE, THE TERM APPLIED MAINLY TO GONORRHES AND SYPHILIS, THE TWO MOST WELL KNOWN VENEREAL DISEASES UP UNTIL THE LATE 1970's. IN POPULAR IMAGINATION SYPHILIS DEFINED VD. IT HAD EVERY THING: A LONG HISTORY, INSIDIOUS EFFECTS, A NOTORIOUS REPUTATION. THERE WERE FAMOUS CASES LIKE THE GANGSTER AL CAPONE; HIS BRAIN FRIED BY UNTREADED SYPHILIS, UNTIL PENICILLIN WAS AVAILABLE IN THE 1940s THERE WAS NO CURE.
SINCE THE EARLY 1908s, AIDS HAS MADE HEADLINES, THE IMAGE OF A DODDERING GANGSTER WAS REPLACED BY AN IMAGE OF A HANDSOME GAY YOUNG MAN WITHERING AWAY—A VICTIM OF AN... ONE STEREOTYPE SIMPLY REPLACED ANOTHER. VD BECAME STD.
IN FACT, IT'S THE DISEASES YOU DON'T HEAR ABOUT THAT ARE PANDEMIC, LIKE CHLAMYDIA, THE MOST COMMON STD IN AMERICA, OR HERPES. OVER 15 MILLION PEOPLE SUFFER FROM AN STD, MAKING IT A MAJOR PUBLIC HEALTH PROBLEM. OBVIOUSLY, PEOPLE STILL ARE NOT AWARE OF THE CONSEQUENCES OF THEIR SEXUAL BEHAVIOR.

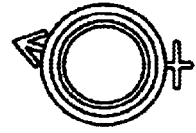

NEXT

FIG. 50

GENERAL INTRO

SO HOW DO YOU GET AN STD?
THE SIMPLE ANSWER IS: HAVE SEX WITH SOMEONE WHO HAS ONE. STDs ARE INFECTIOUS DISEASES. SO ARE COLDS AND THE FLU. STDs ARE INFECTIOUS DISEASES THAT GENERALLY ATTACK YOUR GENITOURINARY SYSTEM.

CAUSES

MORE

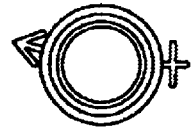

GENITOURINARY SYSTEM

GENITOURINARY IS A TERM APPLIED TO THE REGIONS OF YOUR BODY WHERE YOUR SEXUAL ORGANS AND WASTE ELIMINATION ORGANS ARE FOUND. IN FEMALES THIS INCLUDES YOUR OVARIES, FALLOPIAN TUBES, UTERUS, CERVIX, VAGINA, BLADDER, URETHRA, CLITORIS, LABIA, RECTUM, AND ANUS. IN MALES IT INCLUDES THE PENIS, TESTES, PROSTATE, BLADDER, URETHRA, RECTUM AND ANUS. IT INCLUDES THE NERVES, SKIN AND MEMBRANES OF THOS AREAS, TOO.

FIG. 5R

GENERAL PREVENTION

WE ARE WIRED FOR SEX TO REPRODUCE. LEARNING HOW TO HANDLE THIS STRONG BIOLOGICAL URGE IS NO SMALL MATTER.

METHODS AND SYSTEMS FOR MULTIMEDIA EDUCATION

RELATED APPLICATIONS

This application is a continuation under 35 U.S.C. 111(a) from International Application No. PCT/US01/01279, filed Jan. 12, 2001 and published in English as WO 01/52219 A2 on Jul. 19, 2001 which claimed priority from U.S. Provisional Application Ser. No. 60/175,750, filed Jan. 12, 2000, now abandoned, which applications are incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software, data and screen captures as described below and in the drawings attached hereto: Copyright© 2000, Indivisual Learning, Inc. All Rights Reserved.

TECHNICAL FIELD

The present system relates generally to multimedia education, and particularly, but not by way of limitation, to methods and systems for delivering multimedia learning modules to one or more students in a computer based education environment.

BACKGROUND

There are an estimated fifty-two million students in sixteen thousand school districts attending class at approximately ninety-one thousand school campuses. It is projected that this population of students will continue to grow over the next ten years by an additional ten percent.

During this same 10-year period the government is projecting the retirement of up to 25 percent of the present teacher population. There will not be enough new teachers trained during this time to replace the amount of teachers that are retiring. Even more teachers will be needed because of the increasing number of students being added to our school systems. In addition, there is demand for a substantial amount of new teachers to reduce the present class sizes in grades K–3.

The federal government has identified up to forty percent of these fifty-two million students as children that are at risk of completing the 12th grade without being able to demonstrate competencies in Reading, Writing, and Math. In Minnesota, where basic skill testing has become a requirement, the inner city schools have as many as sixty percent of their student population incapable of passing fifth grade Reading, Writing, and Math tests.

These test results have schools under a significant amount of criticism because they have not found solutions to this at-risk student problem. In addition, the schools are being criticized for not being able to accommodate the gifted and talented students that require accelerated stimulation. Federal laws require that all students are to be main-streamed in the regular classroom. This means that in any given classroom the children's skills range from those who are gifted and talented to those who are classified as Special-Ed students. Also, many classrooms include children where English is their second language.

Teachers are being placed in a very uncomfortable position and one that they have never been in before. Parents are expecting them to develop and implement Individualized Student Learning Plans. At the present time, with class sizes ranging from seventeen to twenty-six students, there aren't enough tools, programs, or classroom time available for the teacher to meet parent expectations for their children's educational experience. One solution would be to dramatically reduce the student teacher ratio to no more than twelve students per teacher. This solution would be financially unacceptable to the American taxpayer.

Federal, state and local governments have invested billions and billions of dollars in technology infrastructure in schools. This infrastructure includes computers, Internet, Intranets, fiberoptics, cable TV, telephone systems, and satellite TV systems.

Another market area is the home school market. This is the fastest growing segment of the K–12 educational system. There are presently over one million seven hundred thousand children being home schooled according to current federal statistics. This group of students is growing at a rate of over 15 percent a year.

A third market is selling directly to the parents. An Internet marketing strategy will be developed for this group of potential customers that is different from the one needed to sell to school systems.

There are a number of companies offering a wide variety of so-called educational products ranging from CD-ROMS, electronic flash cards, games, children's toys sold at retail outlets to the more expensive computer based training programs. None of them have the combination of educational rigor, Internet delivery, simplicity of user interface, minimal in-service training of the teacher or administrator, data based reporting and monitoring at the price that our programs offer.

Textbook publishers have been adding computerized accessories to their product lines. However, they are nothing more than either the textbook itself on CD-ROM or resource material in support of their own textbooks.

There are several companies, such as Computer Curriculum Corporation and TRO-Learning (Plato Systems), who sell expensive computer based training programs to the schools. These programs require the school to purchase dedicated hardware and computers, to do extensive in-service training of the teachers and to maintain a trained specialist at each school. Regular and expensive software updates become a major issue for school's using these programs. These programs typically require a minimum investment of between fifty thousand to one hundred thousand dollars per school.

There has been significant growth in private tutoring of students both in national companies such as Sylvan Learning and in locally owned and managed tutoring businesses. Private tutoring is expensive with per hour costs ranging up to fifty dollars per hour. These tutoring services expect a minimum of one hundred and twenty hours worth of instruction in between initial assessment and interim assessment of the child. This means the parents are required to make a significant financial investment before the tutoring service is willing to evaluate their own effectiveness. Only parents that can afford this investment can take advantage of private tutoring. Most of the children that are classified in the at risk category come from families that are living at or below the poverty levels and cannot afford private tutoring.

In addition, schools cannot afford to pay for the costs of private tutoring. The bulk of the student population needing additional help the most does not receive this private tutoring option. Schools cannot afford to hire educational assistants if qualified ones are even available.

All of the most recent discussions, debates and programs being pursued at the state and federal government levels dealing with the at-risk student population problem will direct schools to look for the types of solutions that are offered by the methodology described herein.

SUMMARY OF THE INVENTION

The above mentioned problems associated with traditional instructional systems and methods, as well as other problems, are addressed by the present subject matter and will be understood by reading and studying the following specification. The present subject matter provides for a system and method for delivering multimedia learning modules to one or more students in a computer based education environment.

In one embodiment of the present invention a method for providing interactive multimedia instruction is provided. The method includes providing a set of global knowledge/vocabulary words together with a high interest expository text and graphics. A contextual definition is then provided for at least one of the global knowledge/vocabulary words. An additional set of vocabulary words presented as a pair of synonyms for a new stimulus word are next provided. The method further includes causing a student to select an appropriate synonym to replace the stimulus word based on another high interest expository text. A game scenario, including a multisensory scenario, is then provided in which the student must select an appropriate synonym or a pair of synonyms from a number of synonyms to complete a task or solve a problem to complete a game.

These and other aspects, embodiments, advantages, and features will become apparent from the following description of the invention and the referenced drawings.

DESCRIPTION

The various embodiments of the invention relate to interactive multimedia educational computer programs, or learning modules, to provide developmental and accelerated learning for schools, industry, and the general public. The programs are delivered to the student's desktop through a variety of channels, one of which is via the Internet.

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
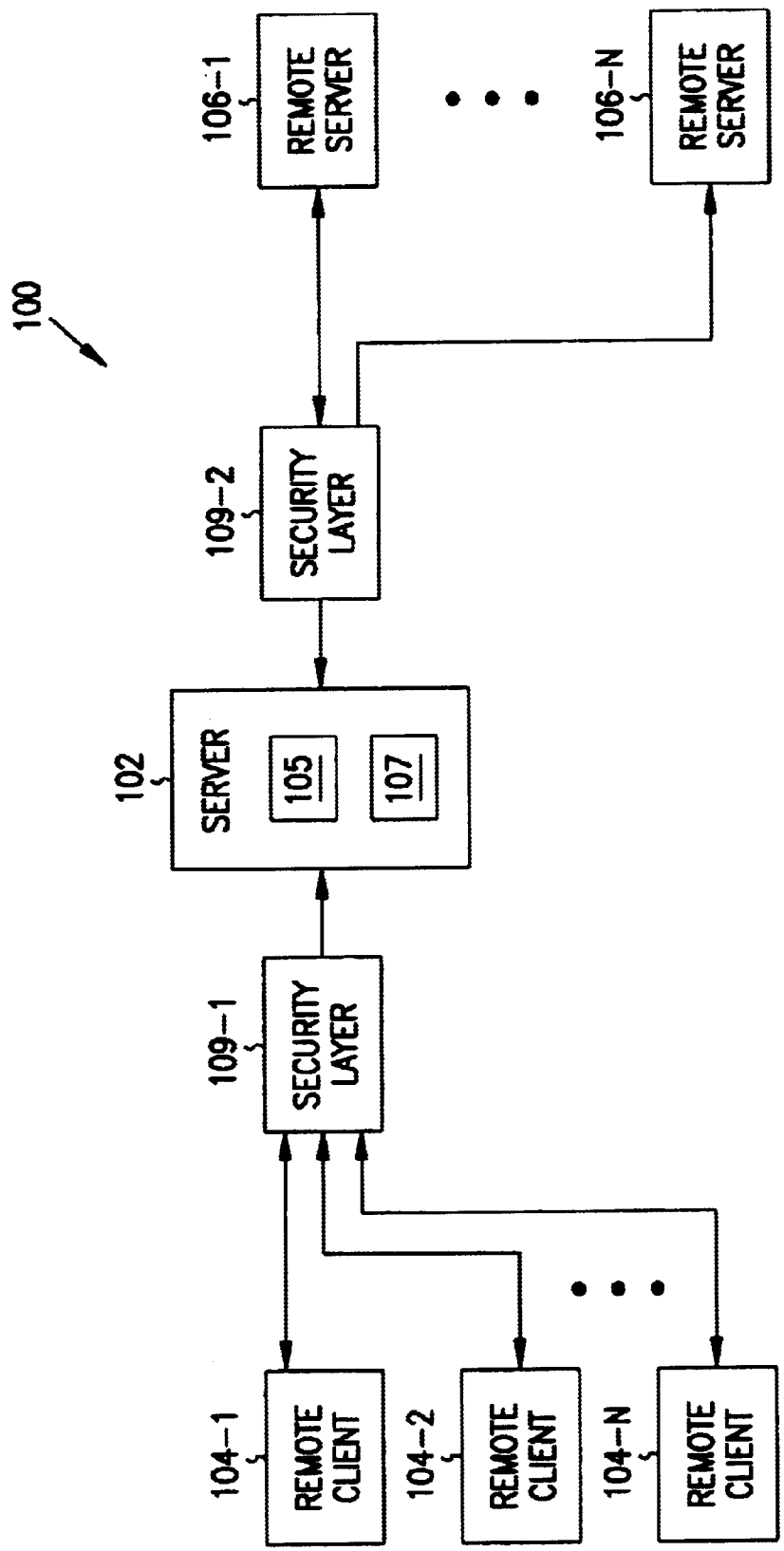
FIG. 1 is an illustration of an embodiment of a system according to the teachings of the present invention.

FIG. 1 is an illustration of a system 100 according to the teachings of the present invention. The system 100 can include an Internet network system 100. In FIG. 1, the system 100 includes a server 102. Server 102 includes a processor 105 coupled to a data storage device 107. The system 100 further includes a number of remote clients 104-1, 104-2, . . . , 104-N each including a client program, or software means, which is operatively or communicatively coupled to the server 102. In one embodiment, one or any number of remote clients 104-1, 104-2, . . . , 104-N are coupled to the server 102 over a local area network (LAN), e.g. an Ethernet network. In an alternative embodiment, one or any number of remote clients 104-1, 104-2, . . . , 104-N are coupled to the server 102 over a wide area network (WAN). Also, one or any number of remote clients 104-1, 104-2, . . . , 104-N can be coupled to the server 102 over the public switched telephone network (PSTN) and/or the Internet. In one embodiment, by way of example and not by way of limitation, the number of remote clients 104-1, 104-2, . . . , 104-N can communicate with one another and the server 102 using transmission control protocol/Internet protocol (TCP/IP).

As one of ordinary skill in the art will understand upon reading this disclosure, the core databases accessible by the server 102 will facilitate cooperative database delivering instructional lesson plans. In other words, the system and methods of the present invention will facilitate the interactive instructional lessons described in more detail below.

In one embodiment, the additional servers and systems 106-1, . . . , 106-N include proprietary databases and data modules. In one embodiment, the additional servers and systems 106-1, . . . , 106-N are similarly coupled to the server 102 through a second security layer 109-2, or secure data network 109-2. In one embodiment, the additional servers and systems 106-1, . . . , 106-N are coupled to the server 102 over a local area network (LAN), e.g. an Ethernet network. In an alternative embodiment, the additional servers and systems 106-1, . . . , 106-N are coupled to the server 102 over a wide area network (WAN). Also the additional servers and systems 106-1, . . . , 106-N can be coupled to the server 102 over the public switched telephone network (PSTN) and/or the Internet.

According to the teachings of the present invention the proprietary databases and data modules contain information on student users and lesson plans. The database structure, therefore, creates the opportunity for interactive instruction via the Internet. Unlike traditional instructional medium, the present invention offers a rich interactive text, which holds a student's attention and tracks their progress.

The server 102 can be coupled to the remote client 104 and the additional servers and systems 106-1, . . . , 106-N in a direct hardwired fashion, e.g. hybrid fiber-coax connection and/or indirectly in a wireless fashion using remote electromagnetic signal transmission in the radio or microwave frequencies. In FIG. 1, the server 102, the remote client 104, and the additional servers and systems 106-1, . . . , 106-N all include computer readable medium having computer-executable instructions. These computer readable medium include such devices as a disk drive for reading data storage media, e.g. a compact disc and/or computer readable medium such as random access memory (RAM) and read only memory (ROM). Similarly, the server 102, the remote client 104, and the additional servers and systems 106-1, ..., 106-N can all include processor capabilities coupled to a data storage device.

Figure 2:
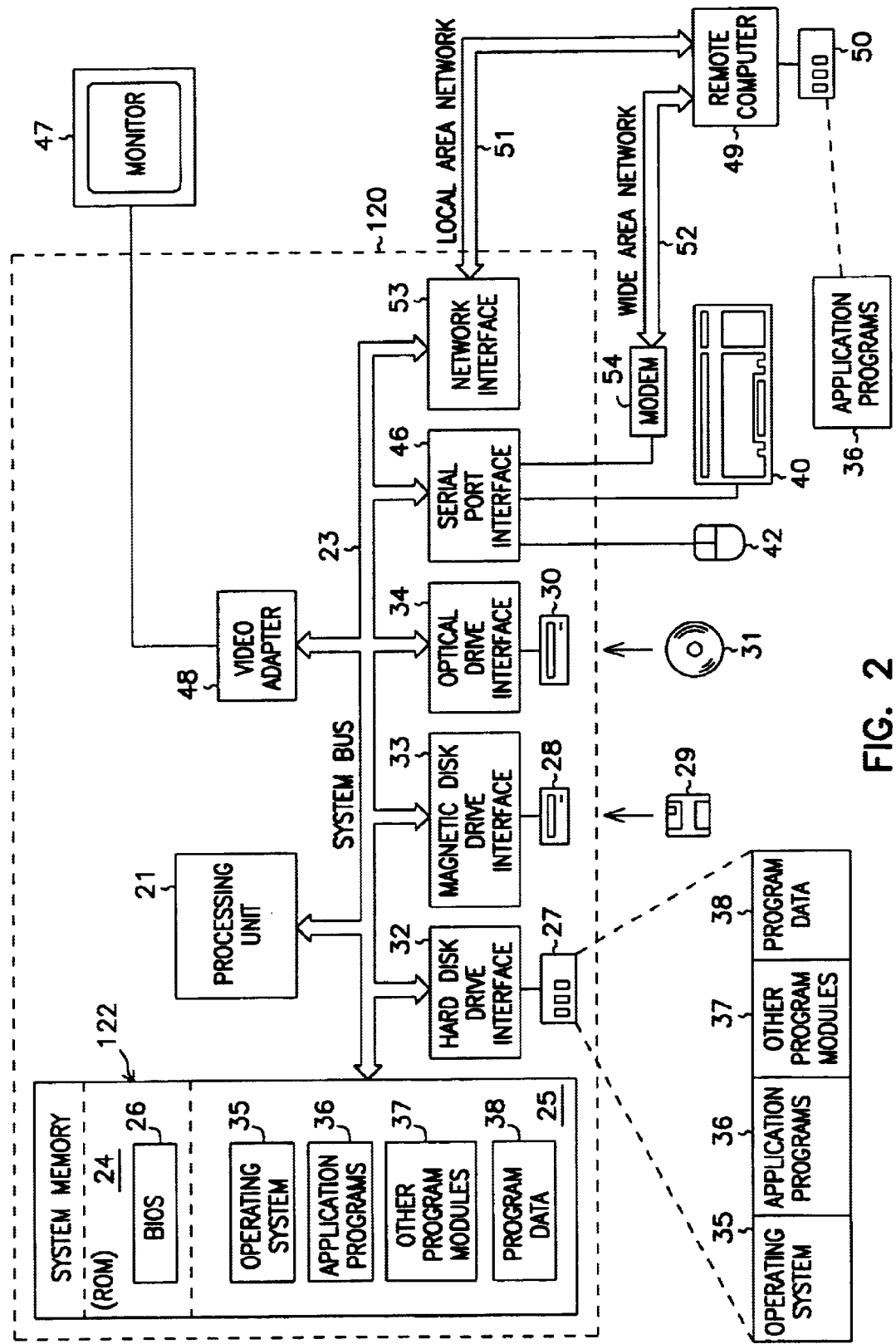
FIG. 2 is a diagram of an embodiment of a hardware and operating environment in conjunction with which the invention may be practiced.

FIG. 2 is a diagram of a hardware and operating environment in conjunction with which embodiments of the invention may be practiced for the server clusters, one or any number of remote clients 104-1, 104-2, ..., 104-N, and the additional servers and systems 106-1, ..., 106-N from FIG. 1. The description of FIG. 2 is intended to provide a brief, general description of suitable computer hardware and a suitable computing environment in conjunction with which the invention may be implemented. The invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including multiprocessor systems, microprocessor-based or programmable consumer electronics, network PCS, minicomputers, mainframe computers, and the like. The invention may also be practiced in distributed computer environments where tasks are performed by remote processing devices that are linked through a communications network. In a distributed computing environment, program modules may be located in both local and remote memory storage devices.

In the embodiment shown in FIG. 2, the hardware and operating environment of the servers and/or the remote clients from FIG. 1 includes a general purpose computing device in the form of a personal computer 20, or a server 20, including a processing unit 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 can be any of several types of bus structures including a memory bus or memory controller, a peripheral bus, and a local bus using any of a variety of bus architectures. The system memory can also be referred to as simply the memory, and includes read only memory (ROM) 24 and random access memory (RAM) 25, a basic input/output system (BIOS) 26, containing the basic routines that help to transfer information between elements within the computer 20, or a server 20, such as during start-up, may be stored in ROM 24. The computer 20, or a server 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non-volatile storage of computer-readable instructions, data structures, program modules and other data for the computer 20, or a server 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, can be used in the exemplary operating environment.

A number of program modules can be stored on the hard disk, magnetic disk 29, optical disk 31, ROM 24, or RAM 25, including an operating system 35, one or more application programs 36, other program modules 37, and program data 38. A plug in containing a search engine for the present invention can be resident on any one or number of these computer-readable media.

A user may enter commands and information into the personal computer 20, or server 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

As explained in connection with FIG. 1, the computer 20, or server 20 may operate in a networked environment using logical connections to one or more remote computers or servers, such as remote computer 49. These logical connections are achieved by a communication device coupled to or a part of the computer 20, or server 20; the invention is not limited to a particular type of communications device. The remote computer 49 can be another computer, a server, a router, a network PC, a client, a peer device or other common network node, and typically includes many or all of the elements described above relative to the computer 20, or server 20, although only a memory storage device 50 has been illustrated in FIG. 2. The logical connections depicted in FIG. 2 include a local area network (LAN) 51 and a wide area network (WAN) 52. Such networking environments are commonplace in office networks, enterprise-wide computer networks, intranets and the Internet, which are all types of networks.

When used in a LAN-networking environment, the computer 20, or server 20, is connected to the LAN 51 through a network interface or adapter 53, which is one type of communications device. When used in a WAN-networking environment, the computer 20, or server 20, typically includes a modem 54, a type of communications device, or any other type of communications device, e.g. a wireless transceiver, for establishing communications over the wide area network 52, such as the Internet; the invention is not so limited. The modem 54, which may be internal or external, is connected to the system bus 23 via the serial port interface 46. In a networked environment, program modules depicted relative to the personal computer 20, or portions thereof, can be stored in the remote memory storage device 50 of remote computer, or server 49. It is appreciated that the network connections shown are exemplary and other means of and communications devices for establishing a communications link between the computers may be used.

The hardware and operating environment in conjunction with which embodiments of the invention may be practiced has been described. The computer 20, or server 20, in conjunction with which embodiments of the invention can be practiced can be a conventional computer, a distributed computer, or any other type of computer; the invention is not so limited. Such a computer 20, or server 20, typically includes one or more processing units as its processor, and a computer-readable medium such as a memory. The computer 20, or server 20, can also include a communications device such as a network adapter or a modem, so that it is able to communicatively couple to other computers, servers, or devices.

Figure 3A:
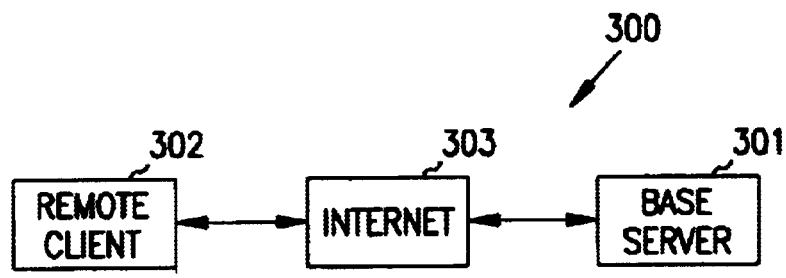
FIGS. 3A–3C are various diagram embodiments of an enlarged environment for the delivery systems of the present invention.
Figure 3B:
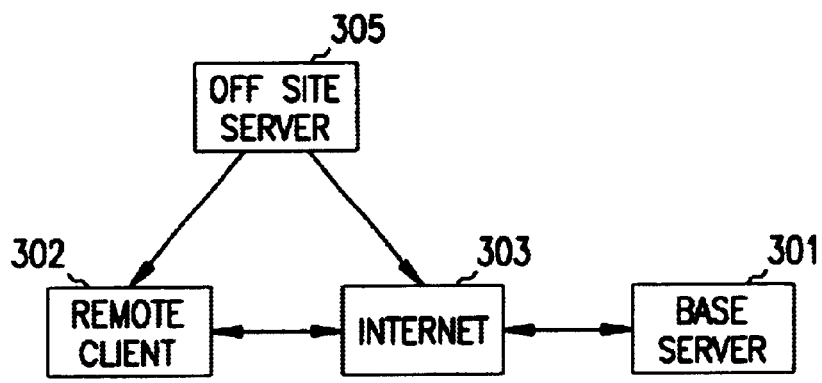
Figure 3C:
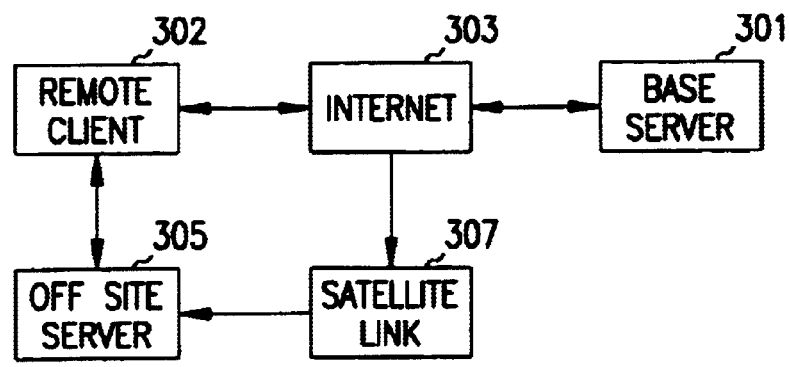

FIGS. 3A–3C illustrate various embodiments for a delivery network associated with the present invention. FIGS. 3A–3C are intended to illustrate system interactions and can include components of the operating environments presented in connection with FIGS. 1 and 2. In FIG. 3A, the system 300 includes a base server 301. According to the present invention, base server 301 is provided as an example, but not by way of limitation, for any one of the number of servers in the server clusters from FIG. 1. In particular base server 301 is described illustratively here as a representation of any one of the number of servers in the server clusters performing the functions of the present invention. As described in connection with FIG. 1, the base server 301 includes a processor coupled to a storage device as illustrated in FIG. 1. As shown in FIG. 3A, the base server is coupled to a remote client 302 via the Internet 303. The system further includes software means resident on the base server 301 and which is operative on the processor, the remote client 302 having a client program, and can be operable on additional servers and systems in a network of server clusters to perform methods according to the teachings of the present invention. The software means includes a number of software programs, including interface protocols, for carrying out the methods of the present invention. According to the teachings of the present invention, the software means includes an instructional module stored on the server clusters to present student lesson plans. Also, according to the teachings of the present invention, the software program includes a tracking module for tracking an individual student's progress and maintaining student historical data.

As shown in FIG. 3A, data can be transferred via the Internet 303 between the base server 301 and the remote client 302. In this embodiment, a remote client 302 can access the software means including student lesson programs directly from the base server 301. FIG. 3B illustrates, that in one embodiment, portions of the software means including student lesson programs can be downloaded and stored on an off-site server 305. In this embodiment, a student lesson program can be stored remotely on the off-site server 305 and the remote client 302 will access the program from the off-site server 305. One of ordinary skill in the art will appreciate that such a delivery mechanism can improve bandwidth for program delivery. FIG. 3C illustrates that in one embodiment, data can be transferred via the Internet 303 and wireless mediums, e.g. through a Satellite link 307, to download and store portions of the software means including student lesson programs on the off-site server 305. Again, the student lesson program can then be stored remotely on the off-site server 305 and the remote client 302 will access the program from the off-site server. As one of ordinary skill in the art will understand upon reading this disclosure, any particular program can be launched in cooperation with the instructional module based on a request and associated program code received from remote client 302. In one embodiment, the program codes can be received online, or via Satellite, from the remote client 302 when the remote client 302 connects with the base server 301. According to the teachings of the present invention, a number of plug-in tools can similarly be used, such as QUICKTIME® streaming media to accommodate the methods of the present invention. As mentioned above, software means includes a tracking program module. A tracking program on the tracking program module can similarly be launched and is executable on base server 301 to receive data back from the remote client's use of the student lesson programs, via the Internet 303 to record historical data and student performance.

The software programs according to the teachings of the present invention will be executing on system 300. As one of ordinary skill in the art will understand upon reading this disclosure, the software means can be resident on the base server 301, or alternatively, the software means can be resident on any number of the storage devices, e.g. computer readable medium, coupled in system 300.

One example of an operational embodiment of the present invention is as follows. A student initiates a session with a program by using resident software, e.g. a web browser, on the remote client 302 to connect with a website on the base server 301. Upon entering a user name and other indentification data, a database connected to the website returns a server IP address, such as off-site server 305, where the content of the program can be found local to the student. The web browser then streams the contents of the program from the local server 305. All data that is gathered about the student's use, e.g. progress and performance, of a student lesson plan, according to the teachings of the present invention, is written back over the Internet 303 to the base server 301 and gathered in a database.

Previous to all of this, the program content can be cached at the local server whether the local server is a satellite receiver, or an off-site server 305. In the case of the off-site server 305, the off-site server 305 will, at a predetermined time, connect to the website and pull the content over the Internet 303. In the case of the satellite receiver, the base server 301 will upload the content to the satellite provider and the satellite provider will in turn broadcast the content to all of the satellite receivers at once, without traversing the Internet at large.

One of ordinary skill in the art will understand the manner in which a software program can be launched from a computer readable medium in a computer-based system to execute the functions defined in the software program. One of ordinary skill in the art will further understand the various programming languages which may be employed to create a software program designed to implement and perform the methods of the present invention. In one embodiment, much of the application software is implemented using object-oriented programming, hyper-text mark-up language (HTML) and the like. However, the teachings of the present invention are not limited to a system using object oriented programming and no embodiment of the invention is limited to a particular programming language or environment.

The systems described above are operable for implementing any of the instructional software programs of the present invention. The software programs present novel interactive instruction methods to remote student users as the same is described in more detail below.

Two instructional embodiments that are described in detail herein include learning modules for the subjects of Reading and Sexually Transmitted Diseases. It will be apparent that the methods described herein with reference to the foregoing subjects can be extended to a variety of other subjects, including Math, Algebra, Science, and Writing programs. The programs are adapted to any learning level, with particular emphasis on the range of third grade to young adults. Tests in an inner-city K–5 School, in which 73 percent of the students are classified as living in poverty, have shown a two-fold increase in reading improvement for students receiving the Reading program described herein over students not receiving the Reading program.

The programs are developed with the philosophy that reading comprehension is the basis of all academic success. If a student cannot read then how do they build additional skills necessary to do math, writing or any other subject in the classroom? Therefore, when designing all of the programs, the methods described herein build upon reading comprehension as well as the mastery of the specific subject matter.

Short of doubling the number of teachers, which is financially impossible, schools have been struggling to find solutions for the problem of the at-risk students. Up to now, schools have had few viable alternatives to chose from.

Part of the challenge in offering an effective alternative to teacher-led instruction is to address curriculum areas that are difficult, complex or subjective. The two example embodiments demonstrate a marriage of instructional methodologies with the need to show measurable outcomes.

Computer based tutoring programs are advantageous for several significant reasons. The first reason is to ensure the student's engagement in the lesson. The computer is generally incapable of response without input from the user. The issue of staying on task in the classroom setting is a major issue for all teachers. Also, the game industry has proven the inherent attraction that computers have to children. Even the children that test very poorly in school, can do even the most complicated games well. The computer by its very nature requires the engagement of its user.

In a classroom, the teacher has a set schedule for delivery of curriculum materials and very little leeway to either accelerate or slow that schedule to accommodate each student's learning style. The impact of a teacher's skills, expertise, and years of experience mean that delivery of curriculum can range from very good to very poor. With class sizes of up to twenty-six students or more, monitoring each one is virtually impossible. The computer is designed to monitor and record the individual's activity, and allows the student to learn at his or her own pace. Also, the computer delivers its program very consistently. Every student is assured of getting the same presentation of instructional content.

In addition, the computer cannot discriminate against the student. It has no personal feelings to influence the interactivity with the child. Teachers often have their own biases and preconceived impressions of each student. Also, today's new teachers are much more comfortable with integrating computer-based curriculum into their everyday classroom experience. Lastly, by using computer-based training, individualized tutoring of the student can be delivered in a very cost-effective manner. Personal tutoring by an instructor is often the most expensive type of instructional delivery.

The example embodiments represent two types of courseware. The first is Basic Skills courseware such as Reading, Writing, Math, and Science. The second area is Life Skills courseware such as, smoking cessation, sexually transmitted disease, and drug/alcohol abuse. The Basic Skills programs are targeted at Special Ed students needing developmental help as well as gifted and talented students looking for accelerated programs. The Life Skills programs are designed to give all students important information they need to make decisions that can affect their lives.

As one of ordinary skill in the art will understand upon reading this disclosure, the present invention provides a technical solution to the eductional field to ameliorate a number of shortcomings associated with traditional instructional methods. Thus, the present invention achieves a number of educational goals which traditional instructional methods have not been able to accomplish. In one aspect of the present invention a student's reading skills are increased through the application of specific interactive, multisensory reading exercises to build vocabulary, fluency, and comprehension. As will be understood by reading the disclosure herein, the novel programs of the present invention achieve this goal in a number of novel interactive methods. For example, in one aspect of the present invention, a program presents a synchronous pairing of auditory and visual global knowledge/vocabulary words, reading passages and high interest expository text which significantly increases a student's fluency. The interactive presentation along with high interest expository text and graphics fuels a student's enthusiasm as well as sustains the student's progress through a lesson. Further, the programs of the present invention provide reading comprehension questions which progressively evolve from strictly recall to require more complex deductive reasoning skills, e.g. true comprehension. In this manner, a student's fluency skills are greatly accelerated. These and other advantages will be evident to one of ordinary skill in the art by reading and studying the disclosure below.

Basic Skills

The programs of the present invention are individualized, self-paced, competency-based tutors delivered to the student at his or her desktop. In one embodiment, delivery is via the Internet. The programs have the rigor necessary to satisfy the needs of today's school environment. These programs continuously assess the student's progress and competencies. This allows the teacher to adapt the curriculum for children with developmental needs as well as those who require more challenging opportunities.

Reading

The first Basic Skills product is a reading fluency program. Research indicated that after the 5th grade, basic reading instruction drops off steeply. Since reading is the most important core skill, the Reading program is adapted to address this need for rigorous reading instruction. Within that general framework, the market is students who are at risk of failing, or who have failed, standardized achievement tests, such as the Minnesota Achievement Test given in the 5th grade and then repeated in the 8th grade. In addition, younger children wanting accelerated reading instruction can use the program. Also, the program s interface design and content can be adapted for young adults.

The Reading program content was developed using a printed reading developmental product produced by Educational Design Inc. of New York. This product consists of six levels containing twenty different and high interest stories each. Level one is normed at 4th grade six months and each succeeding level moves in six-month increments with level six being normed at 6th grade six months. Normed means that the word-size, sentence length, and vocabulary are measured to an average student reading at that level.

The lesson starts with vocabulary words taken from a story. A series of vocabulary synonyms is developed using a base word from the story and adding a simpler and a more complex synonym. A reinforcement game is then introduced. This is designed to expand the student's vocabulary.

In the vocabulary sections and the initial reading comprehension levels, the programs have voice over support. This voice over support is delivered at a pace designed to enhance the learning experience. As the student progresses to the more advanced levels, the voice over support is reduced and the student is required to become more self-reliant.

The student then proceeds into the section where they practice reading one or two paragraphs and then are asked a multiple choice comprehension question. As the student moves from one level to the next, the vocabulary words increase in difficulty and the reading paragraphs become longer. Also, the questions are placed farther from the paragraph that has the information in it. This instructional method improves comprehension over simple recall.

The field test experience shows that it takes a student between twenty-five and forty-five minutes to complete a lesson. If they do not complete the lesson during the allotted time, the program brings them back to where they left off at the start of the next session.

Overview

In this document details of program construction to present a unique instructional methodology are presented as series of screen captures with adjoining explicative text. The accompanying text describes user actions that are tracked to a database, special effects including voice over and transitions and navigational elements intrinsic to the program. The format for the program entitled *IndiVisual Reading*, is Log in; World Knowledge words; Synonyms, Synonym Test (game); Comprehension.

For the program entitled *Sexually Transmitted Diseases*, key frame screens are shown that present the major divisions of subject and call outs using additional media assets (video, still frame photography, illustrations, voice overs, animations).

Login

Figure 4A:
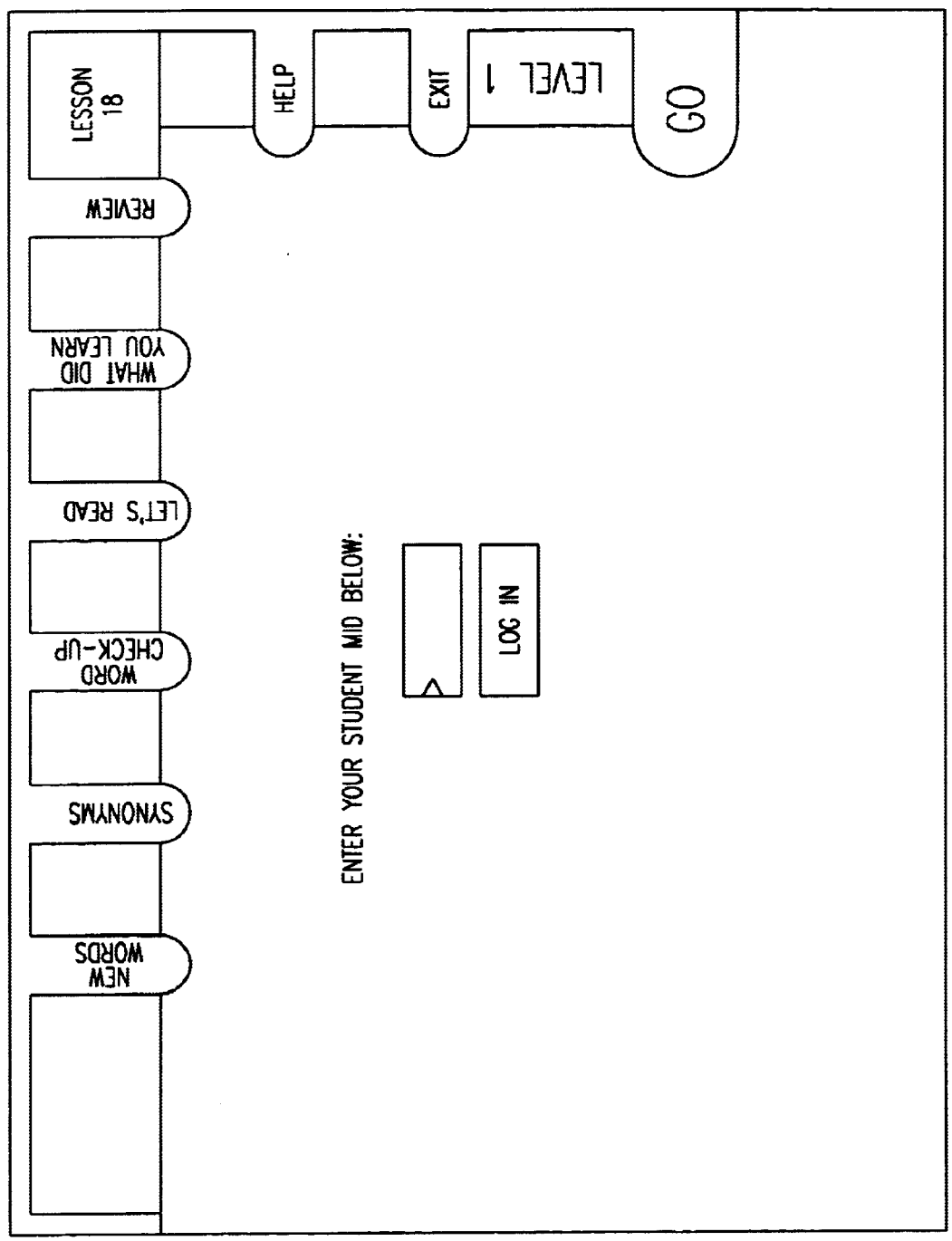
FIGS. 4A–4OO is a series of screenshots illustrating an operational embodiment of a software reading program according to the teachings of the present invention.

Actions. FIG. 4A illustrates a screen shot containing a login text entry box. This text entry box is where a student enters their password/ID for access. This is a security control point where entries are validated against a master list of legal users. Once checked for legal usage, the entry is checked against a bookmark to determine whether the lesson is new or being completed.

Figure 4B:
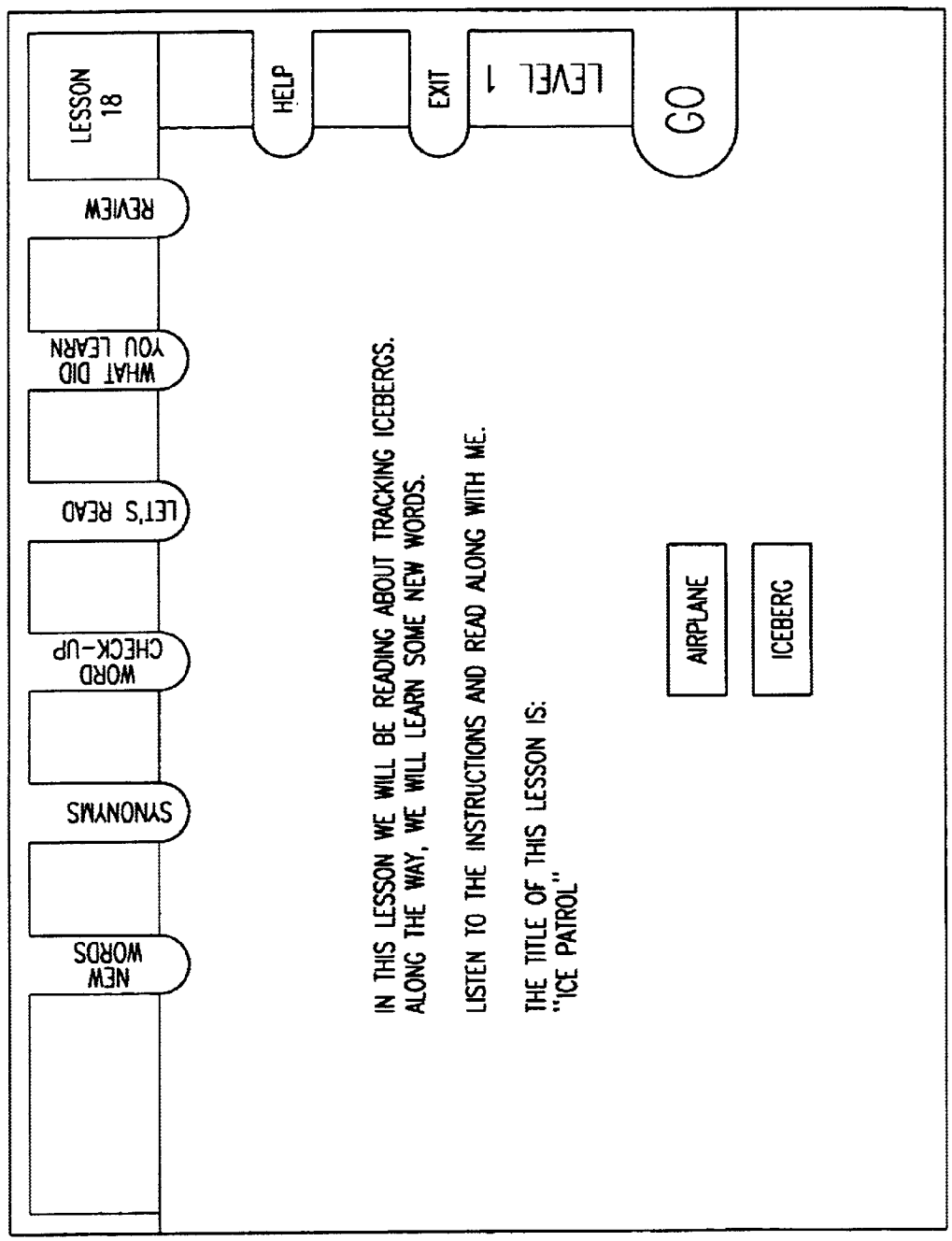

If the student has not yet worked this lesson, the next screen FIG. 4B, is the title screen for the lesson. If the student has been here before, they are returned to the place they left off.

This screen also displays the general navigational interface showing all clickable elements, at top of the screenshot FIG. 4B, in this embodiment.

Lesson Title Screen

Actions. If the records indicate this is the first time this student is taking this lesson, the title screen loads as shown in FIG. 4B. From this point forward if the student leaves, and later returns, they return to where they left off.

Effects. The various buttons are live depending on the context of use. The student is told with a Voice Over (VO), to click the GO button when ready.

Overview of Lesson

Figure 4C:
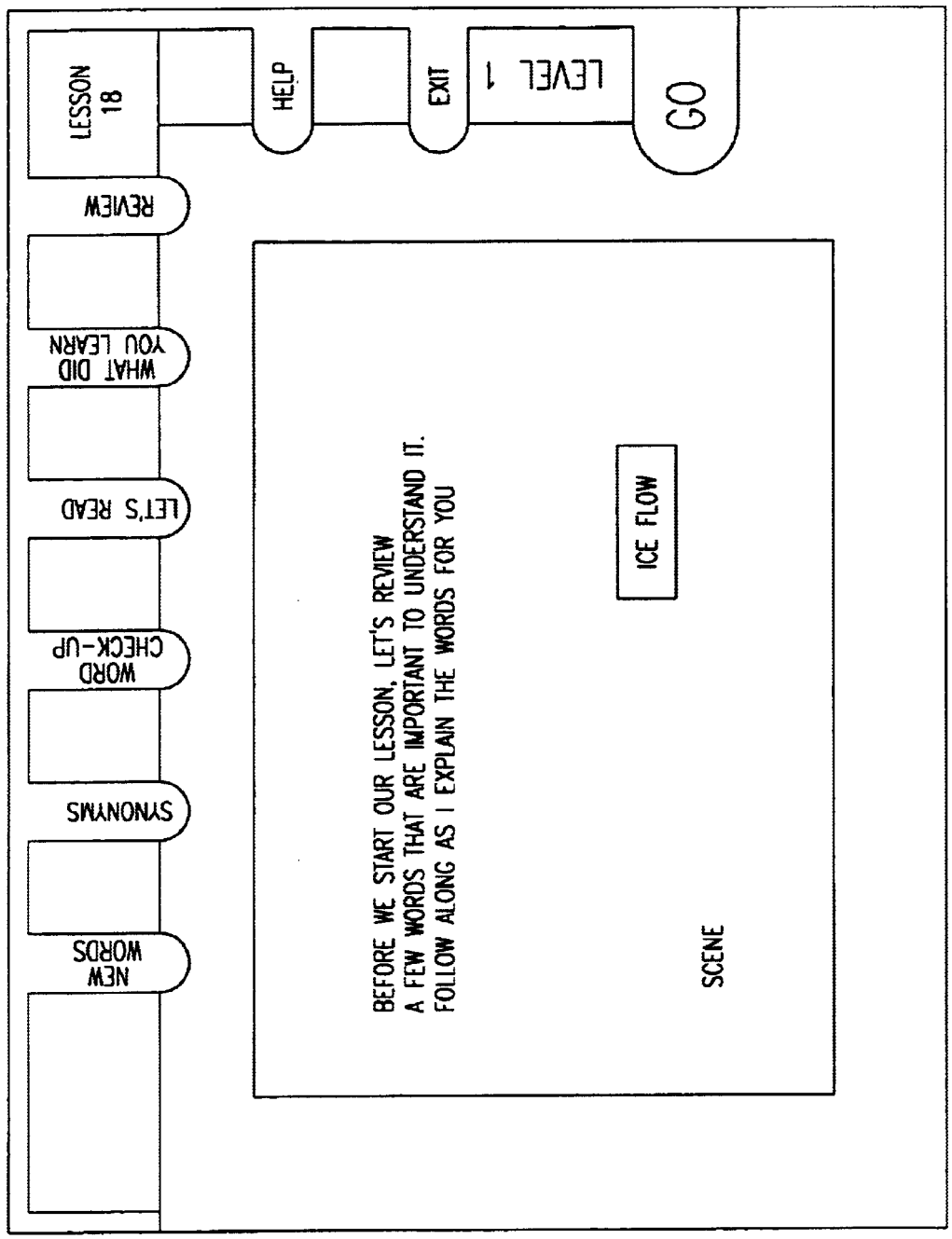

Actions. A VO reads text displayed. FIG. 4C illustrates a screenshot which orients students to the lesson and, in general, the protocol of the lesson. A VO to click GO will advance the student to the next screen.

Global Knowledge Words

Format. The screenshot in FIG. 4C is a typical display of the combination of VO and text presentation. According to the teachings of the present invention, the text is presented as spoken. After the VO, the screen automatically advances to the first word of the Global Knowledge section.

The educational goal is to build vocabulary with words inimical to the story, but ones in which synonyms are not presented.

Global Knowledge Words

Figure 4D:
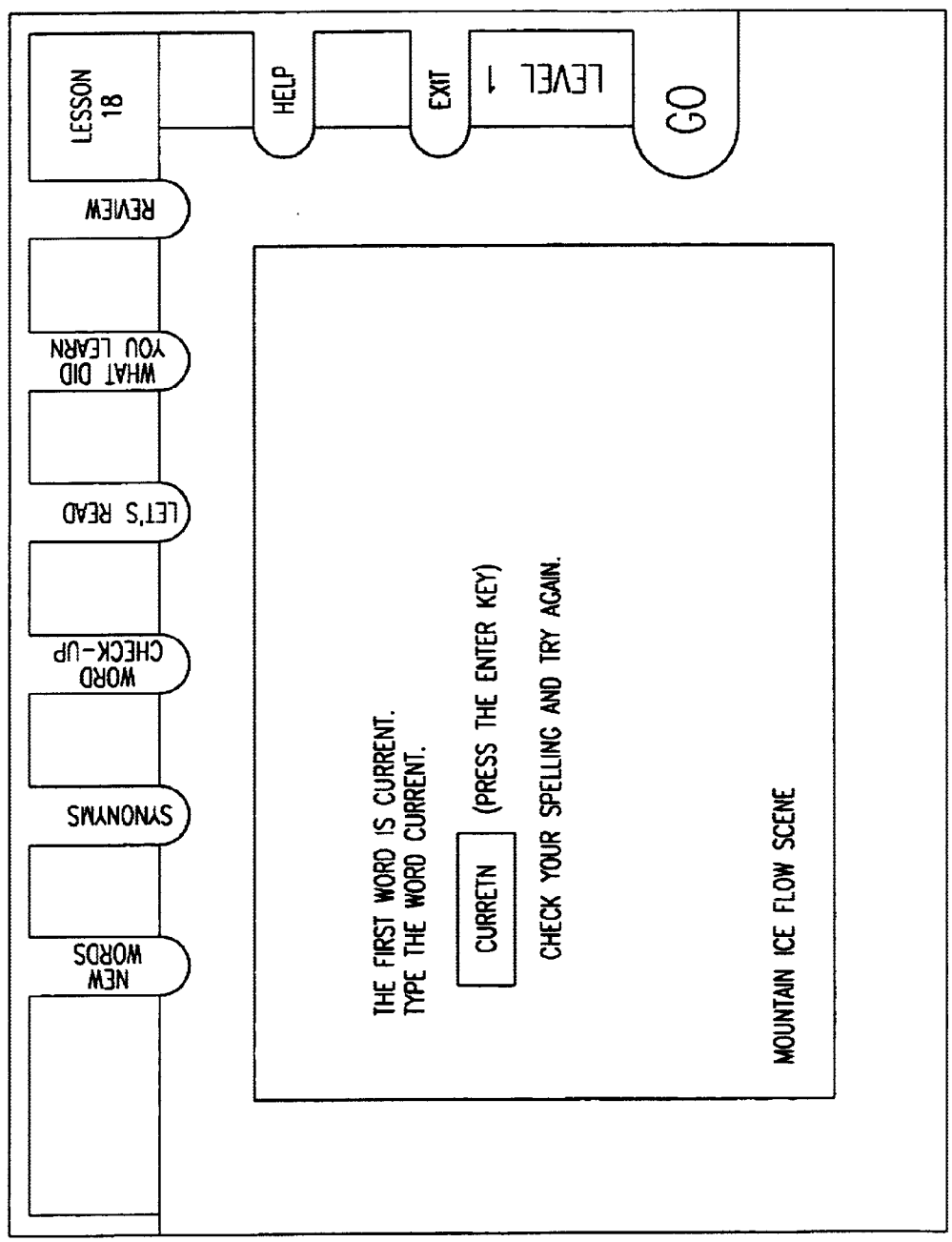

Text entry with correction loop. According to the teachings of the present invention, the program VO presents the first of several global knowledge/vocabulary words (GKW's). This is illustrated by screenshot FIG. 4D. In FIG. 4D, the student is asked to type in the word to build habit strength through repetition. FIG. 4D shows an incorrectly entered word with the feedback provided by the program. As shown in FIG. 4D, the program asks the student to check their spelling and try again. The program permits three tries before another message appears explaining that it is important to move along.

Global Knowledge Words

Figure 4E:
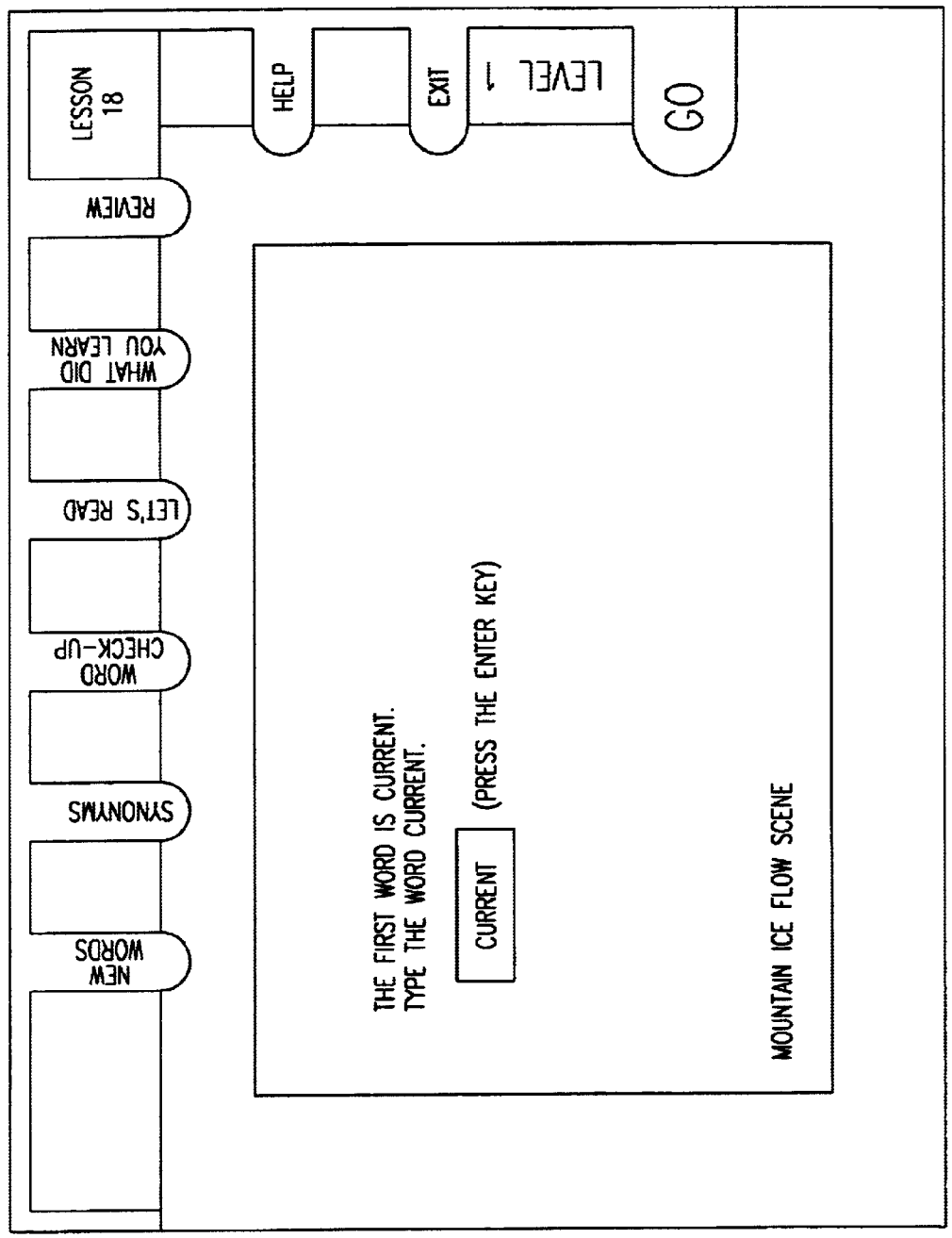

Correct Text Entry. FIG. 4E is a screenshot illustrating a correct text input. As shown in FIG. 4E, by pressing the ENTER key, the program advances to the next screen.

Global Knowledge Words

GKW is defined. In screenshot FIG. 4F the GKW is defined. According to the teachings of the present invention, a VO speaks all the text except what the student enters in the text box. As one of ordinary skill in the art will understand upon reading this disclosure, the goal is to learn new words in the use context of the lesson.

Synonyms

Figure 4F:
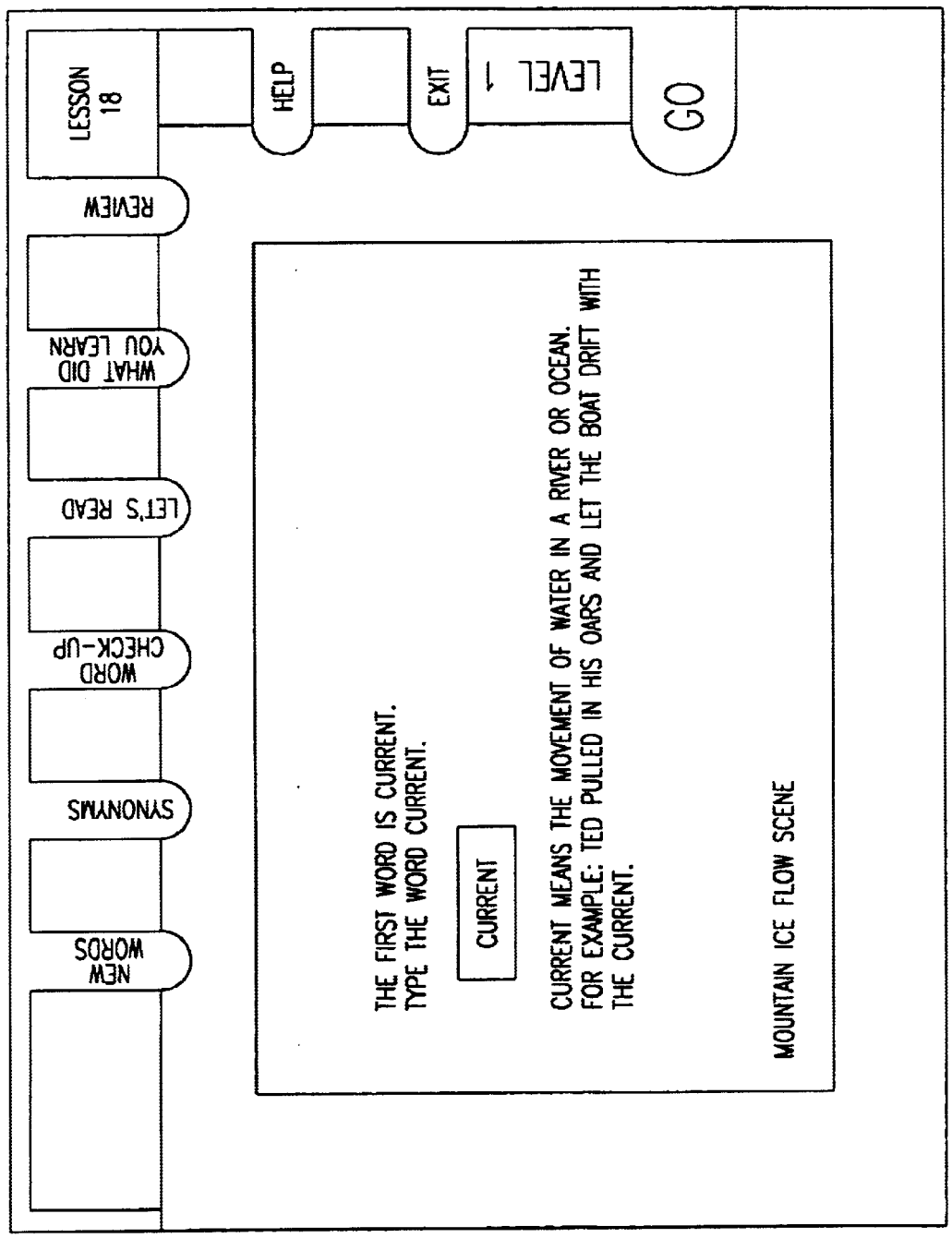
Figure 4G:
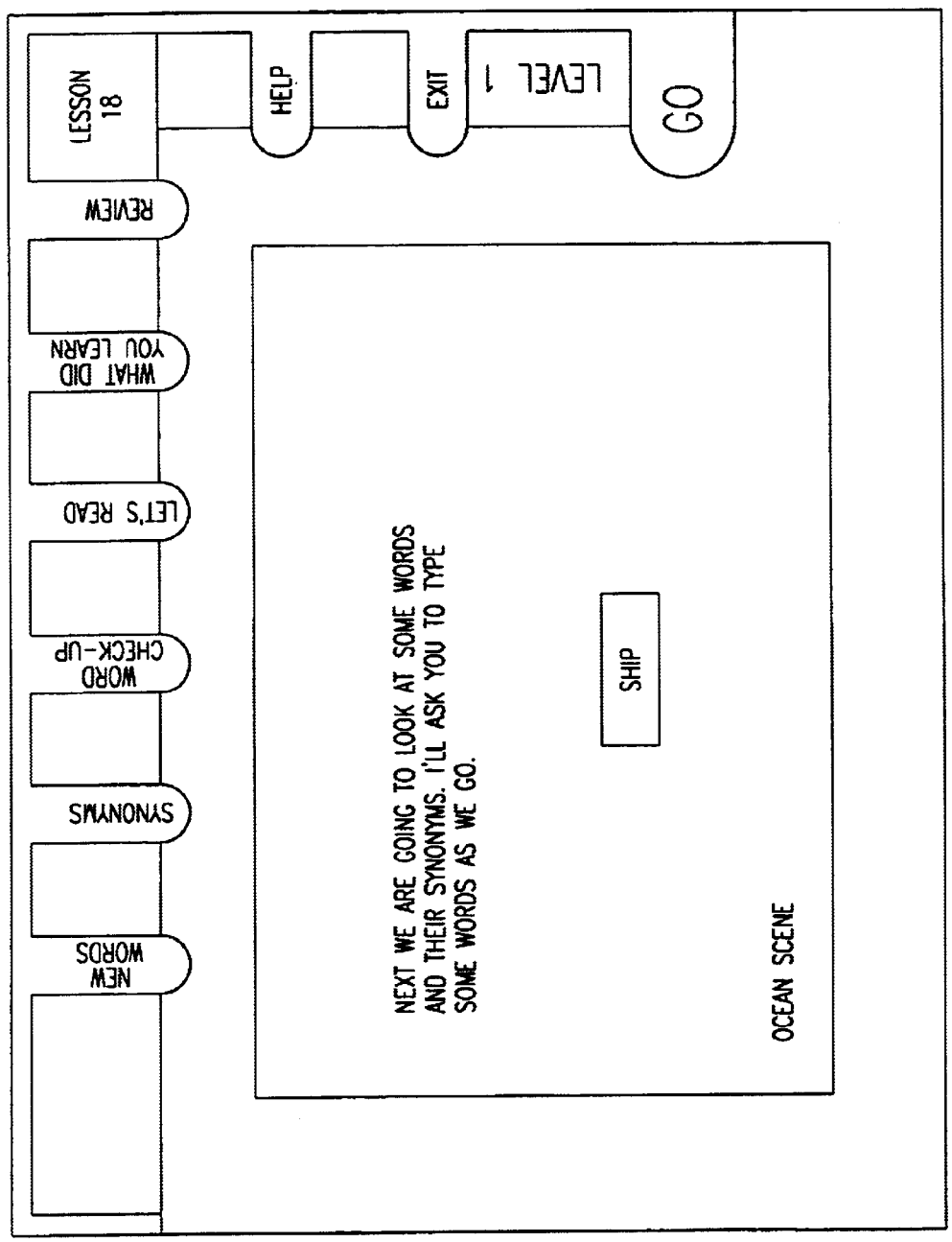

Lead screen in which section is defined. FIG. 4G illustrates a lead screen which defines the Synonyms section of this program embodiment. In other words, FIG. 4G illustrates the intro synonym screen to this section. Here, the VO explains what kinds of activities will take place. This portion of the program sets the basic structure of this section as is more fully revealed in the following screens. The method of interaction is also specified by VO (i.e., which buttons to click, etc.).

Synonyms: First Word

Figure 4H:
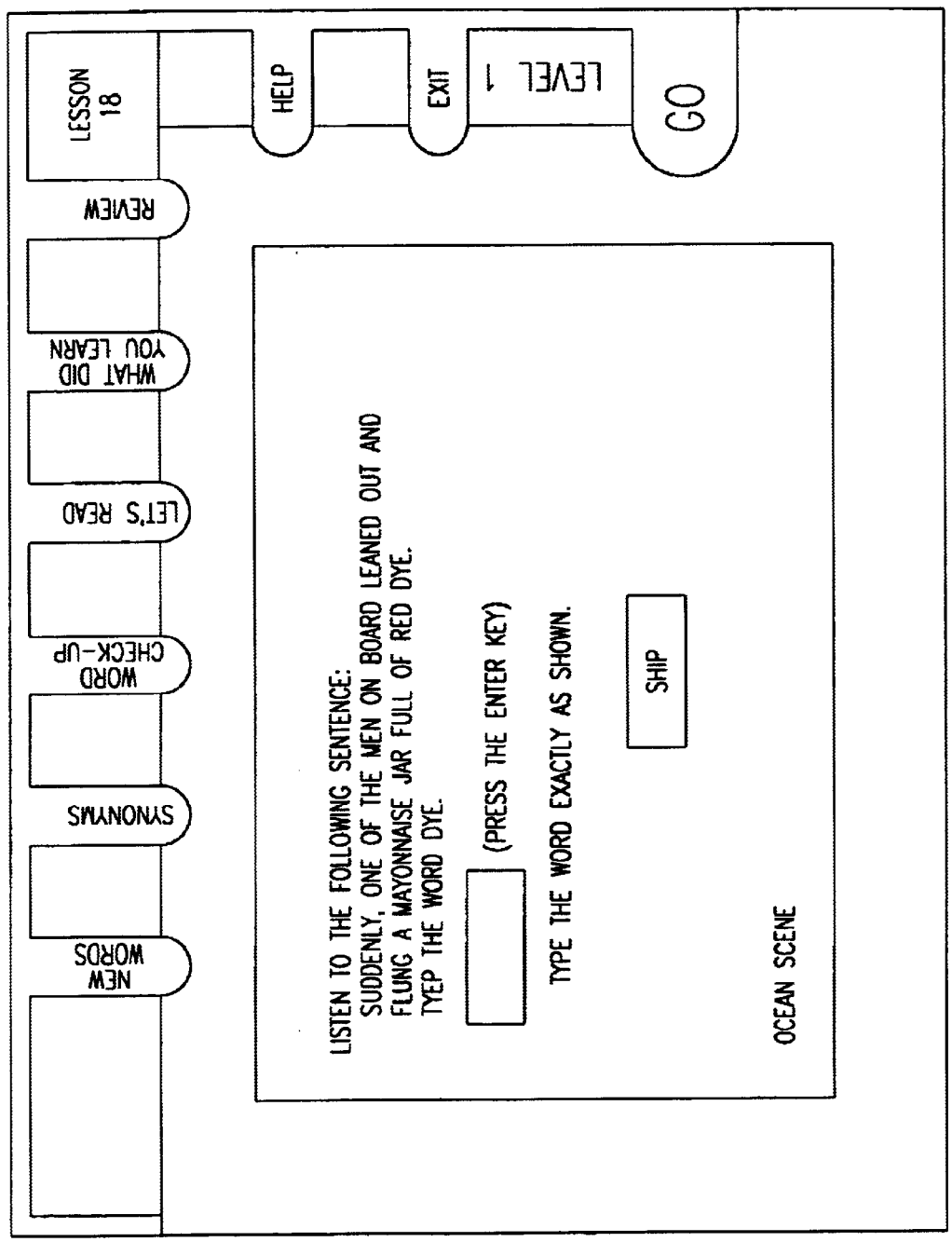
Figure 41:
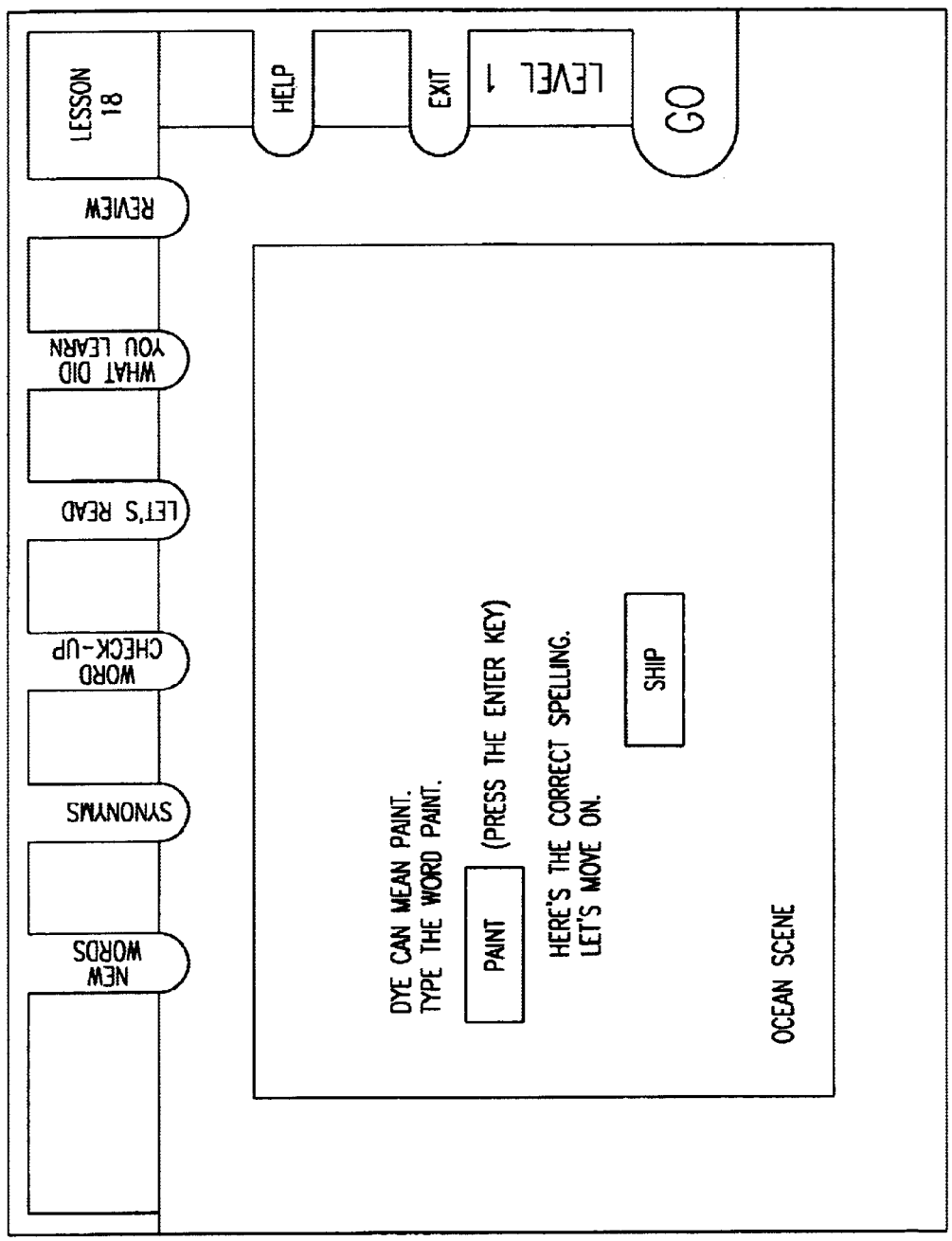

Program presents the first of several synonyms. Next, in the screenshot shown in FIG. 4H, the VO speaks as a set of text is presented. According to the teachings of the present invention, the goal is to have the student broaden vocabulary with synonyms. As shown in FIG. 4H, the student is also ask to type the relevant vocabulary word. In subsequent screens, other words will be shown and spoken, then the student makes a choice as to which is the best selection.

Synonyms Alternate Words

The VO presents two synonyms. In screenshot 4I, a replacement word for dye, e.g. paint, is presented to the student. The student is asked to type the replacement word. In this part of the program, the screen can also show if an entry is made in error and the correct spelling can be supplied by the program.

Synonyms, Alternate Words

Figure 4J:
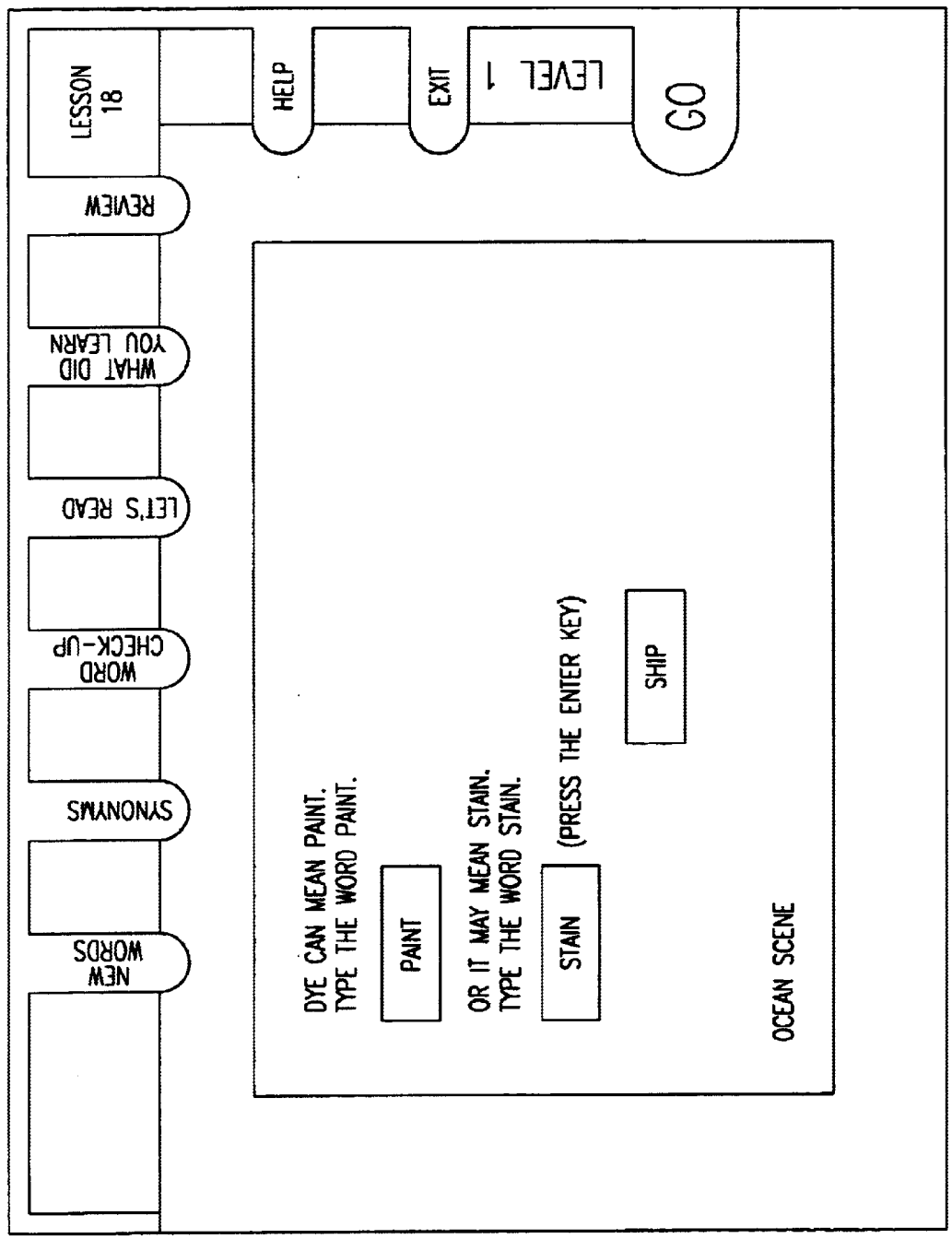

As shown in FIG. 4J, the bottom text field is added to the previous screenshot 4I to provide another synonym, or replacement word for dye, e.g. stain. Again, as shown in FIG. 4J, in the lower text box the student is asked to type in the alternate synonym, in this case—stain, as an alternate to the original word, dye, and to the first synonym, paint.

Synonyms Choice of Alternates

Figure 4K:
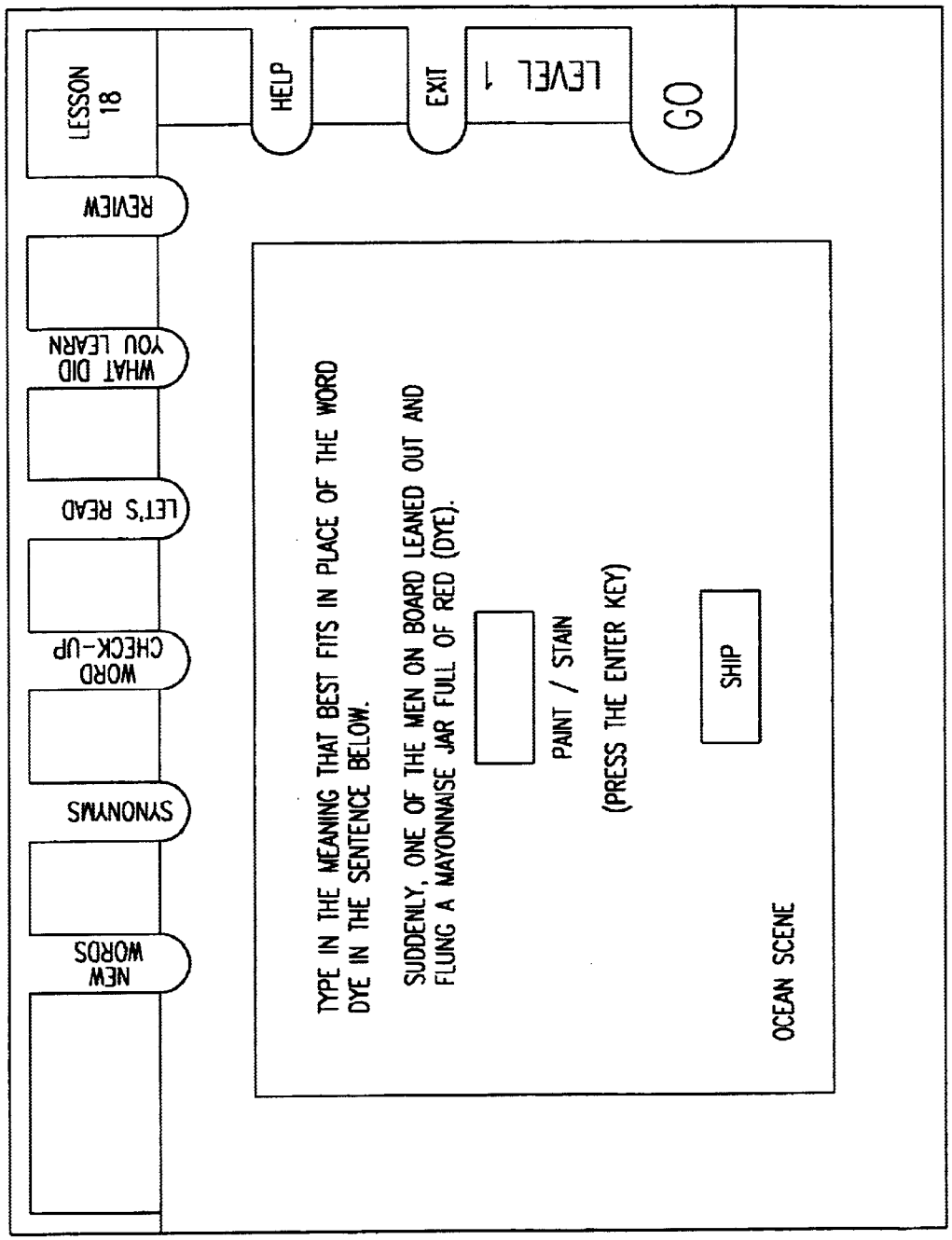
Figure 4L:
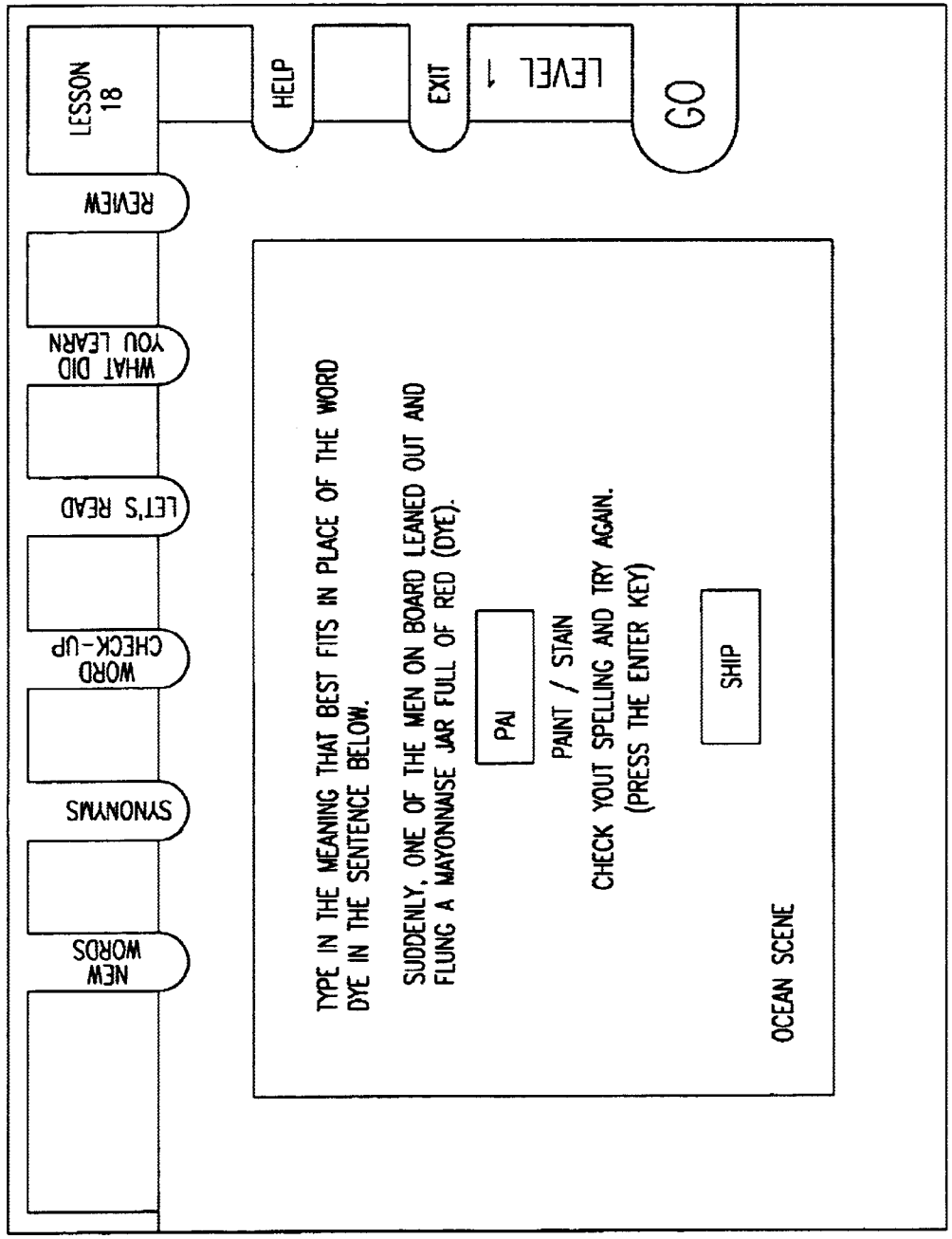

Next, in this sequence the student chooses between the two alternate synonyms presented in the previous screenshots 4I and 4J. Screenshot 4K illustrates the same. Screenshot FIG. 4L illustrates that in all cases where a text entry is requested, errors are tolerated and feedback is given with the standard loop invoked by the program dropping in the correct answer.

Synonyms Correction Loop

Figure 4M:
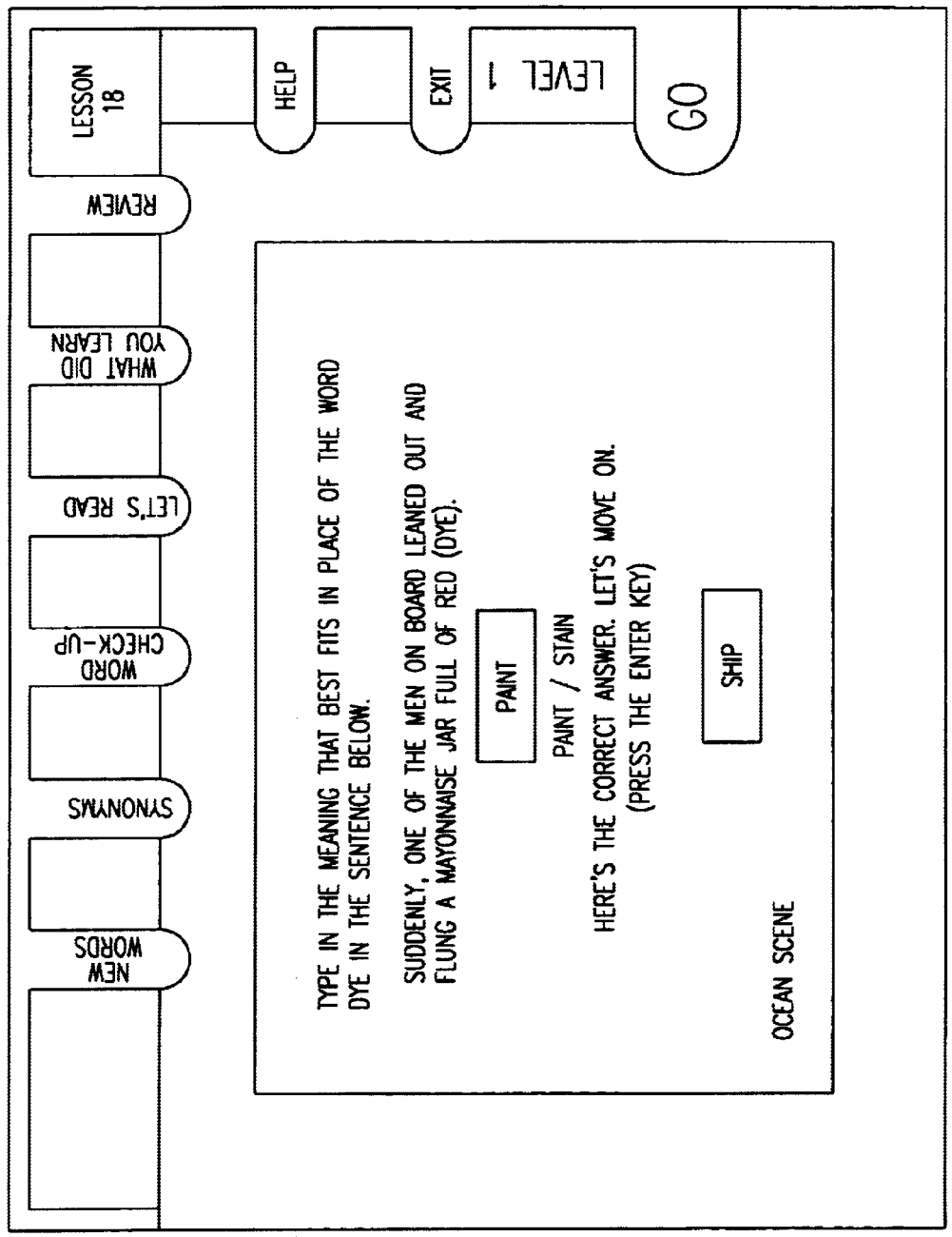

This screen and the next present details of the correction loop. The following two screens show the results of different student entries. The program was setting the student up to choose "Stain" over paint. As shown in screenshot FIG. 4M, the student chose Paint anyway. Screenshot 4N illustrates the program's response to that input. Screenshot 4N further illustrates that the program brings closure to the sequence by repeating the intended use, e.g. "Stain."

As one of ordinary skill in the art will understand upon reading this disclosure, the above described sequence can be repeated to present any number of words and their synonyms in connection with the high interest expository text. The program cycles until all of the words and synonyms in this portion of the lesson have been presented.

Game (Synonym Test)

Introduction screen for the synonym test section. FIG. 4O illustrates a screenshot for a subsequent portion of the program s lesson. As shown in FIG. 4O, in this section the student is matching the key vocabulary word to the presented pairs of synonyms from the previous section.

According to the teachings of the present invention, the use of a gaming device is to heighten interest and serve to break up the presentation. In any of the game sequences the student must associate a vocabulary word with its synonyms by dragging or clicking.

Game (Synonym Test)

Figure 4N:
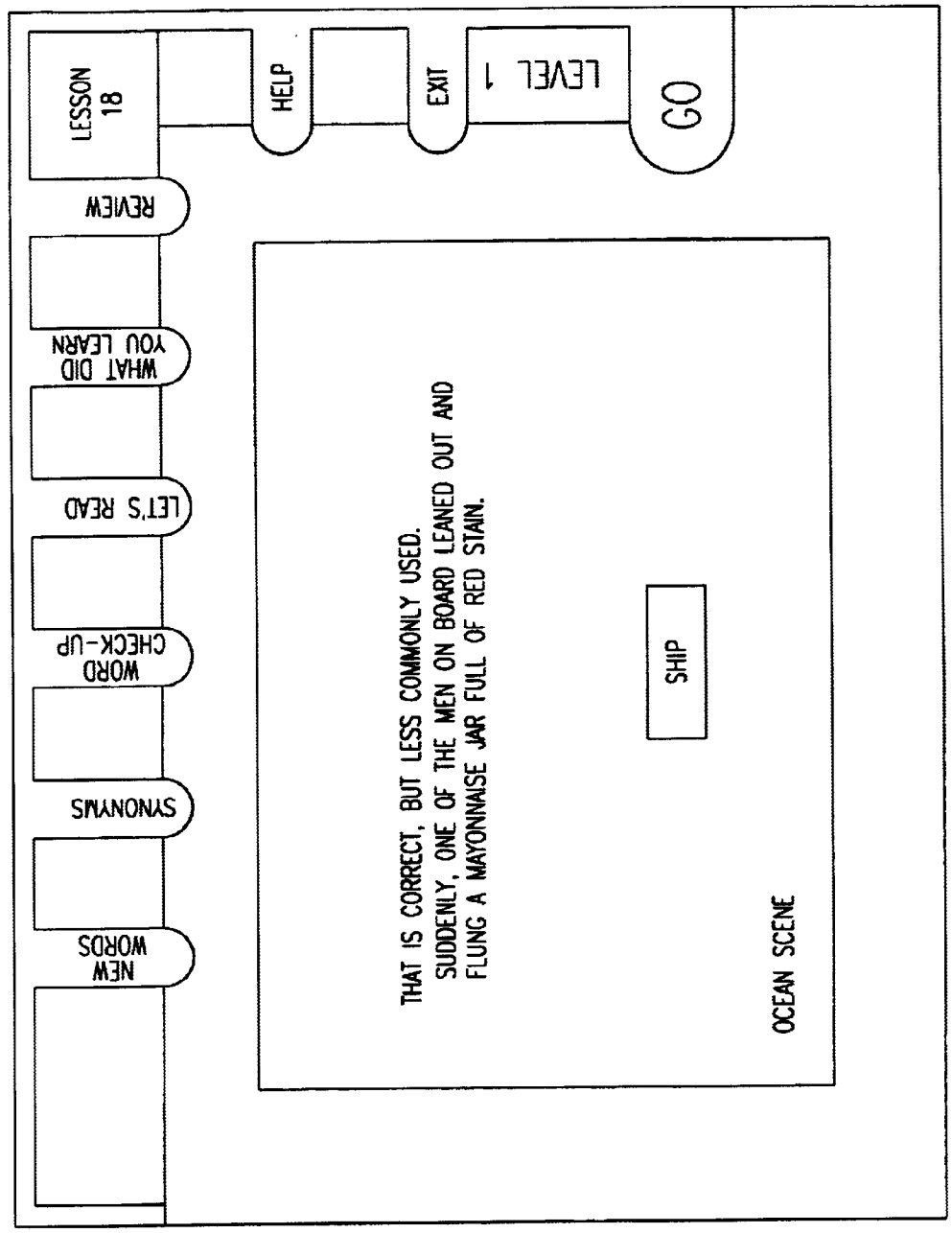
Figure 40:
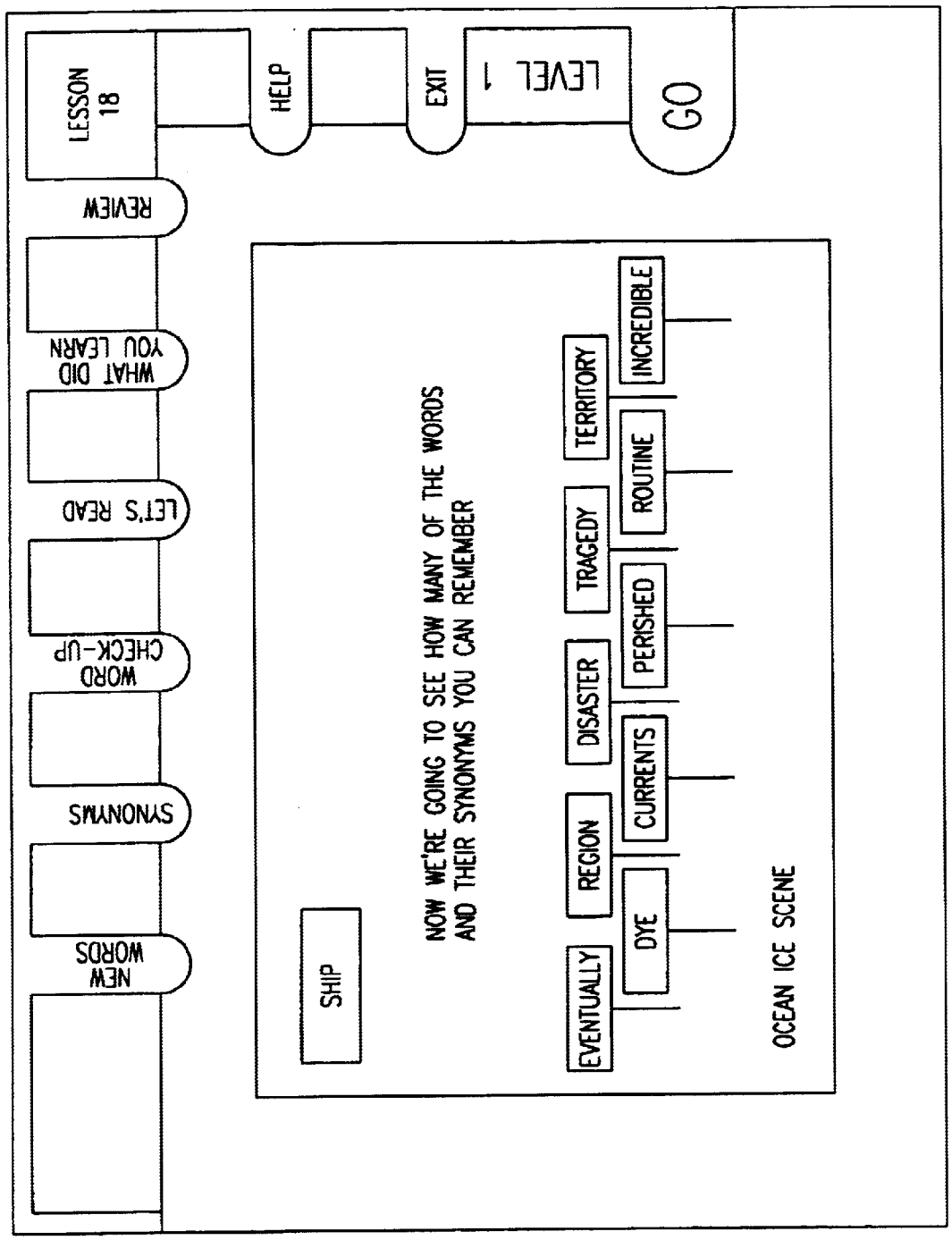
Figure 4P:
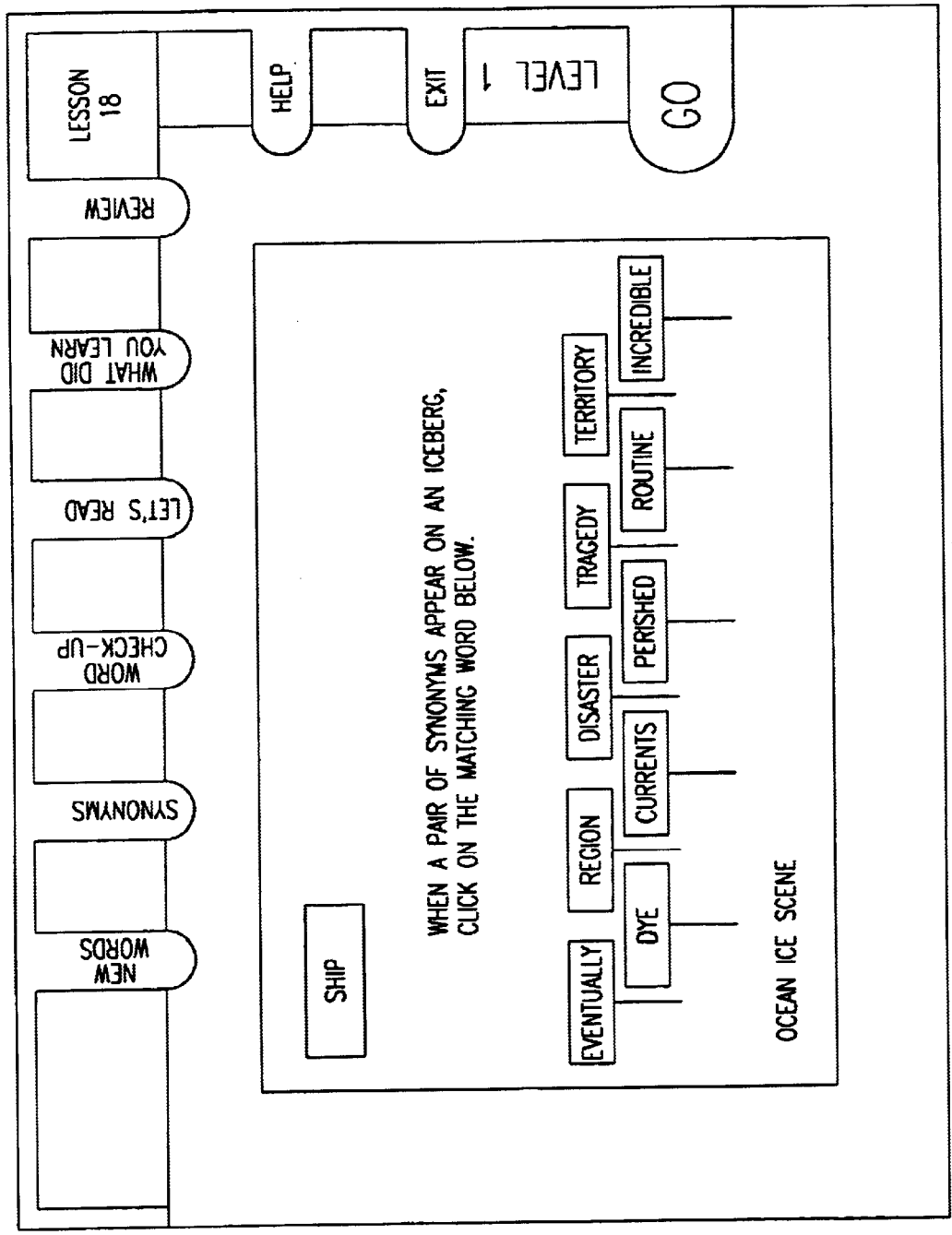
Figure 4Q:
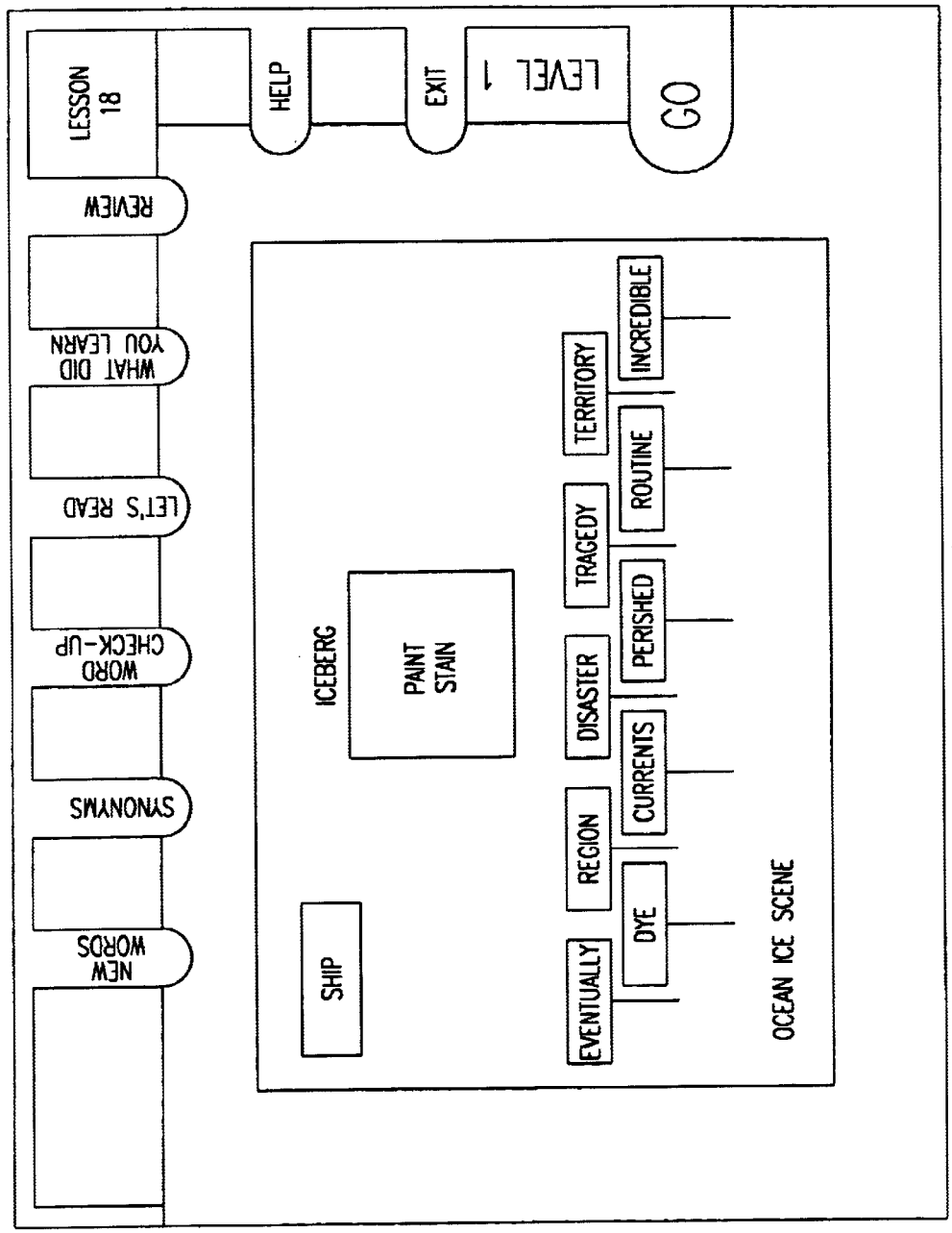
Figure 4R:
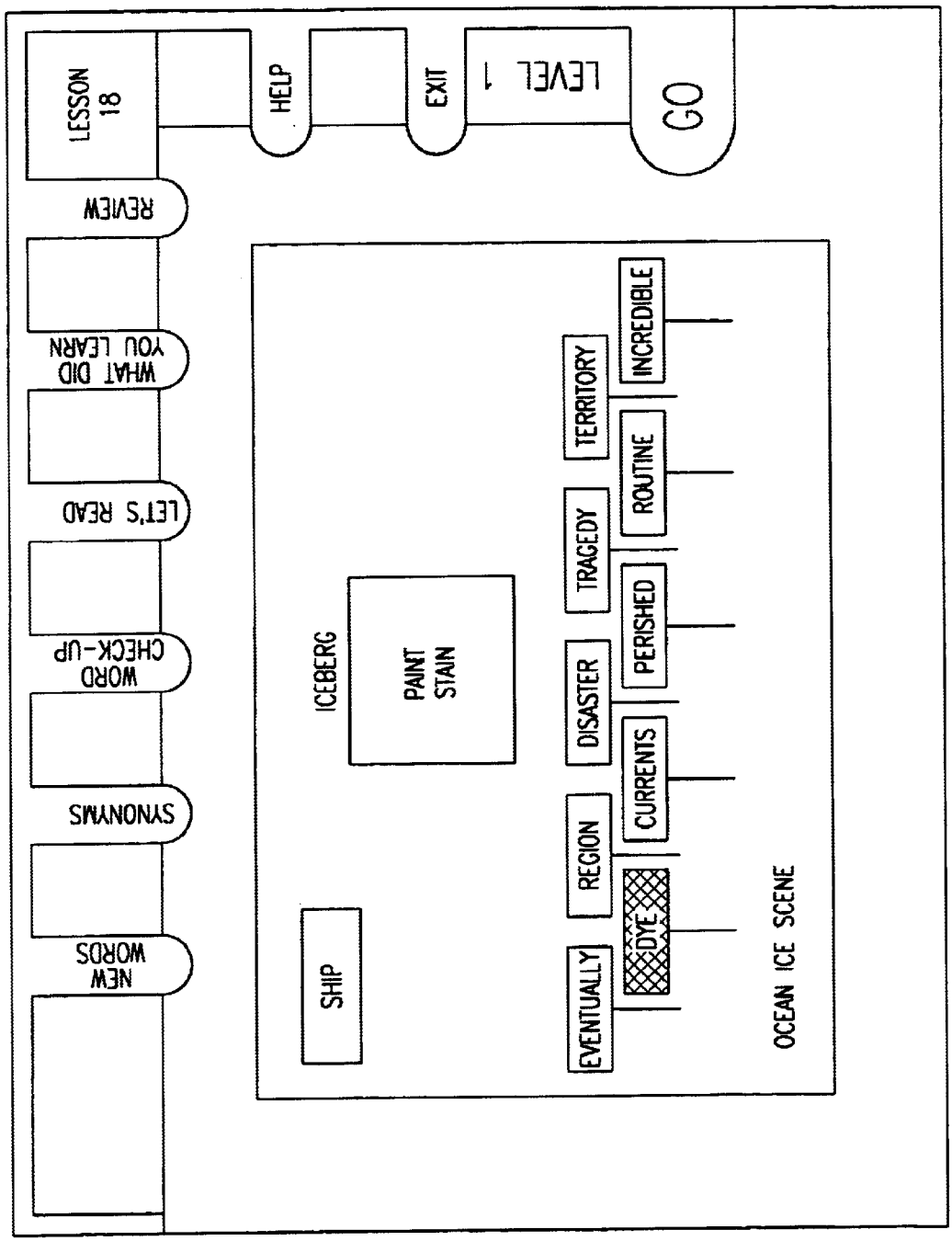
Figure 4S:
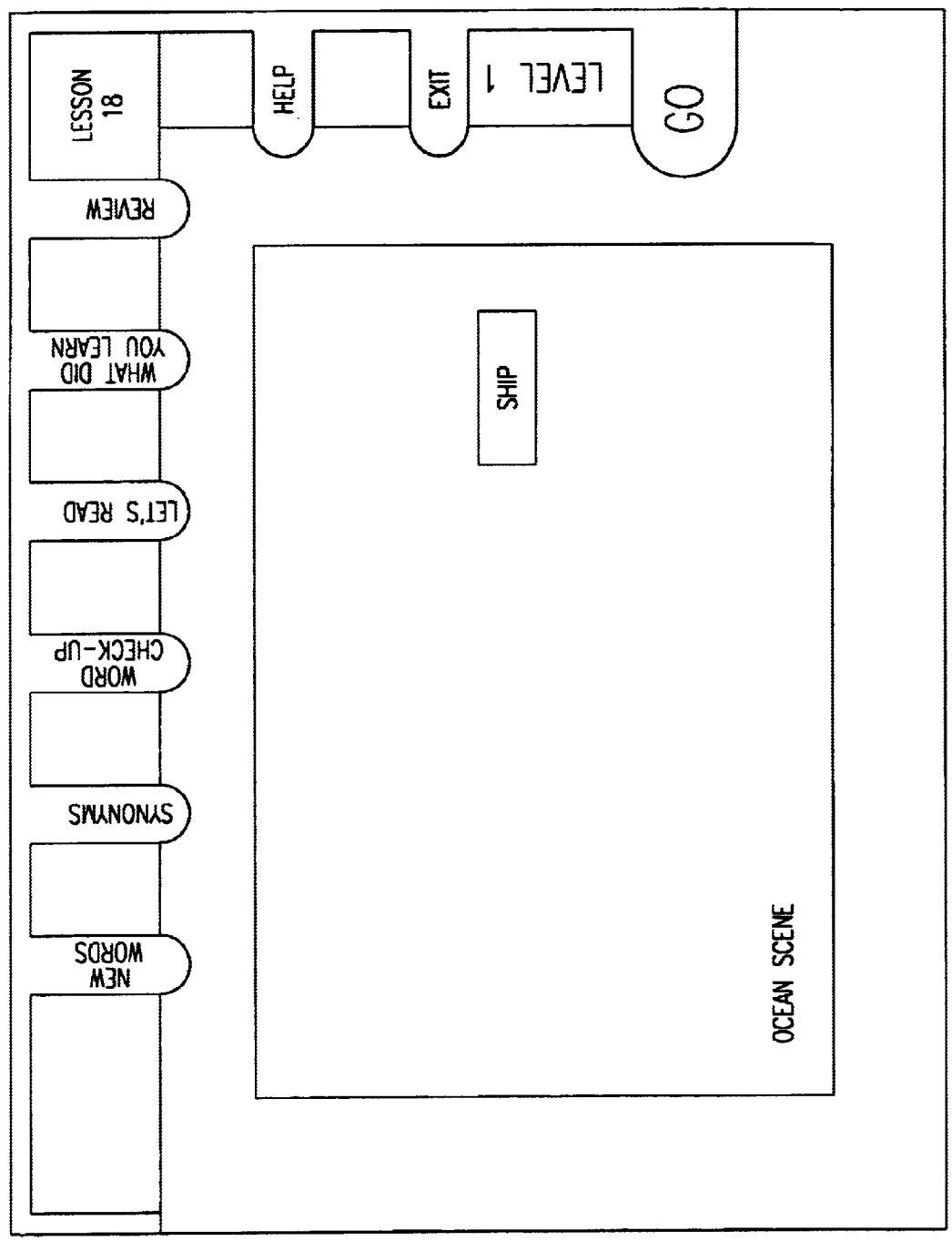

Instruction screen describing the action of this particular game. As shown in screenshot FIG. 4P an instruction screen describing the action of this particular game is. The reversal text (white) is spoken and displayed. In this case, an iceberg will appear with two synonyms on it, as shown in FIG. 4Q, and the student must click on the matching word from the group of signs below.

Game (Synonym Test)

First pair is presented. In FIG. 4Q, a first pair of synonyms is presented on the iceberg. FIG. 4Q further illustrates high multisensory scenario in which the game is presented together with graphics.

Game (Synonym Test)

First pair is presented, and a choice is selected. Screenshot 4R illustrates the student has clicked on the sign labeled "Dye". In this case, this is a correct answer, so the iceberg disappears and the ship continues its animated course as shown in screenshot 4S.

Game (Synonym Test-Help Screens)

Figure 4T:
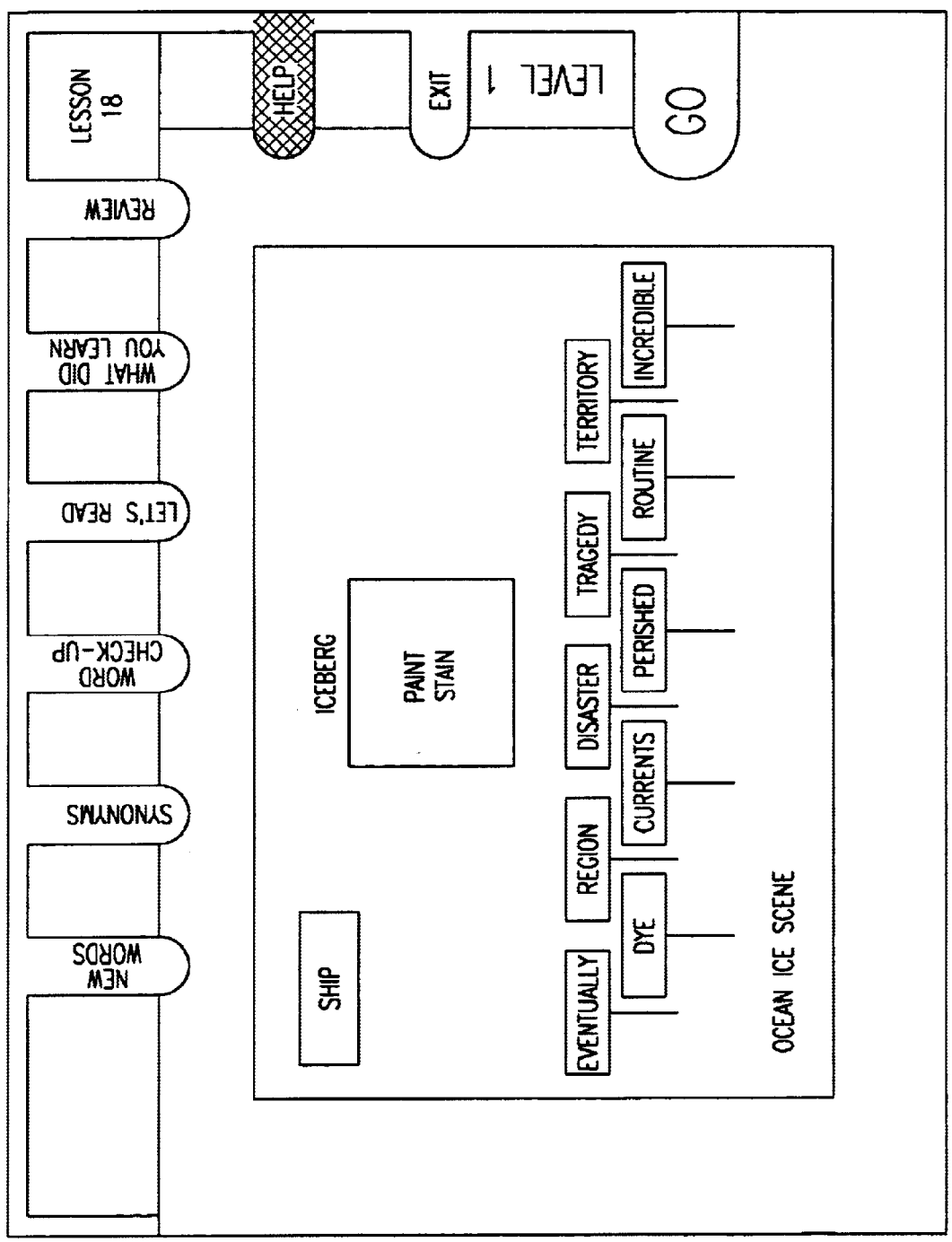

The Help button shown in its "rollover", or highlighted state. FIG. 4T illustrates the help button being selected. In this interactive help screen, the student has rolled the mouse over the live button. A mouse down action will prompt the screen shown next.

Game (Synonym Test-Help Screens)

The Help pop-up window is active inside the game screen. According to the teachings of the present invention the help window is designed to work with each gambit. A scrolling help window is available to the student and shows the synonym pairs and the vocabulary word they are replacing/matching. This window is always available and the student can interrupt play to invoke it.

Game (Synonym Test-Help Screens)

Figure 4U:
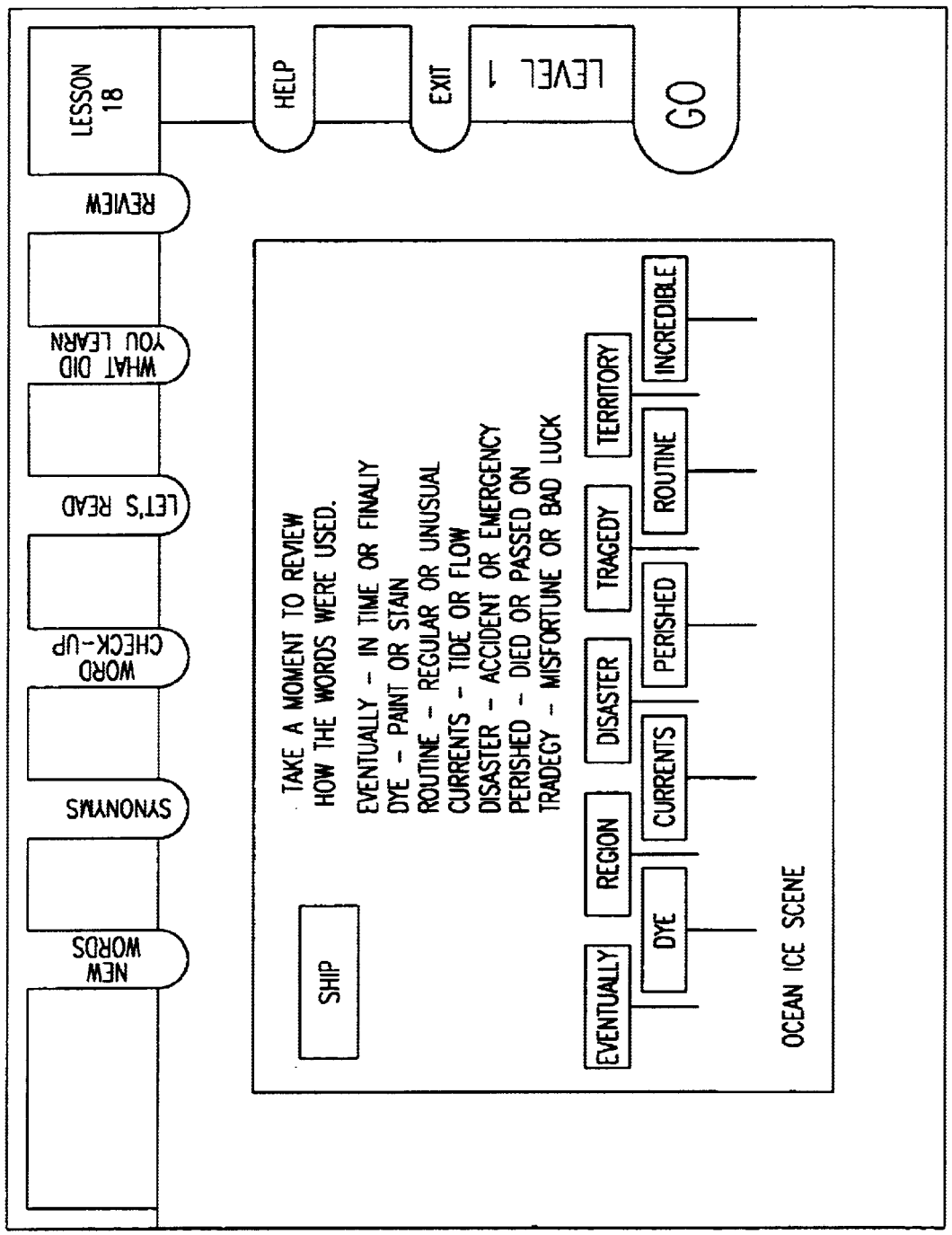

The Help button rollover in its mouse down state. Screenshot FIG. 4U illustrates the visual description of the cycle for calling and closing the help window.

Game (Synonym Test-Help Screens)

Figure 4V:
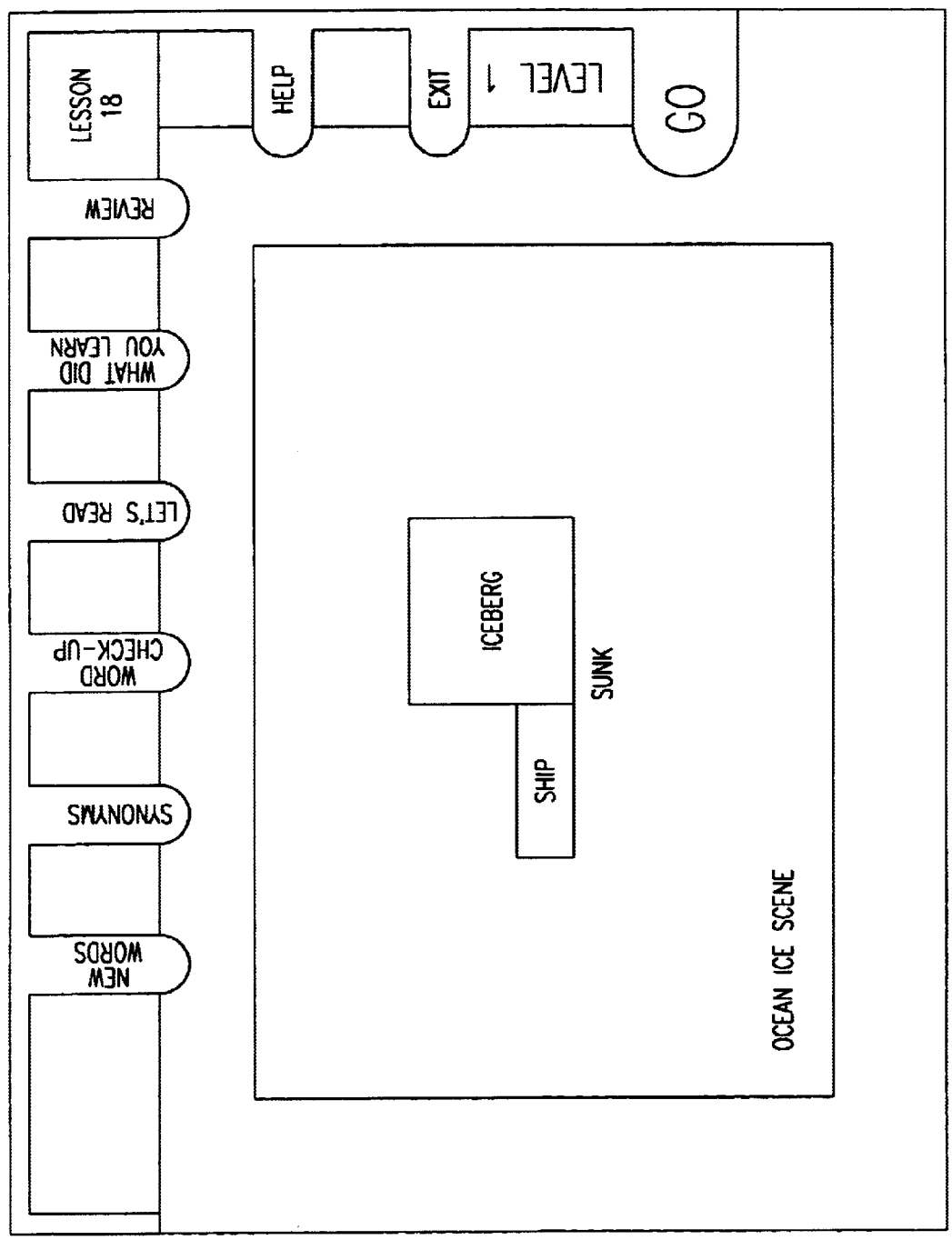

End state of game sequence. Screenshot FIG. 4V shows the result of having failed the game and effectively sunk the Titanic.

Game (Synonym Test-Help Screens)

Figure 4W:
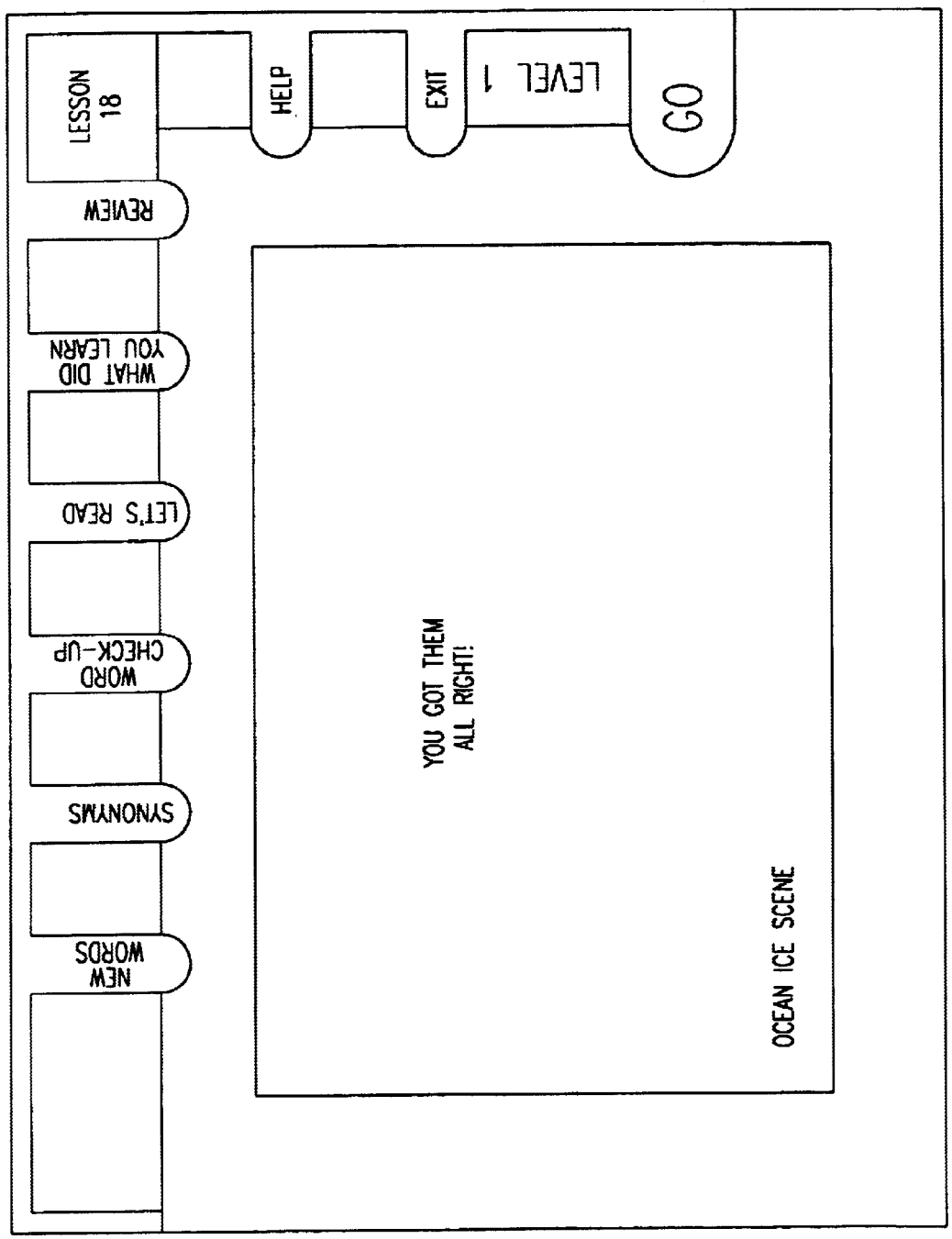

End state of game sequence. Screenshot FIG. 4W shows a successful outcome of the game sequence. The Titanic steams through the iceberg area, all the vocabulary words have been successfully matched to the synonym pairs shown on the icebergs.

Game (Synonym Test-Help Screens)

End state of game sequence. Again, FIG. 4W displays the message confirming the successful outcome of the game.

Reading Comprehension

Figure 4X:
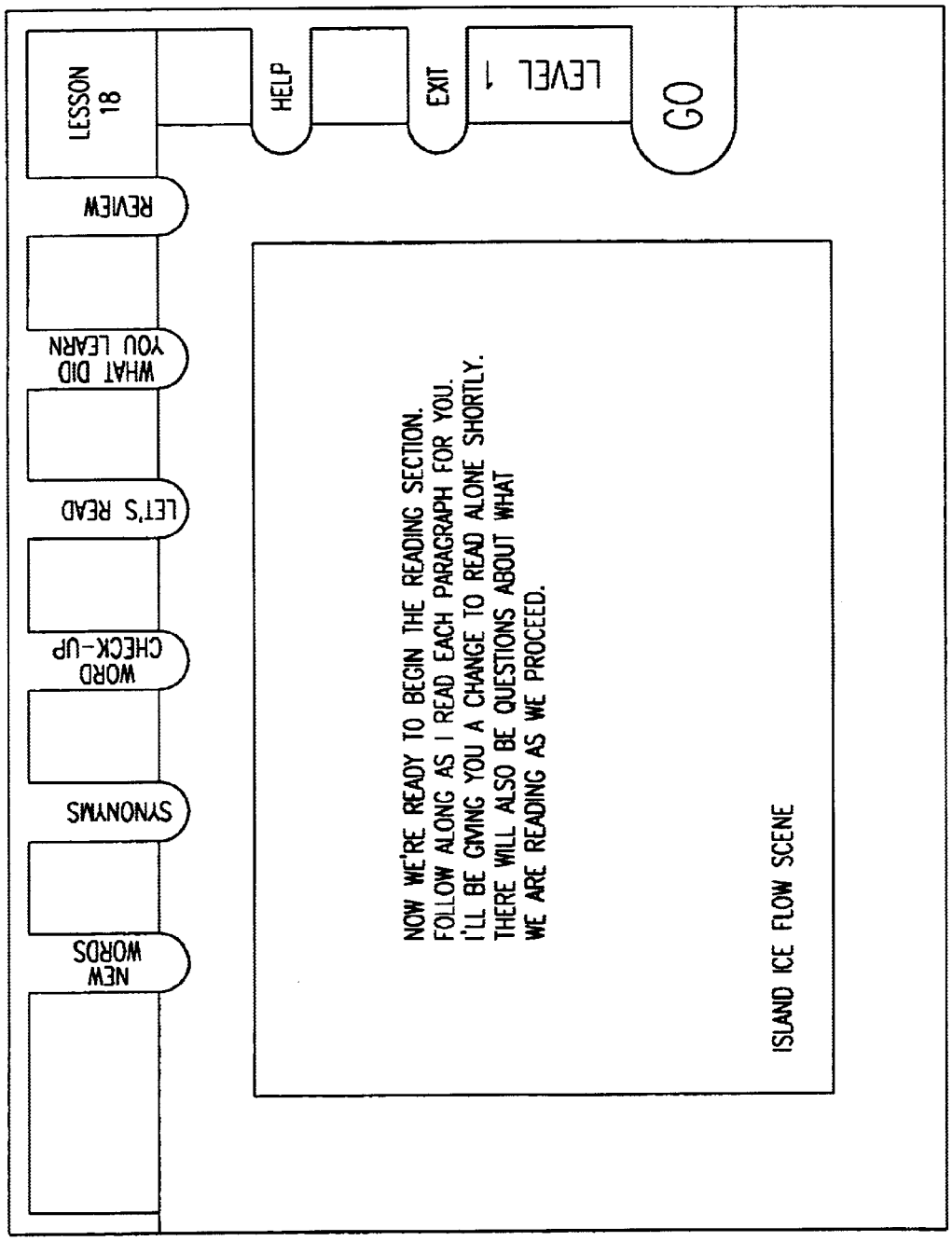

Instruction screen for Reading comprehension. FIG. 4X illustrates the lead screen to final section. After building vocabulary related to the article by using world knowledge words and synonyms, followed by a test of synonym replacement, the student is now ready for the reading section.

Figure 4Y:
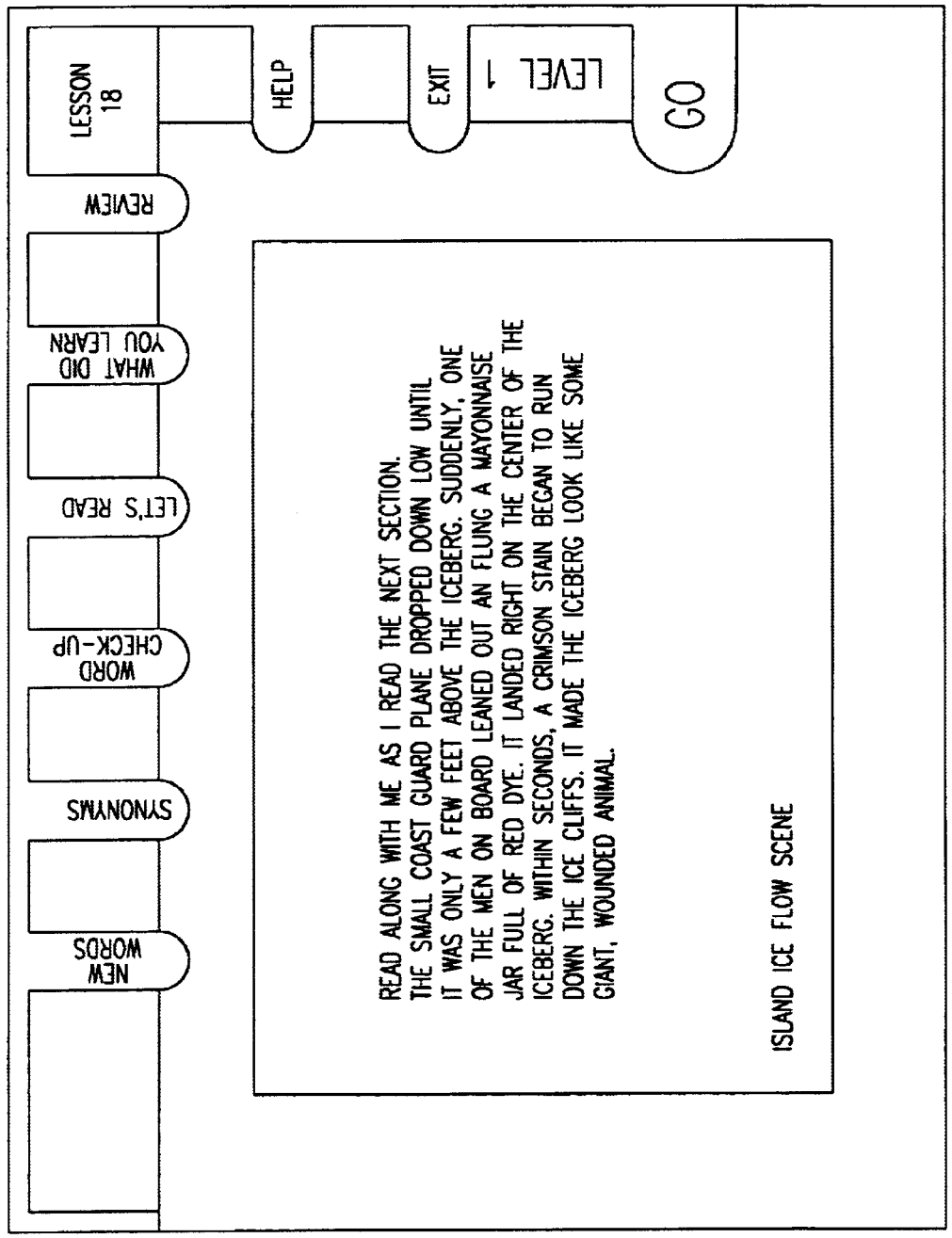

In screenshot FIG. 4Y a VO reads each chunk line for line. The display shows this same line for line presentation. All instructions for interaction and progress are given by voice over.

Reading Comprehension

Figure 4Z:
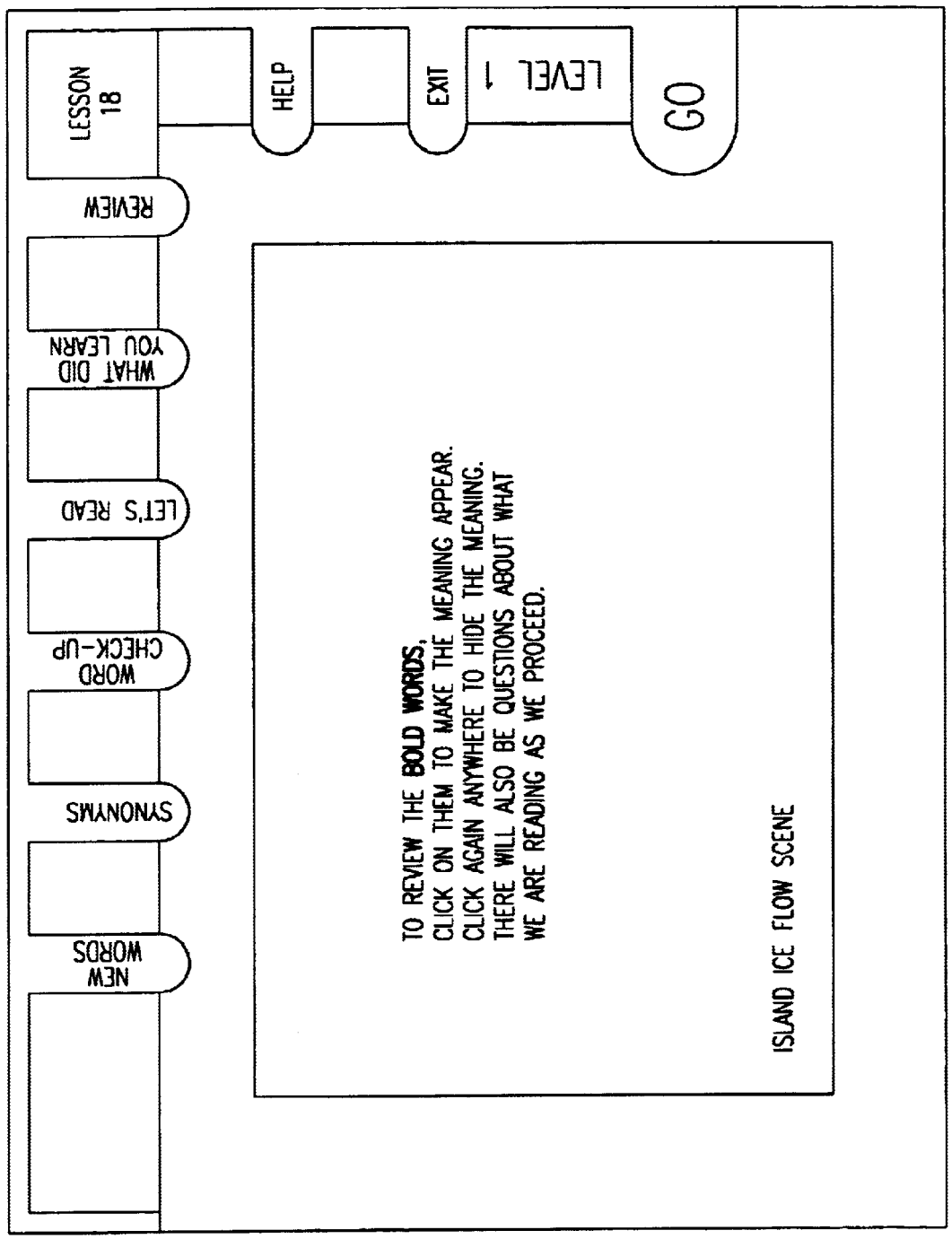
Figure 4A:
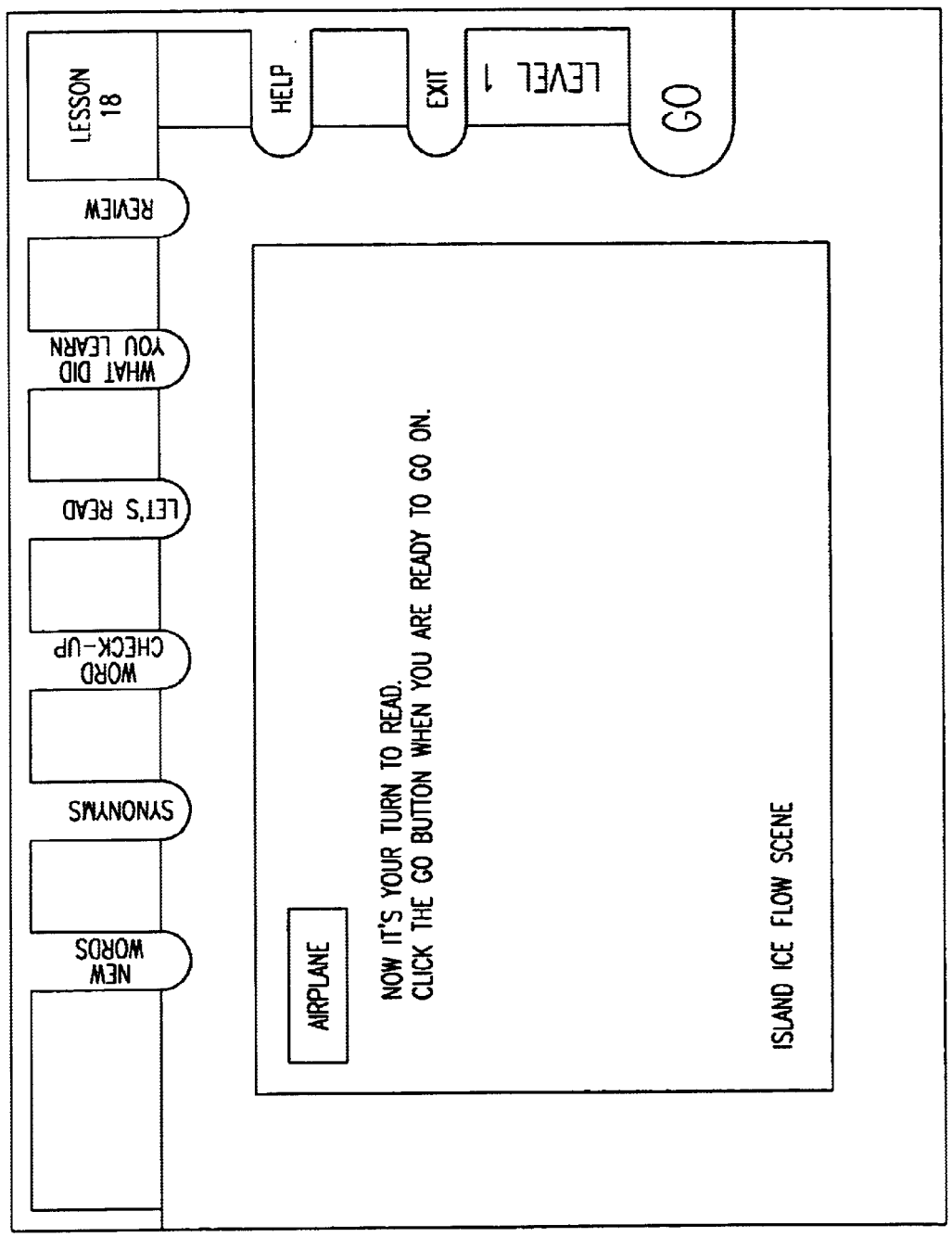
Figure 4B:
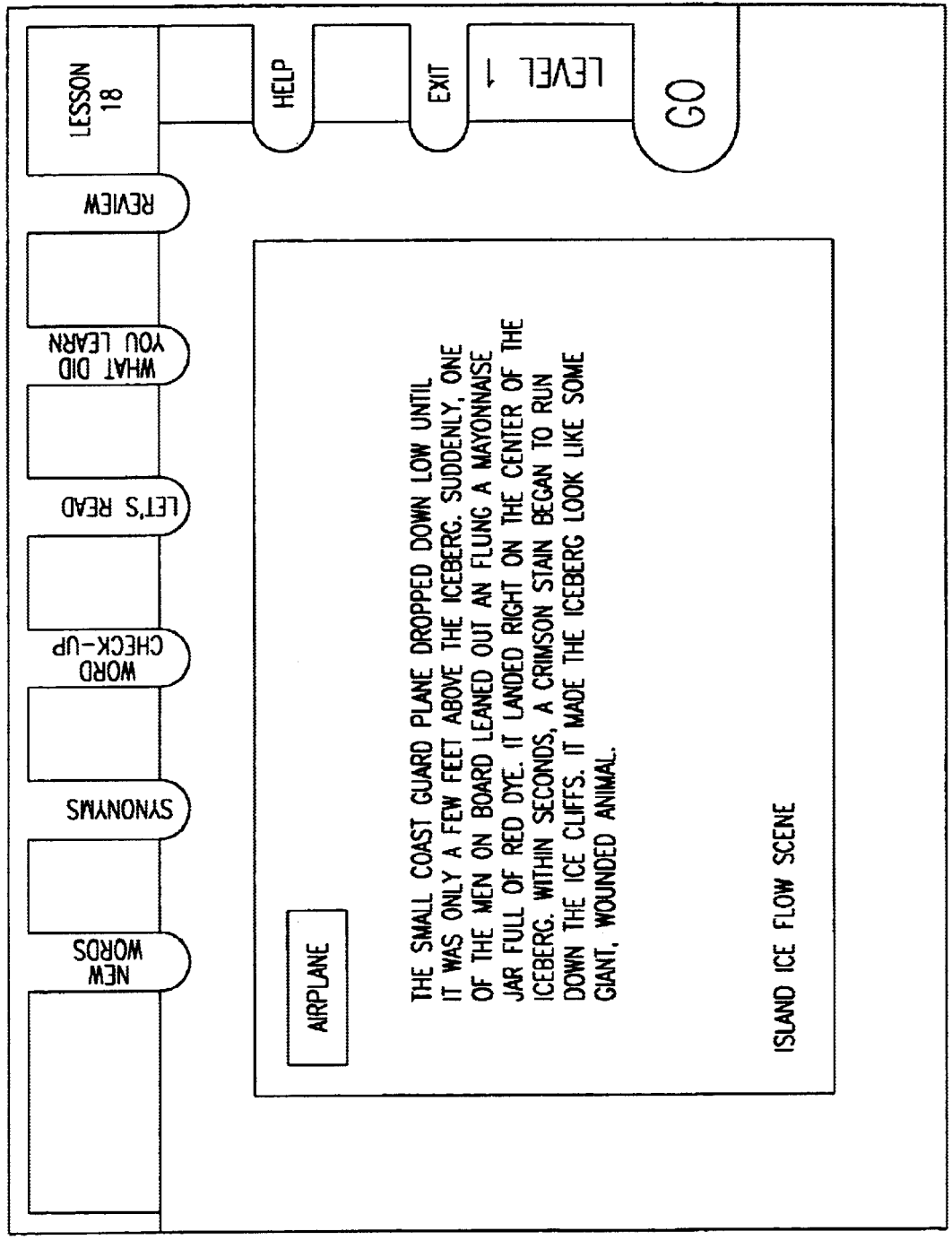
Figure 4C:
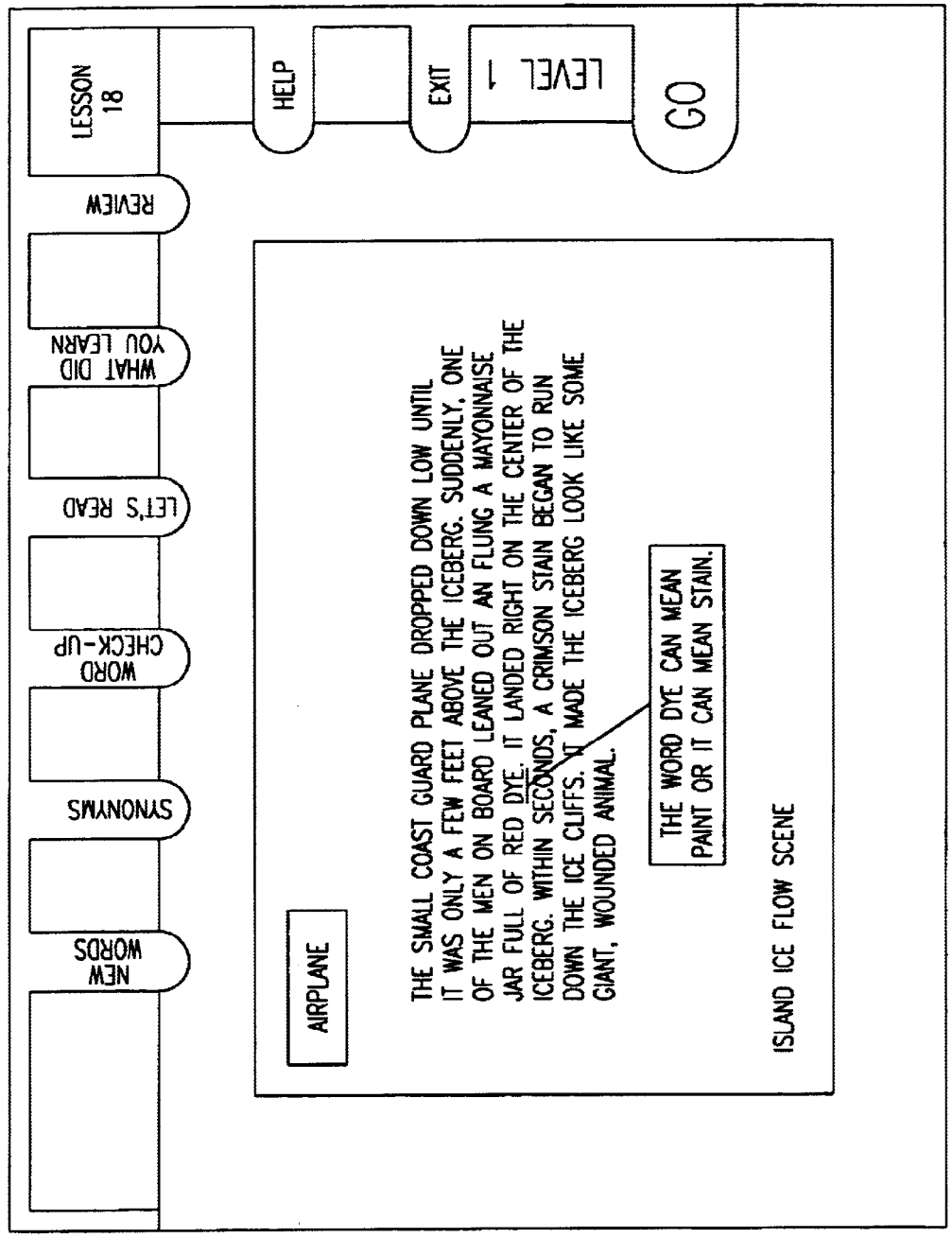
Figure 4D:
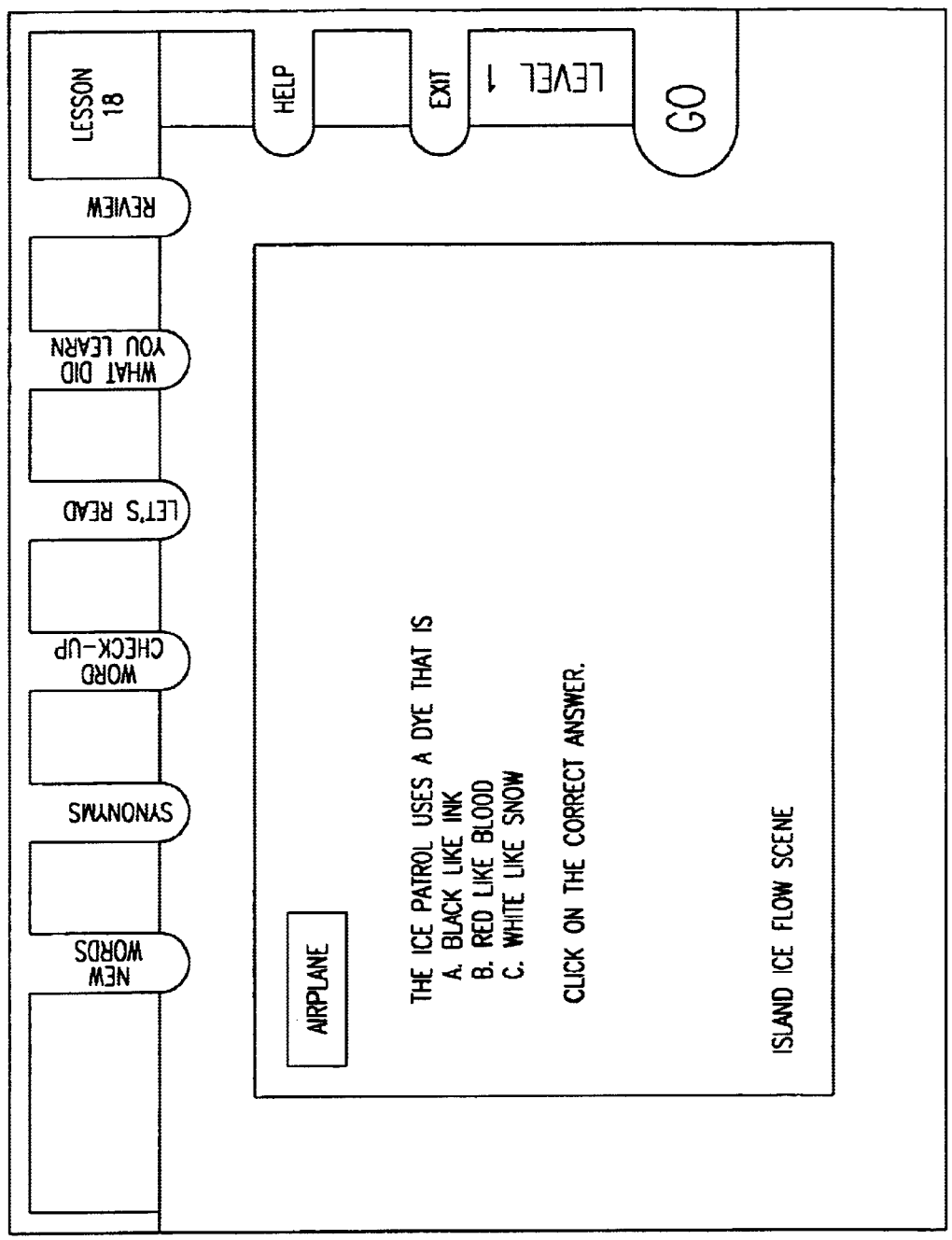
Figure 4E:
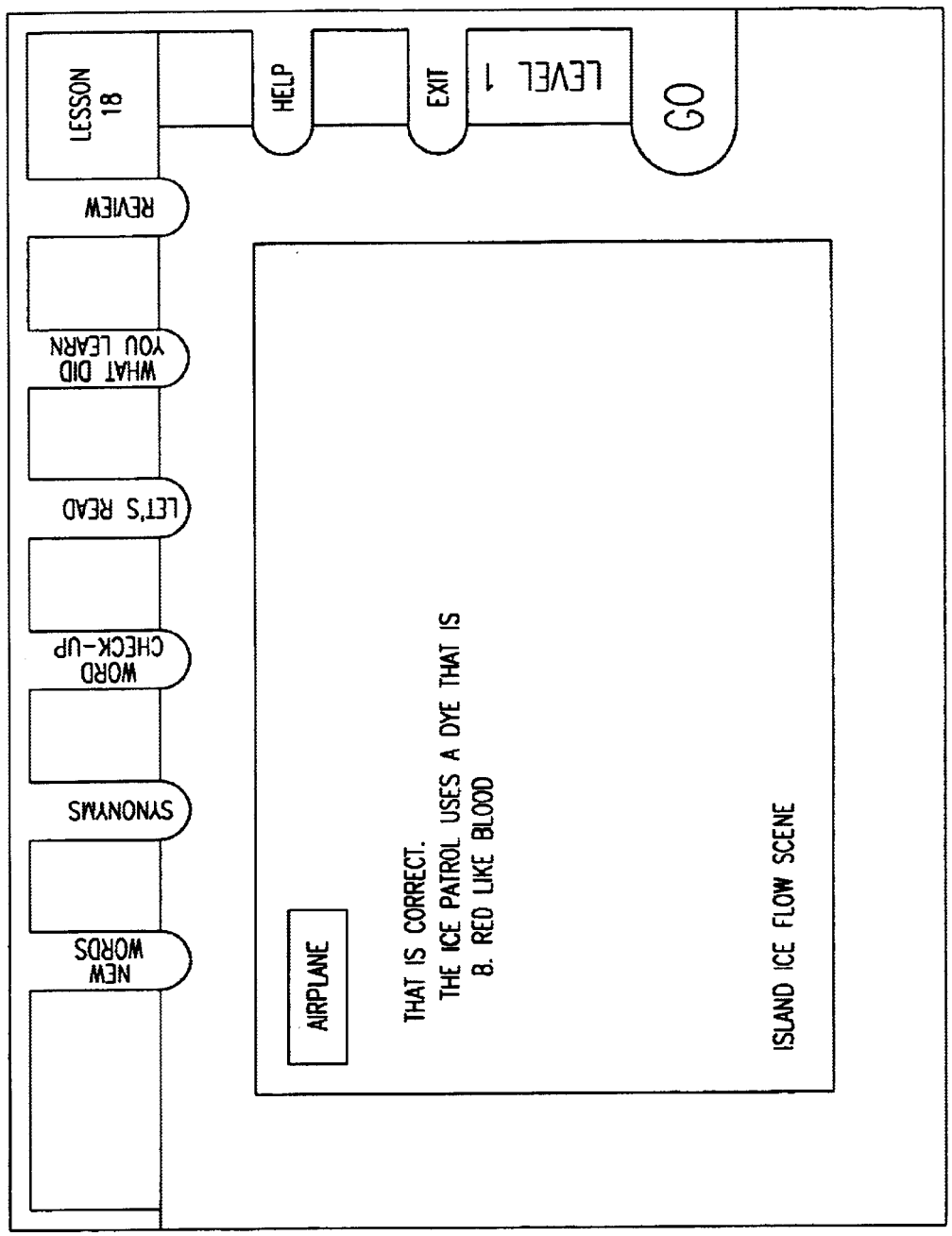
Figure 4F:
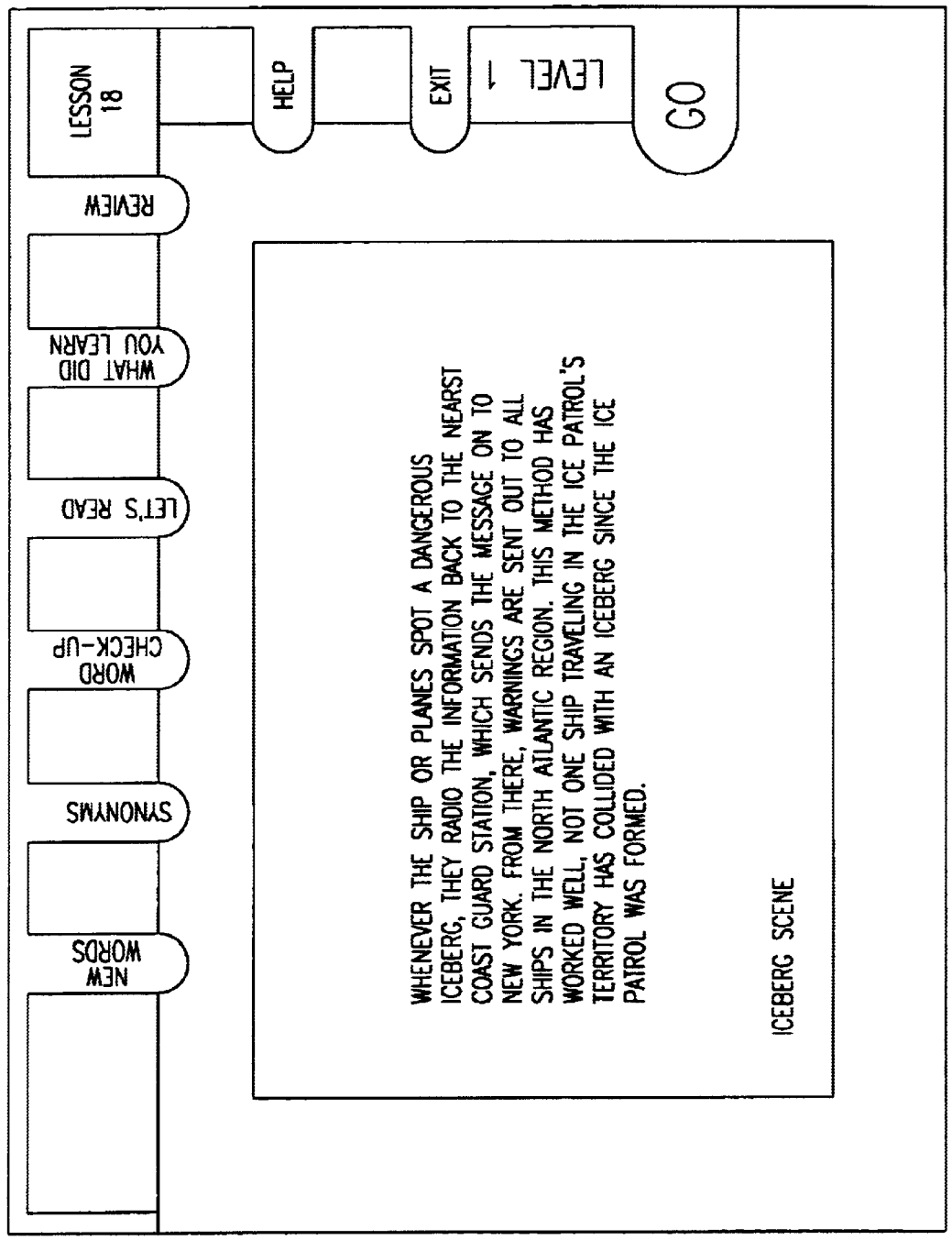
Figure 4G:
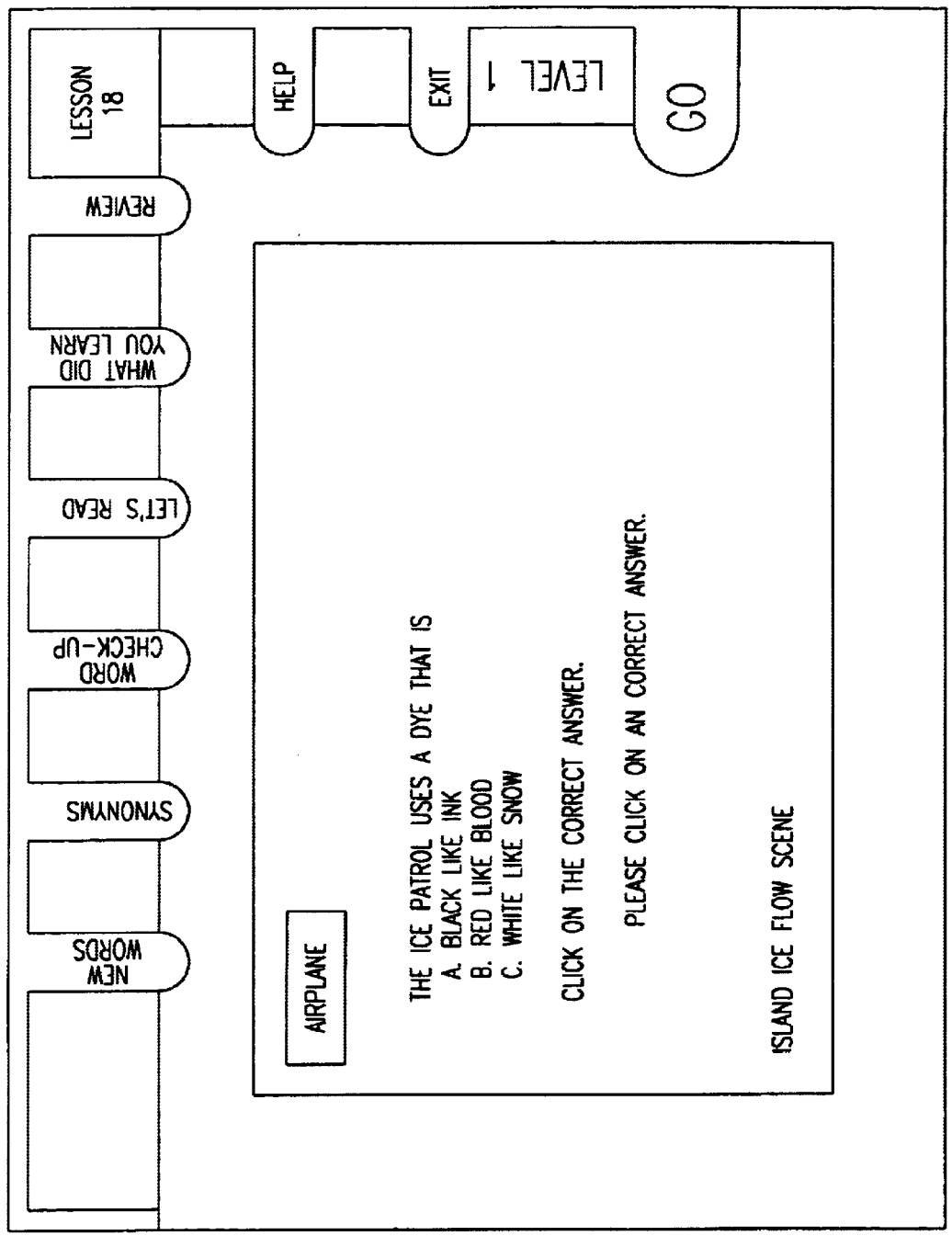
Figure 4H:
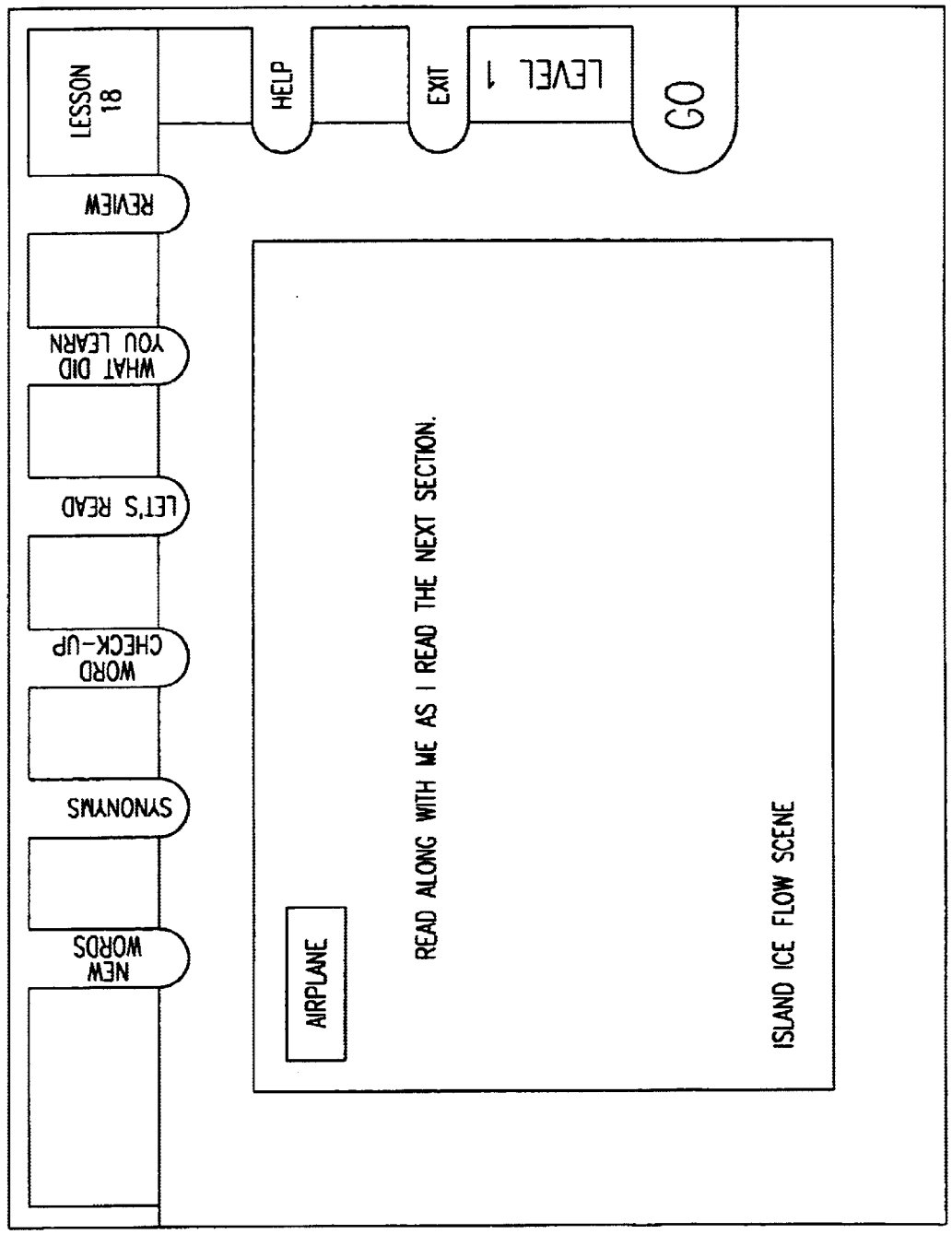
Figure 4L:
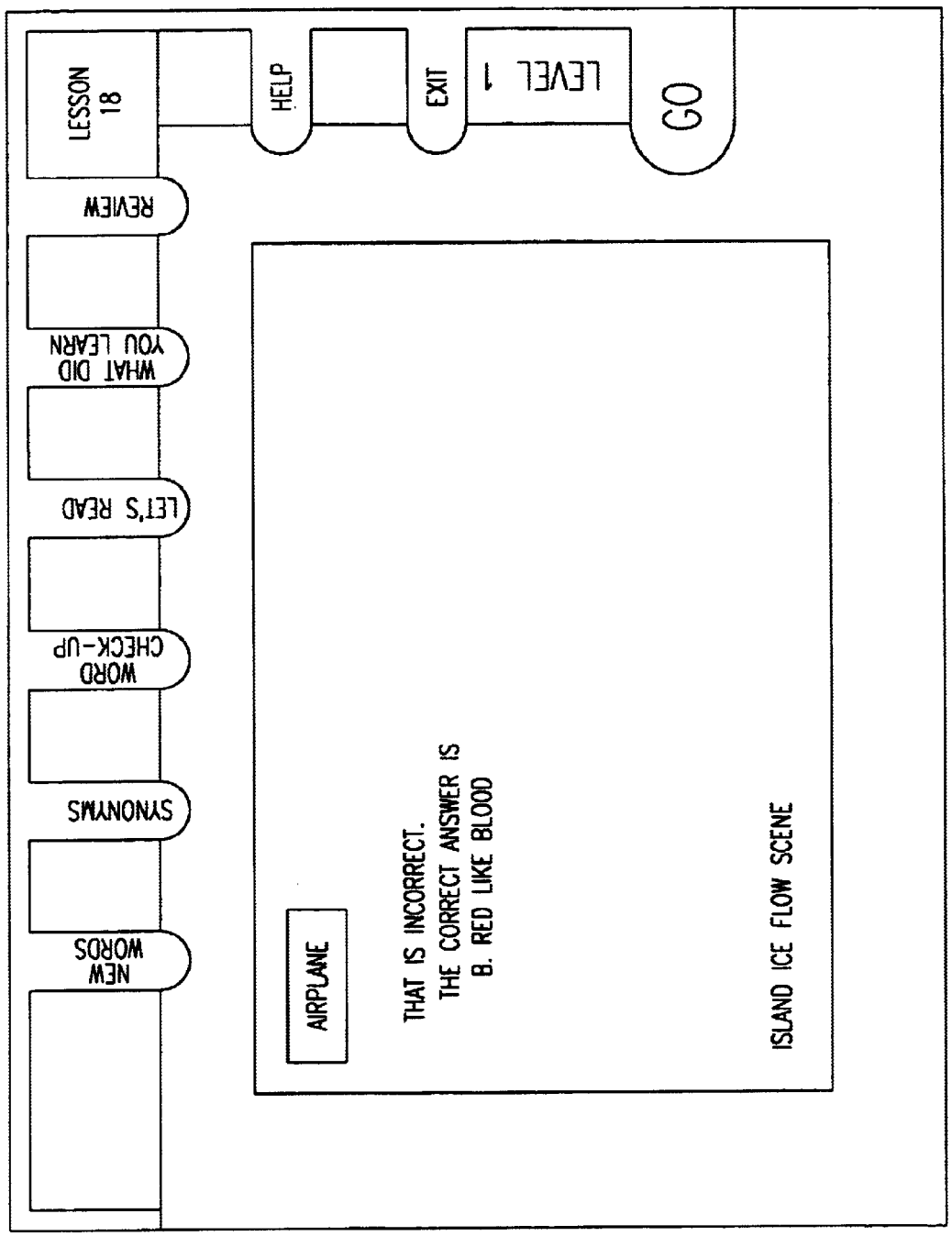
Figure 4J:
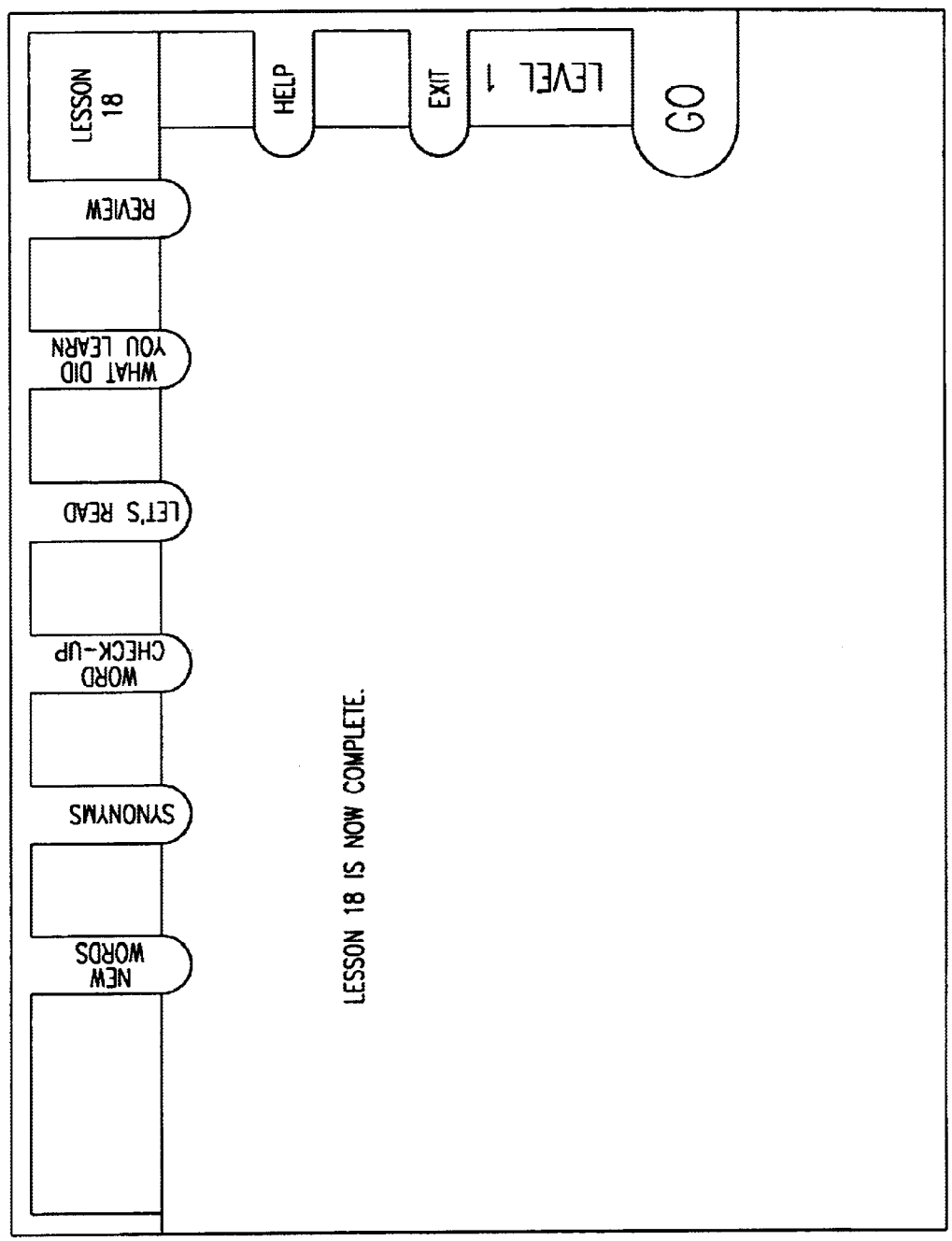
Figure 4K:
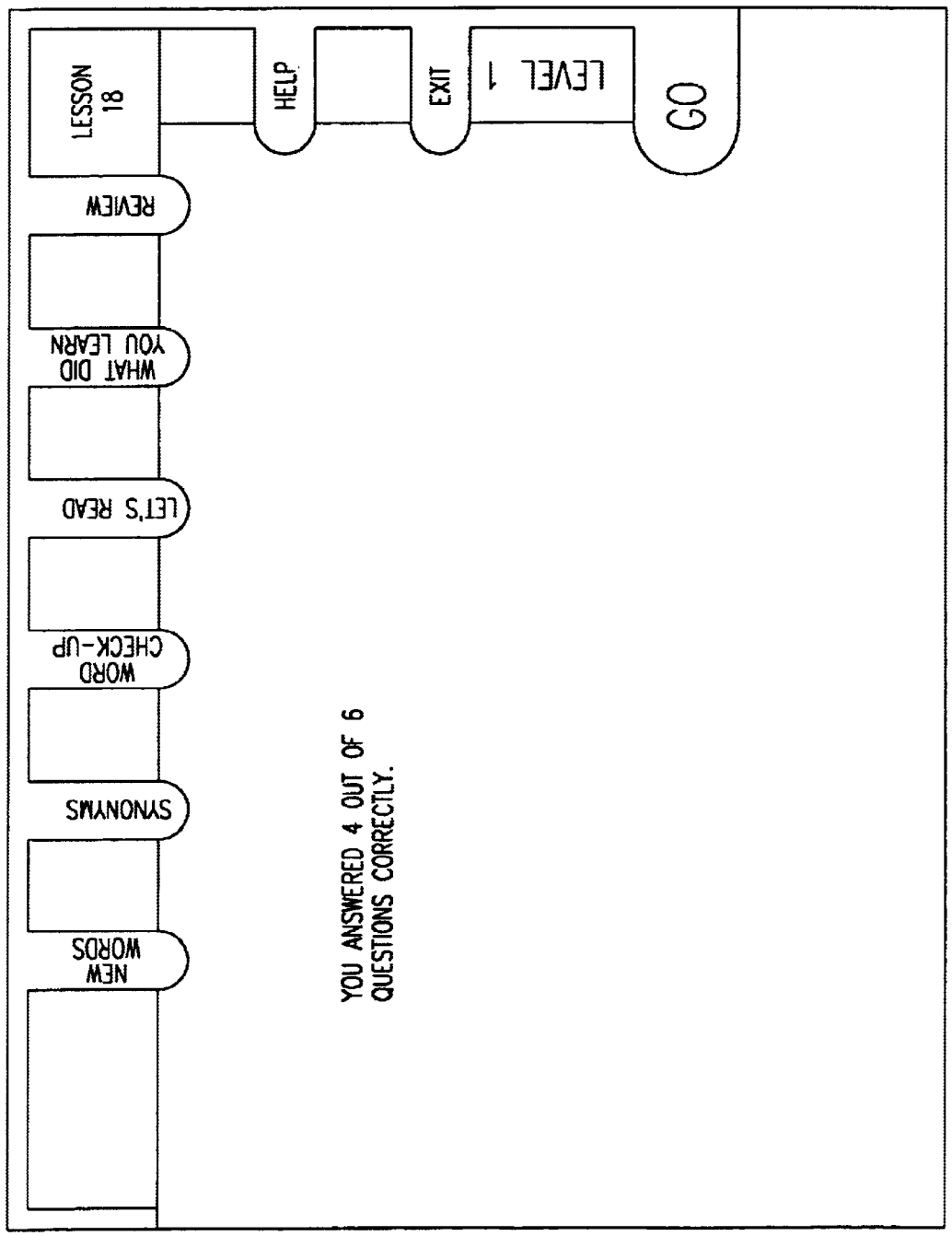
Figure 4L:
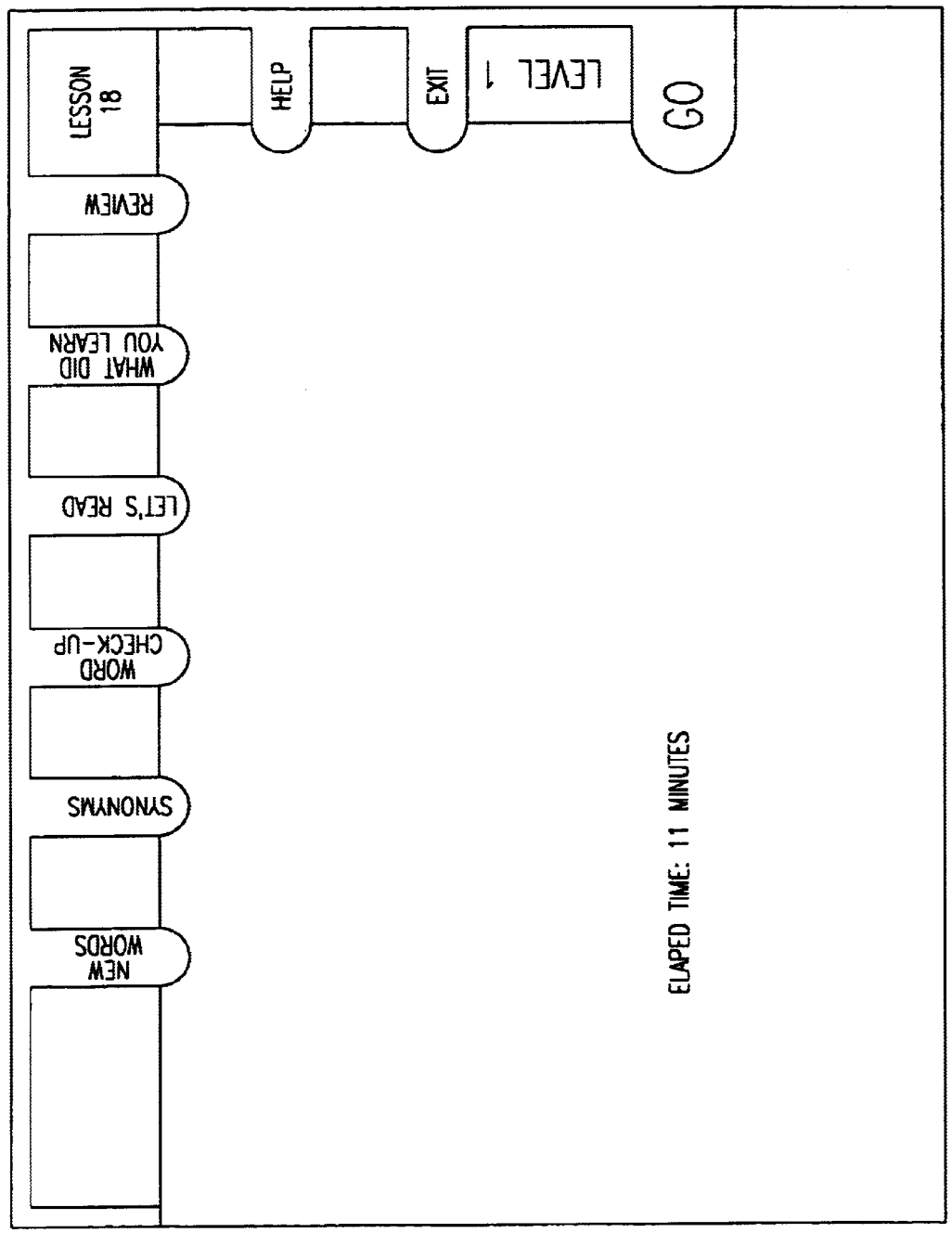
Figure 4M:
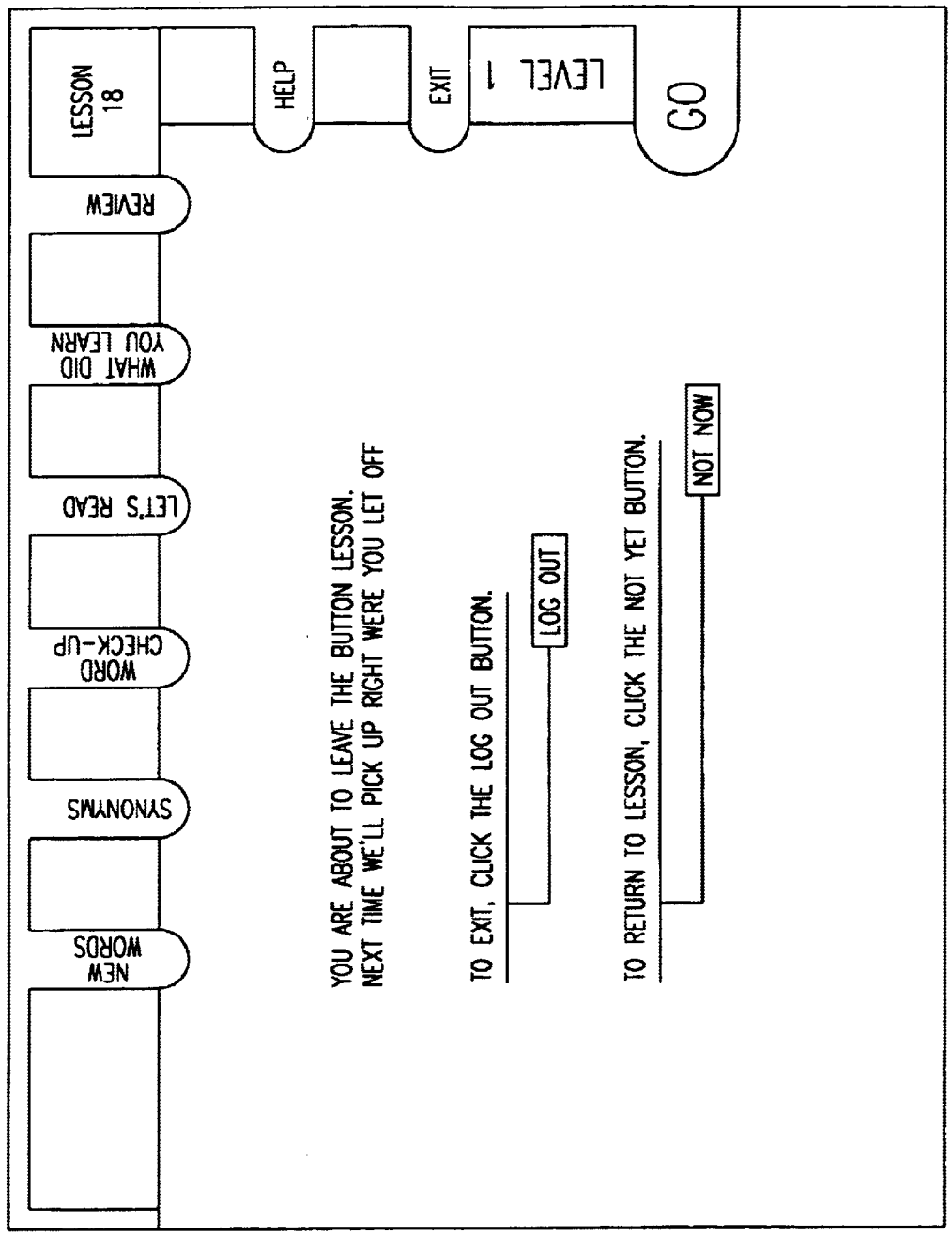
Figure 4N:
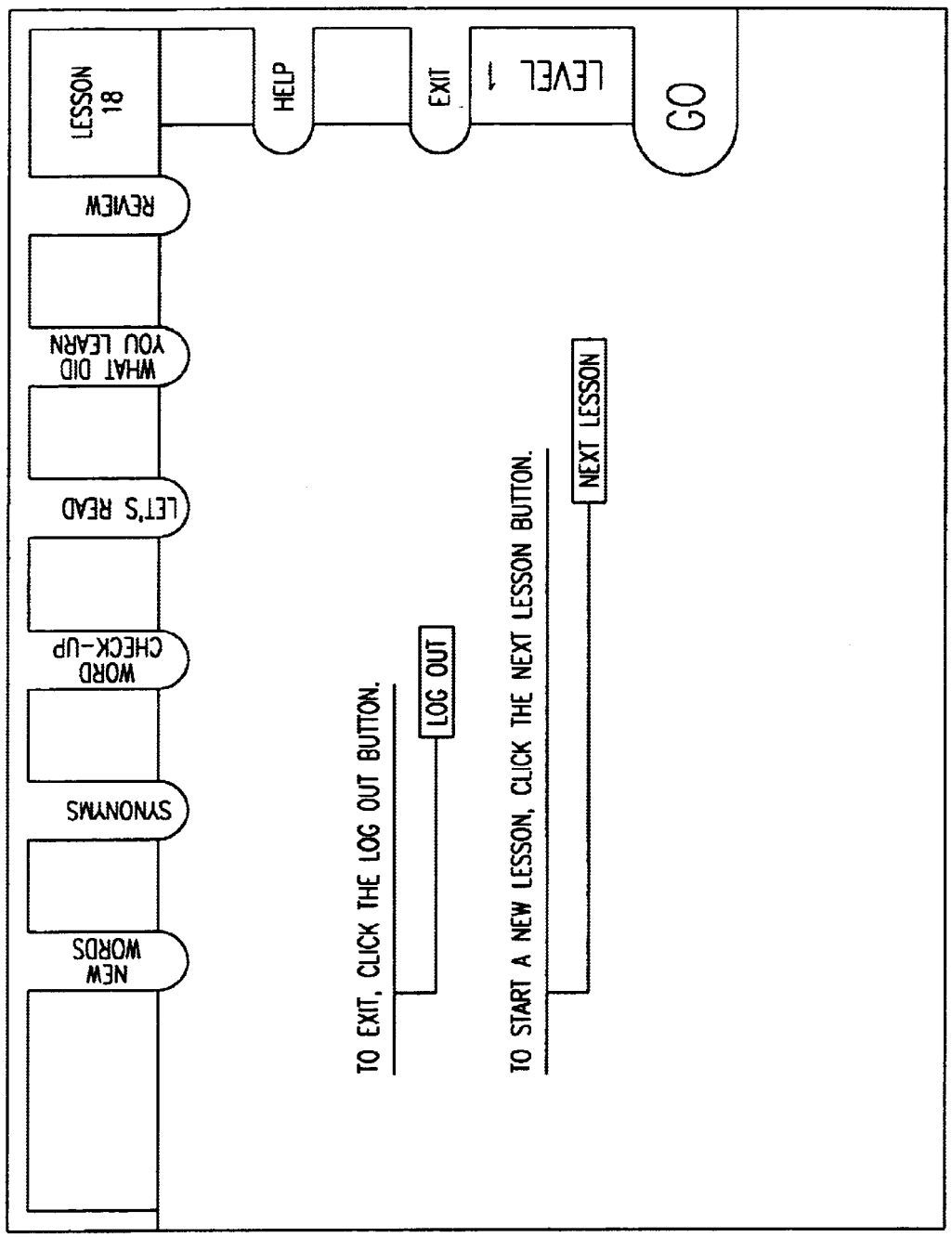
Figure 400:
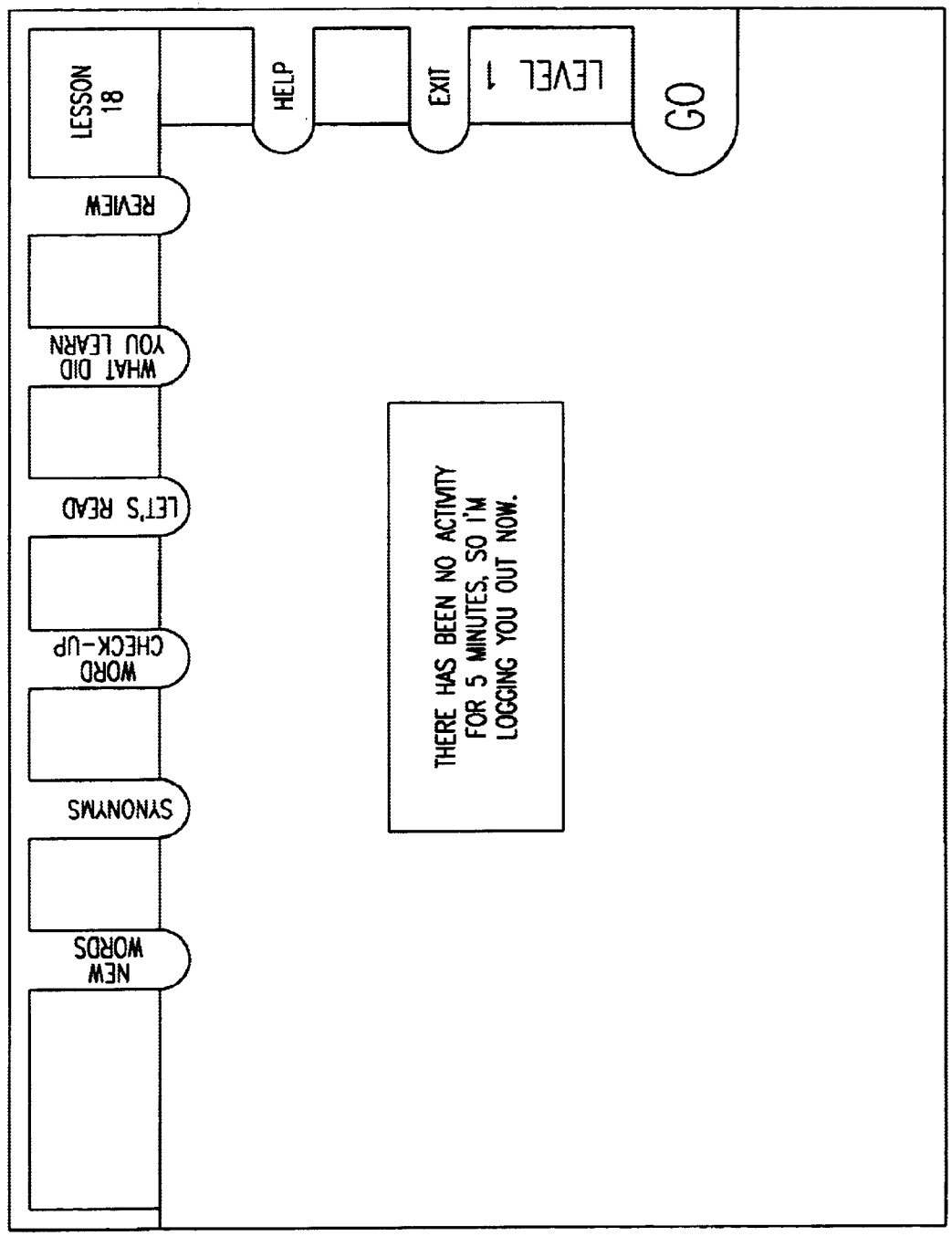

Instruction screen for reviewing words. Screenshot FIG. 4Z illustrates instructions for how to call for review are presented. It shows and verbally describes the interface procedure that summons the review. The review window shows the previously used meaning.

Reading Comprehension

Typical text presentation screen. According to the teachings of the present invention, the text of paragraphs in the reading comprehension section is dynamically presented. In the dynamic presentation the lines of text shown here are displayed one line at a time. The idea is to see and hear the text passage in its first display.

Reading Comprehension

Instructions as to change from VO to silent reading. After this instruction is presented, the screen clears and the text is displayed again, without the VO (silent reading). This is a pattern that is followed throughout the Reading Comprehension section. A passage is read to the student at the same time it is displayed. Then the student reads silently. According to the teachings of the present invention, there may be more than one passage presented before there is a test question. Moreover, in higher levels, there is gradually a cessation of VO altogether.

Reading Comprehension

A new passage is presented. Screenshot FIG. 4AA illustrates the program's transition to the silent passage section. After the student has clicked the GO button in FIG. 4AA, a passage is displayed for silent reading as shown in FIG. 4BB. FIG. 4CC is a screenshot illustrating that the boldface word "dye," which was used earlier in the program, is now clickable to summon the help windowoid shown in this screen. When the student clicks "dye", the definition window appears. It can be closed by clicking anywhere rather than requiring an OK/permission. This is a contextual, non modal dialog box designed for minimal impedance.

Reading Comprehension

Forward progress. In the invention, a highlighted GO button is animated following a VO. This allows for the rollover state of the GO button for continuing the lesson.

Reading Comprehension

Comprehension question. After one or more passages is (are) read and each is followed by silent reading, a comprehension question is displayed as shown in FIG. 4DD. The student responds to the VO posing the question. Each foil is read and the students indicate their choice by clicking on an answer.

Reading Comprehension

Comprehension question. If the answer is correct, as shown in FIG. 4EE, the program reinforces the correct answer and then presents the next passage as shown in FIG. 4FF. If the answer is incorrect, the material is presented again as shown in FIG. 4GG.

Reading Comprehension

VO and display of "Next Section". Upon successful completion of the previous passage and test question, this standard message appears to give direction and set the expectation of more material to follow as shown in FIG. 4HH.

Reading Comprehension

A prompt to choose an answer screen. Again, FIG. 4GG illustrates the correction loop screen that is displayed in response to a wrong answer. The red text appears to suggest making a choice.

Reading Comprehension

The correct answer. After making the program default number of attempts and failing the program will present the correct answer in this screen. The same is illustrated in screenshot FIG. 4II.

Reading Comprehension

The exit button. If a student wishes to exit the program, rolling over the Exit button will highlight it. Clicking on it will close the program. The same is shown in FIG. 4JJ.

End of Lesson Sequences

The lesson is now complete. The screen changes to indicate a change. Here is displays and the VO announces completion. In this section are all the various completion and exit/log out screens.

End of Lesson Sequences

Correct answer totals shown. In screenshot FIG. 4KK the student is presented with their correct answer totals. Screenshot FIG. 4KK displays the same and the VO announces completion. In this section are all the various completion and exit/log out screens.

End of Lesson/Logout

Elapsed Time. As shown in screenshot FIG. 4LL, an elapsed time is shown for the session and is recorded back to the database.

End of Lesson/Logout

Log out sequences. Screenshot FIG. 4MM informs the student when they are leaving the lesson and that they will resume from where they left off.

End of Lesson/Logout

Log out sequences. In screenshot 4NN the student is presented the choice of logging out or beginning a new lesson.

End of Lesson/Logout

Log out sequences. The log out button can be highlighted showing it in an active state. Clicking it will end the IndiVisual Reading program and return the student to the desktop.

End of Lesson/Logout

Log out sequences. This screen and the following four show an incomplete exit, that is, a student decides to go back to the program by selecting the NOT NOW button. The other choice is to Log out and that is shown, also.

End of Lesson//Logout

Log out sequences. This screen and the next show an incomplete exit, that is, a student decides to go back to the program by selecting the NOT NOW button. The other choice is to Log out and that is shown, also.

End of Lesson/Logout

Log out sequences. Again, as shown in FIG. 4NN, the student is presented the choice of logging out or beginning a new lesson.

End of Lesson/Logout

Time out screen. As shown in screenshot FIG. 4OO The program detects no activity so after a set interval of time, it logs itself out, saving the place where the student left off.

Writing

Writing is another subject matter adapted for use with the methodology described herein. This subject matter is more complicated because the nature of writing assessment is very subjective. Writing courses generally require teacher involvement to do final student evaluation. Using the writing program, the programs can significantly reduce the amount of administration and assessment now required of a teacher using traditional methods of instruction. The writing program can be adapted to deliver a typed version of the student's work, thus eliminating the student's handwriting itself as a factor in appraising the student's abilities.

Math

A successful math program separate reading comprehension skills from computational issues. A math program can be developed using the guidelines recommended by the International Math Association or other educational organization.

Science

The scope and sequence can be based on the national standards defined by The National Science Foundation or other educational organization. The program should include a significant amount of multimedia to enhance its instructional value. Many sections of this program will include manipulatives allowing the student to attempt experiments normally available only in a lab environment.

Life Skills

The Life Skills curricula are individualized and self-paced. The user freely navigates through the information and selects the areas of highest interest. The programs incorporate rich multimedia with strong user interface designed to deliver basic facts and valuable information that leave a lasting impression.

Sexually Transmitted Diseases (STD)

In one embodiment of the invention, the STD program covers six curable and three incurable sexually transmitted diseases, although the number and variety of subject matters is at the designer s discretion. The program is generally designed to be used by an individual learner. The person can select the disease they are interested in researching and get information about how the disease is contracted, treated and or can be prevented. The program can be adapted to give the user age-appropriate text, relevant statistics, video, multimedia enhancements, and voice over. It also will allow links to other web sites.

STD Intro Sequence

Splash Screen Animation

A Splash Screen Animation begins all IndiVisual productions. The identity element is an animated sequence that begins with the background yellow shape, the hand, with a side to side waving motion, and sound effect followed by the appearance of the eye accompanied by a blink and sound effect, followed by the appearance of the ear with a sound effect, concluded with appearance of name and three highlighted text elements.

Lead Animation Sequence

The elements of the logo map to wireframe models of a male and female moving into position for a kiss. The sequence begins with a wireframe, progresses to filled and modeled figures and ends with a photograph of a couple leaning toward each other for a kiss.

End of Animation Sequence

The kissing couple is replaced by a series of faces accompanied by VO saying things like: "She looked clean." "I was drunk." "I only did it once . . . " etc. These faces are taken from the video sections and are reused in the Stories section as buttons for calling the videos.

Initial VO and Text Display

A series of screens showing sequential presentation of the intro to the program. This method presents the information in easily read chunks and helps keep focus. It also introduces the student to a method used throughout the presentation to break up larger texts to enhance readability.

Main Interface/Navigational Screen

Key screen for access to entire program. Following the intro VO and text, the program segues to this main navigational interface. The same is shown in FIG. 5A. This is an animated sequence that wipes the text clear, replacing it with the all-gender symbol. The arrow device rotates about the circle as shown the following series. In the series shown, the student selects each of the choices and from each a series of screens is shown showing the hierarchy of choice in this interface. In one embodiment, text that changes from yellow to orange as the mouse passes over it shows its highlighted, or rollover state. The student can click on either the round button or the text itself to go to the subordinate category.

Main Navigation Device

Rolling over the label General highlights the text and clicking either the button or the text will reveal the two subtopics, Intro and Prevention as also shown in FIG. 5A. In the following screens the rotation of the arrow. Notice the position of the cursor in the last screen.

Curable

Figure 5B:
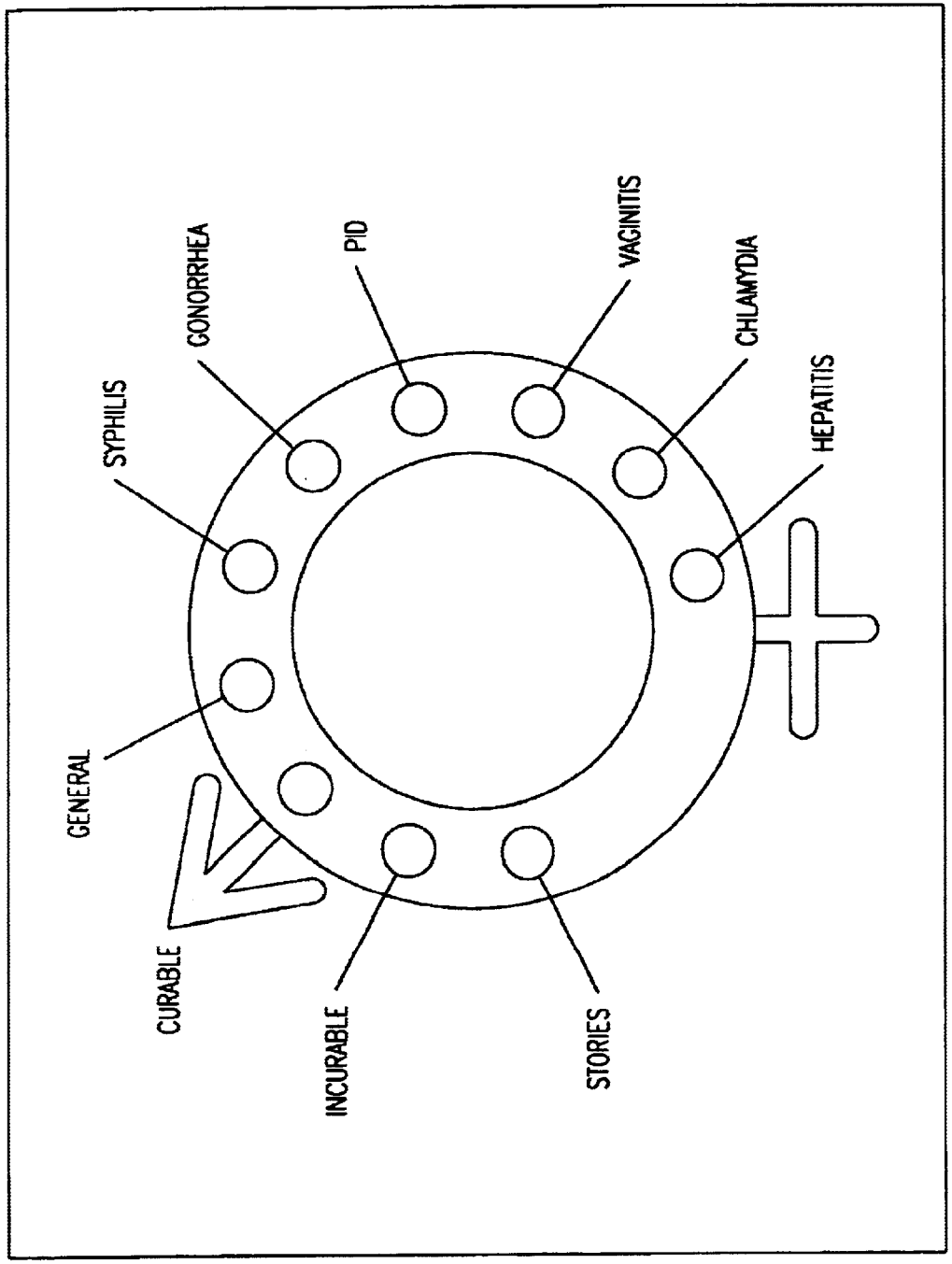
FIGS. 5A–5HH is a series of screenshots illustrating an operational embodiment of a software STD program according to the teachings of the present invention.

FIG. 5B is a screenshot illustrating the program s behavior when a student selects on the "Curable" topic. As shown in FIG. 5B, slicking on Curable rotates the arrow to this topic and when selected the names of the diseases appear on the right-hand side of the circle device. Again, the highlighted rollover effect shows where the student is going.

Incurable

Figure 5C:
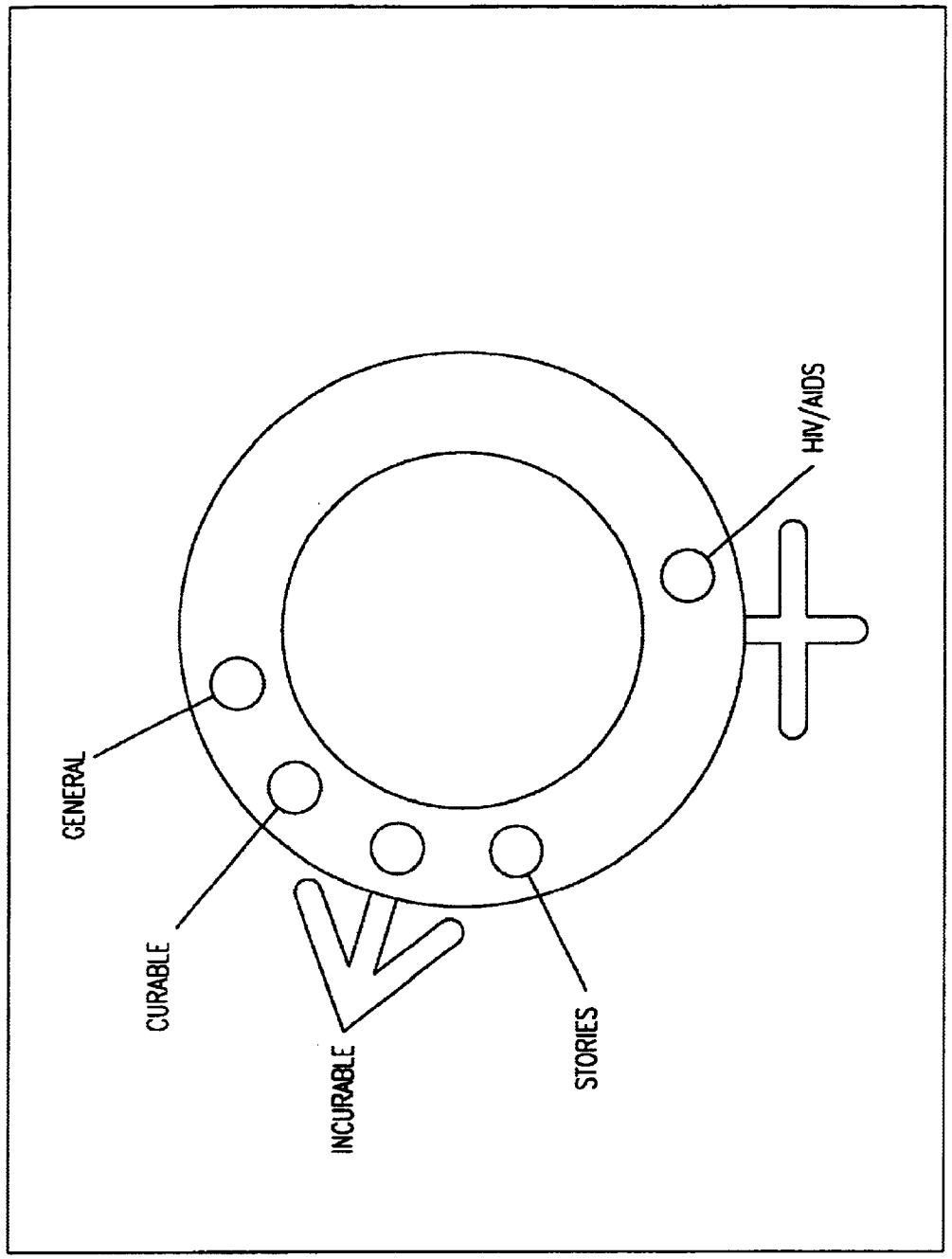

FIG. 5C is a screenshot illustrating the program s behavior when a student selects on the "Incurable" topic. As shown in FIG. 5C, selecting the Incurable item rotates the arrow to Incurable and on the other side of the device the incurable diseases are shown. The screens show the various highlights/rollover states of the buttons.

Stories Selection Sequence

Figure 5D:
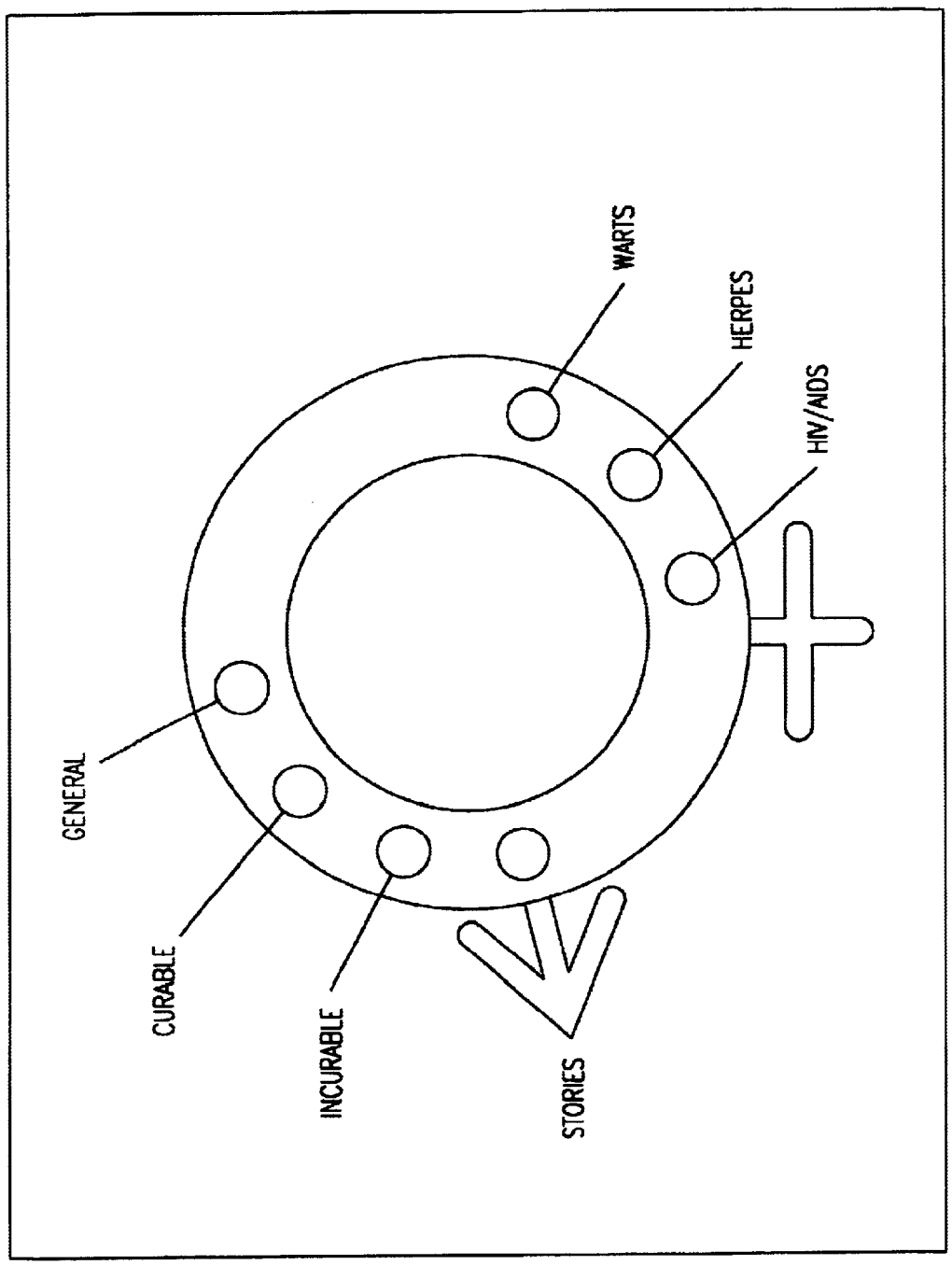

FIG. 5D is a screenshot illustrating the program's behavior when a student selects on the "Stories" topic. Clicking the Stories text or button calls up a sequence of screens presenting the videos of cases culled from clinic records. These are the same stories found under each disease.

Stories Continued

Figure 5E:
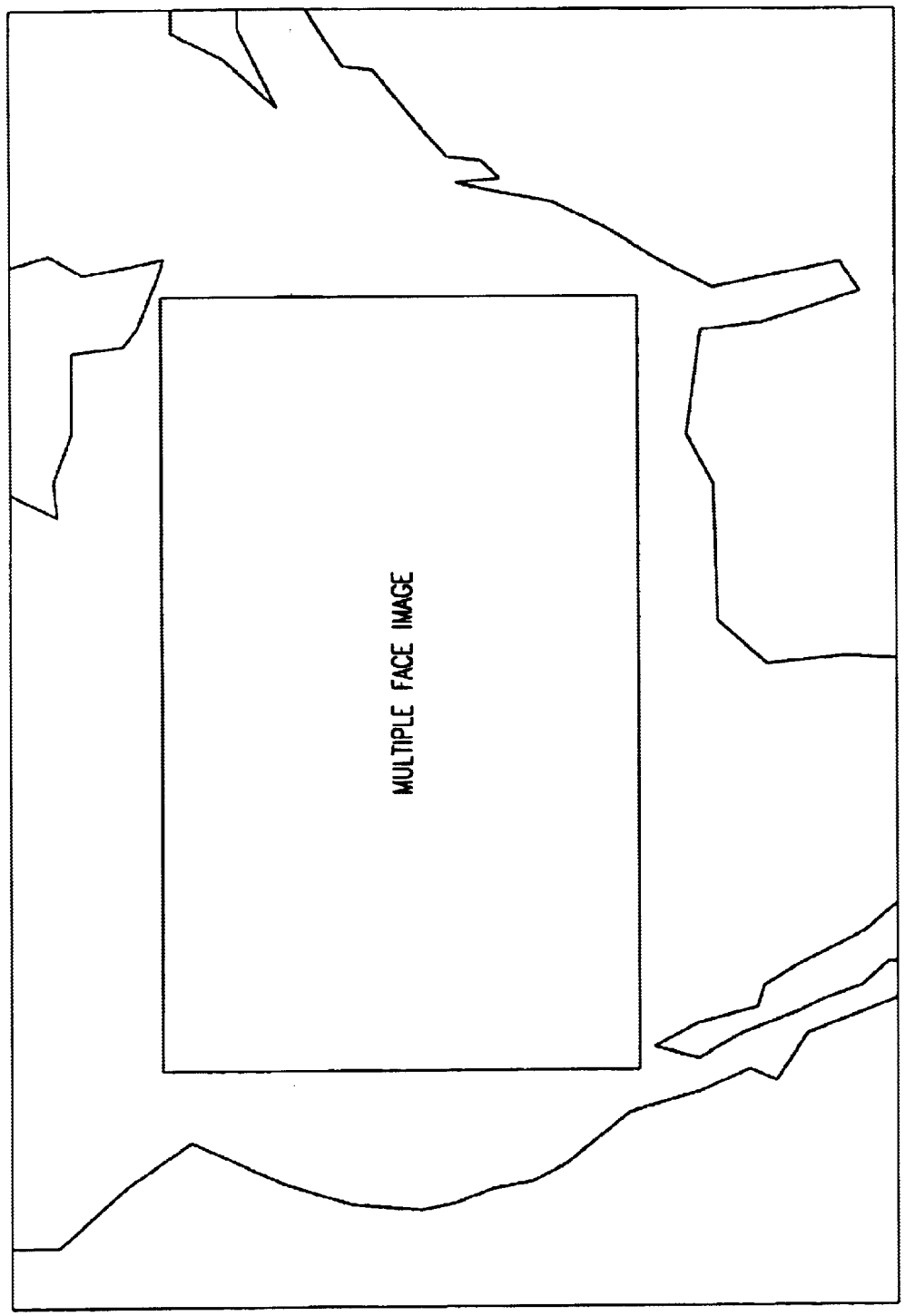
Figure 5F:
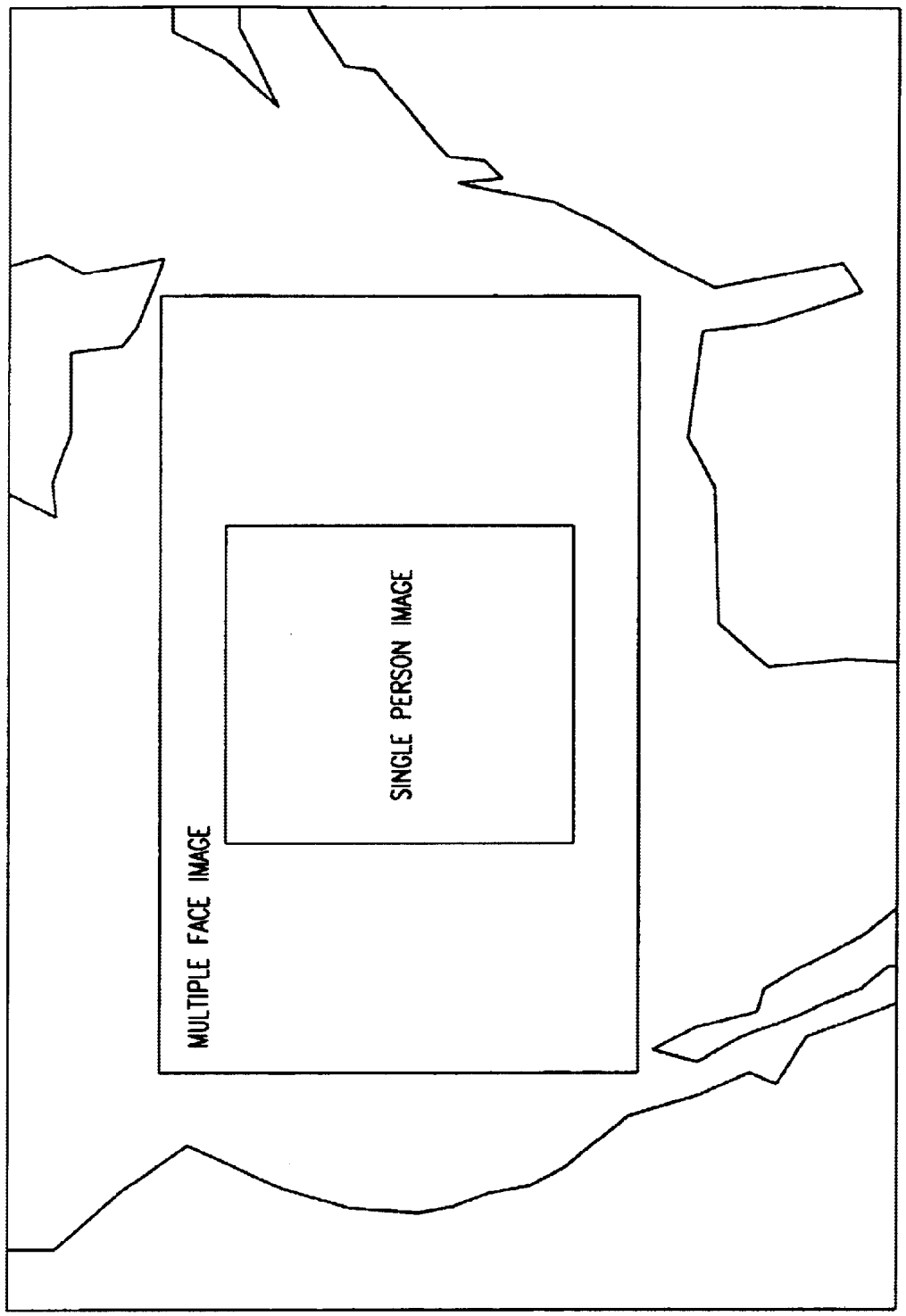
Figure 5G:
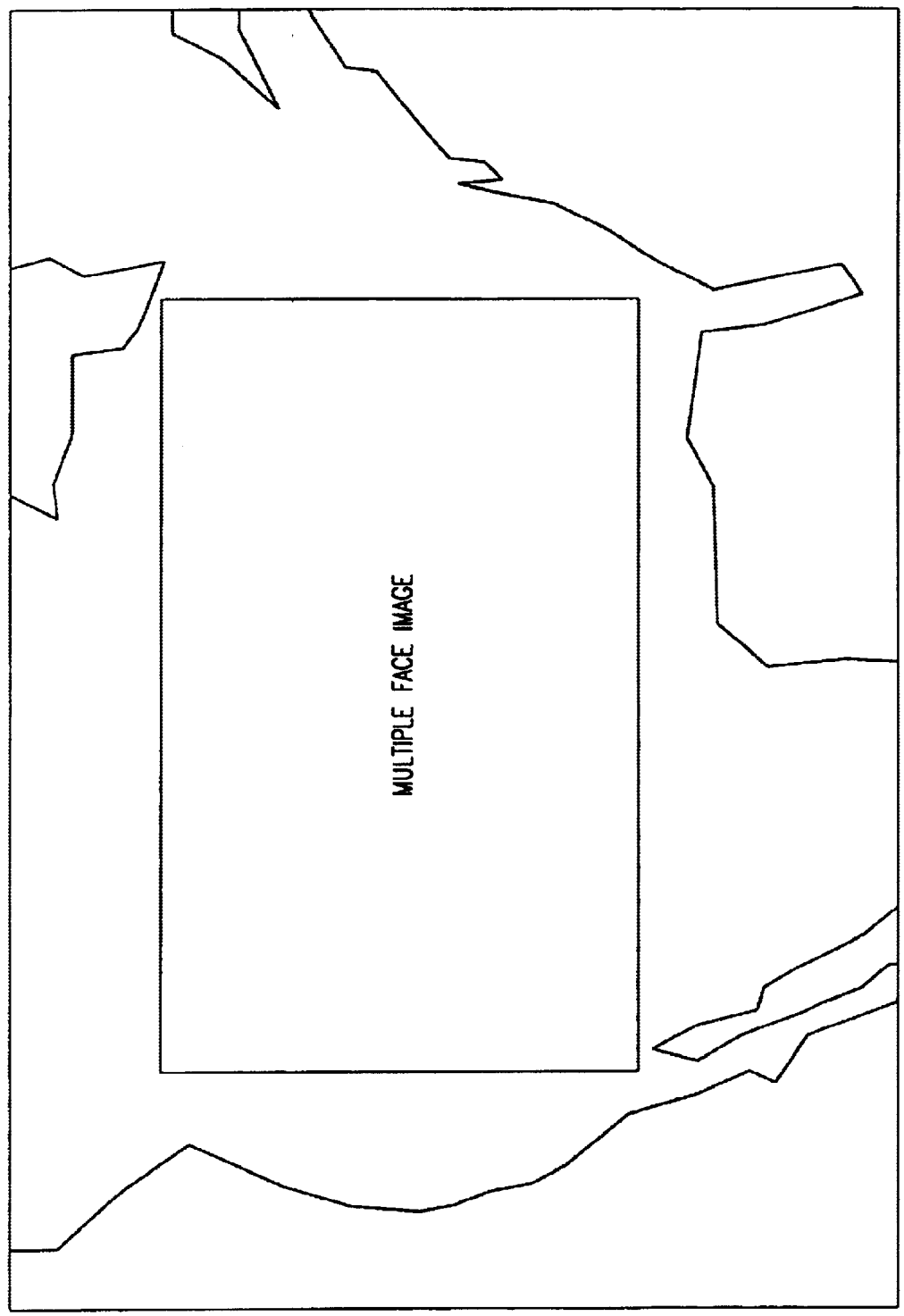
Figure 5H:
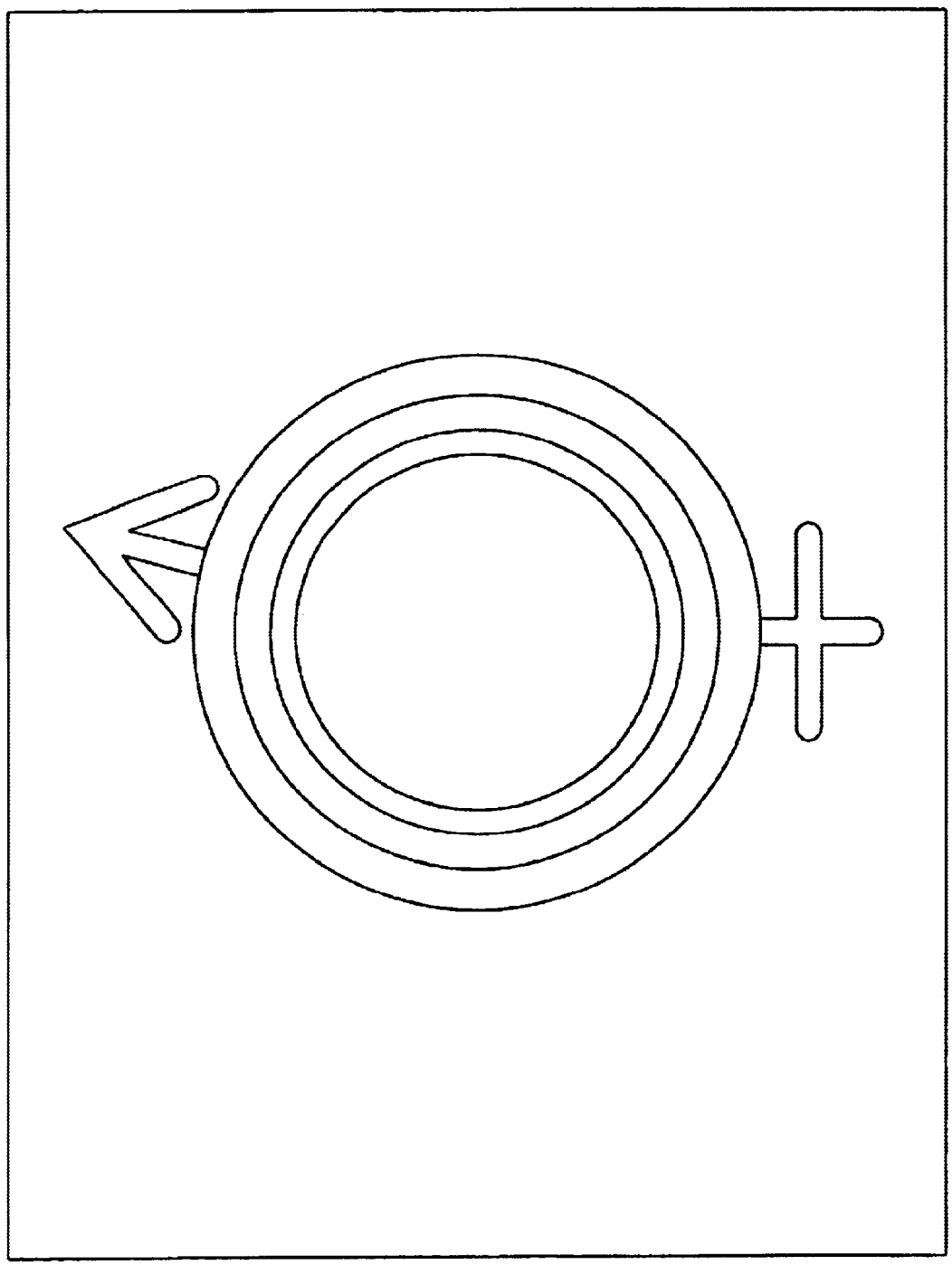
Figure 51:
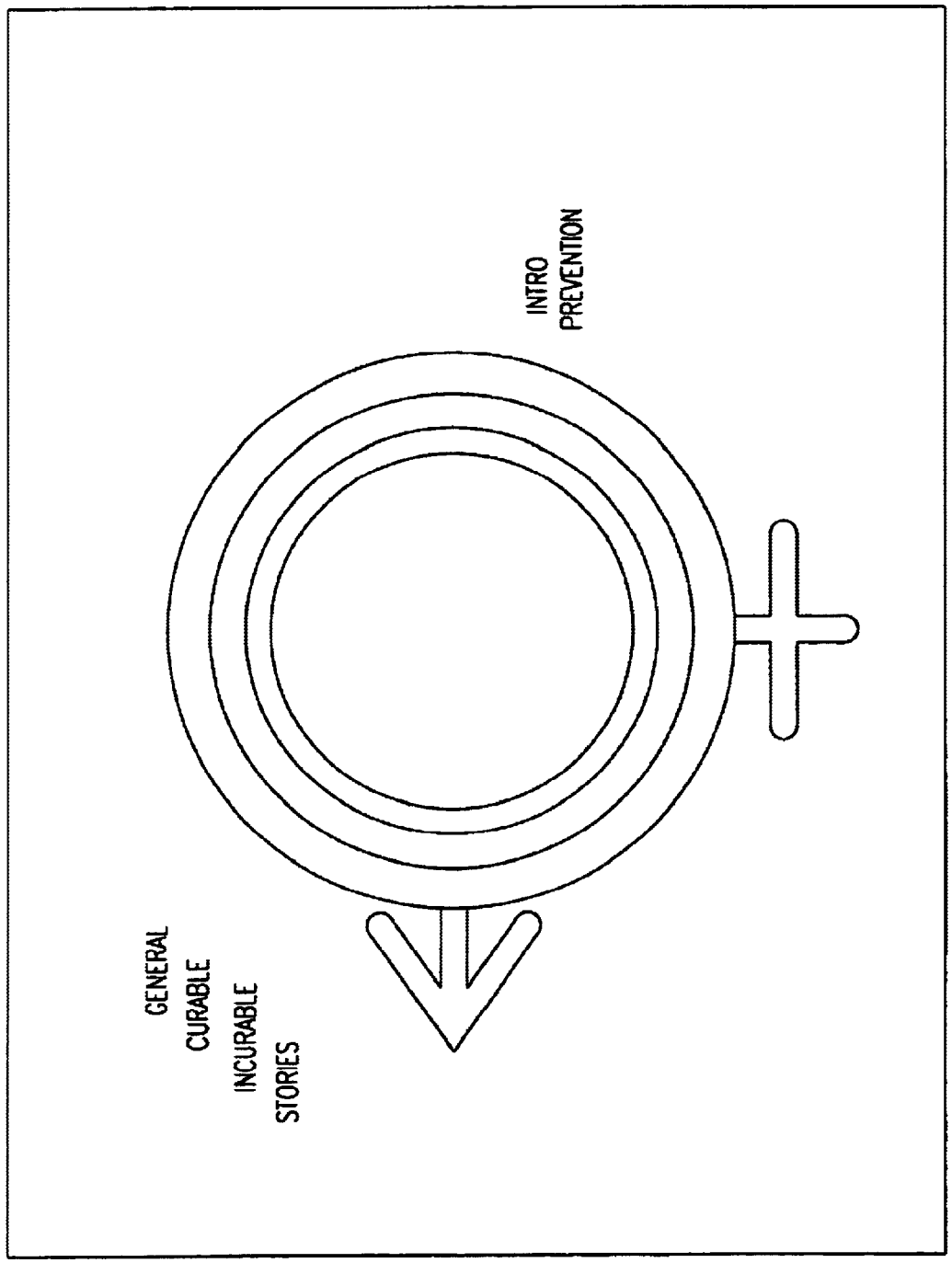

In Screenshot FIG. 5E, the sequence shows how the faces are highlighted as the mouse rolls over them. Screenshot FIG. 5F is an illustration showing a video story playing associated with the selected face. There are also popup labels for the faces, and within the video window are volume controls for sound level. The back button highlights when rolled over to take you back to the main window as shown to the left as shown in FIG. 5G.

Animation of Selection Sequence

Figure 5J:
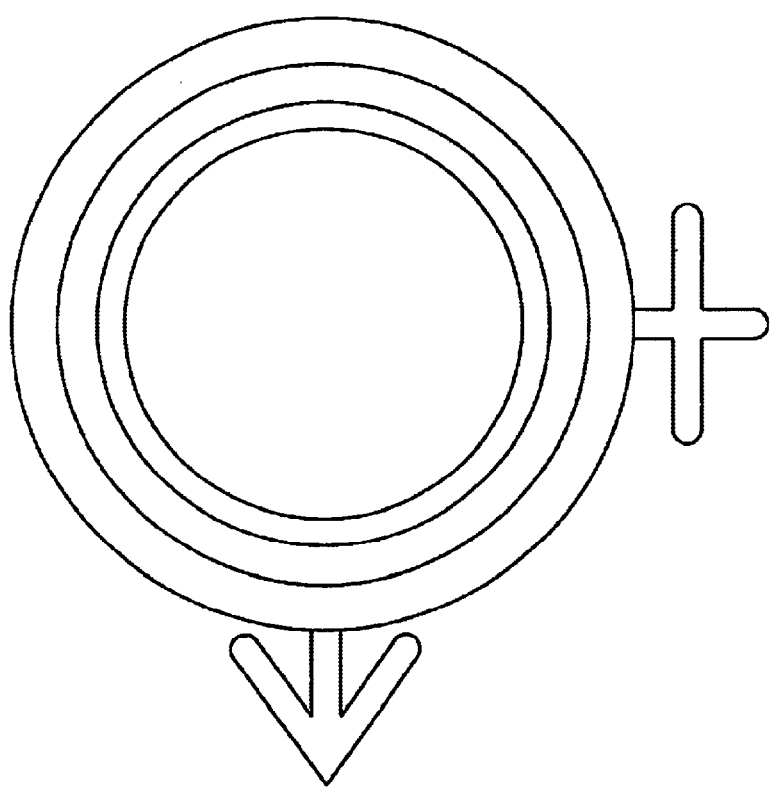

In screenshot FIGS. 5F through 5I, the sequence shows how the main device animates from the center of the screen to the lower right corner and at the same time the hierarchy labels, General and Intro, are moving towards the upper left corner to define the standard transition to the main information screens as shown in the last screen. When this screen displays, a VO reads the lead sentence for each section as shown in FIG. 5J.

Topic Display Sequences

Menus and Displays

Figure 5K:
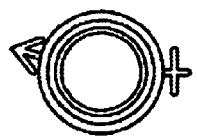
Figure 5L:
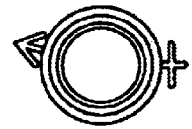
Figure 5M:
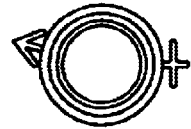

The main menu is assembled on the left. The next set of screens show a variety of basic navigational schemes. One is a set of pull-down menus initiated by clicking the red button. This is illustrated in FIG. 5K. FIG. 5L shows text display using the More button, and where the copy runs long, a Next button is added as shown in FIG. 5M. The screenshot in FIG. 5N shows hot text and the drop-down menu from under the Intro head giving the student immediate navigation/access to all other topics. The color scheme reflects the background colors for each section.

Menus and Displays

Figure 5P:
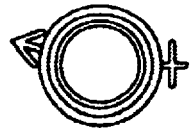

Hot text call-up sequence. According to the teachings of the present invention, when the cursor is positioned over hot text, as shown in FIG. O, expanded information is provided to the student in the form of a popup as shown in FIG. 5P. The expanded instructional information is provided in the popup along with a VO. When the student moves the cursor over hot text inside the popup another layer of additional instructional information relevant to the topic is provided to the student. This will call a text/VO box, anatomy, or disease images as shown in subsequent screenshots.

Call Outs and Nested Call Outs

Anatomical Illustration Call Outs

Figure 5Q:
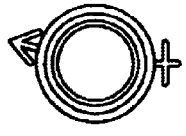
Figure 5S:
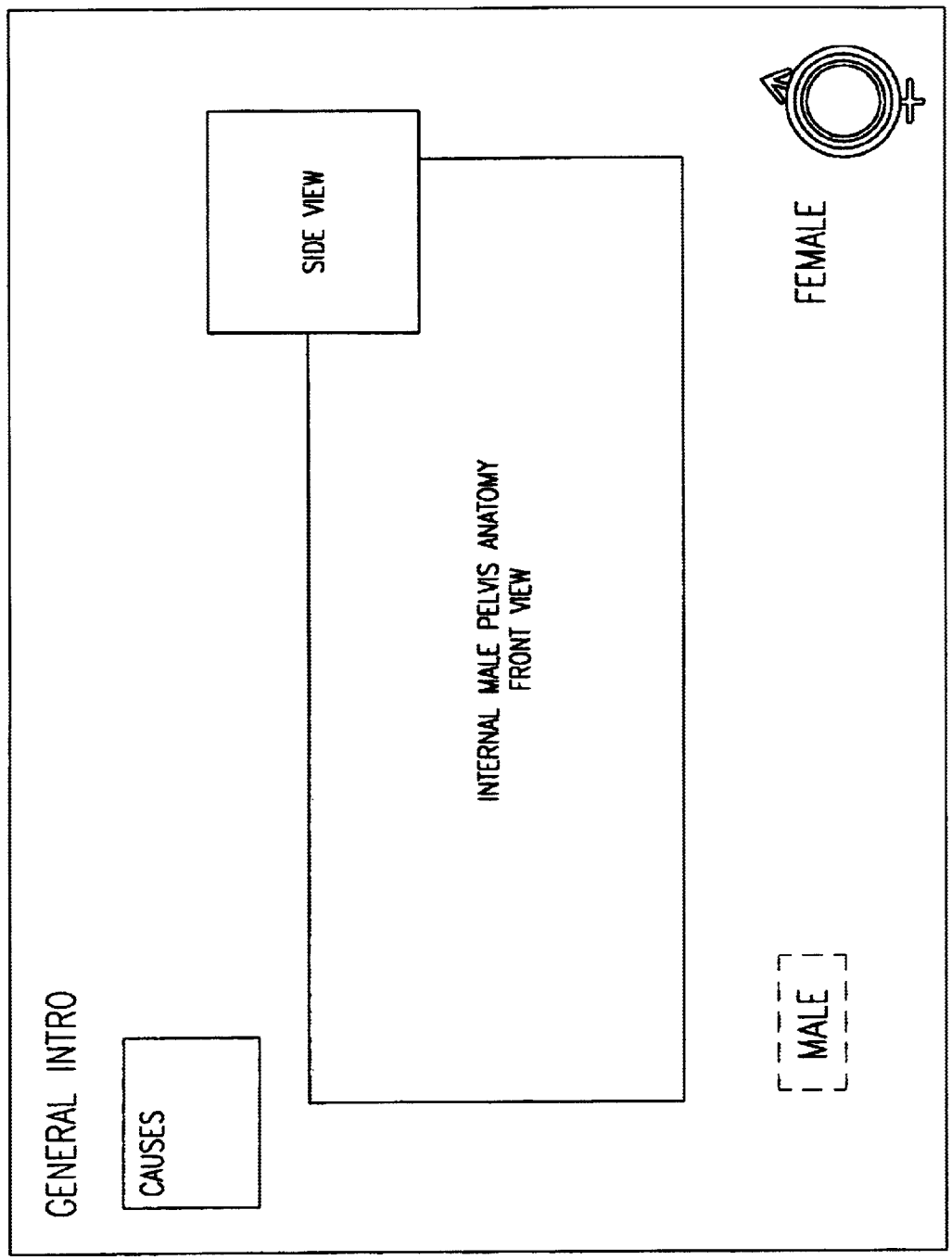
Figure 5T:
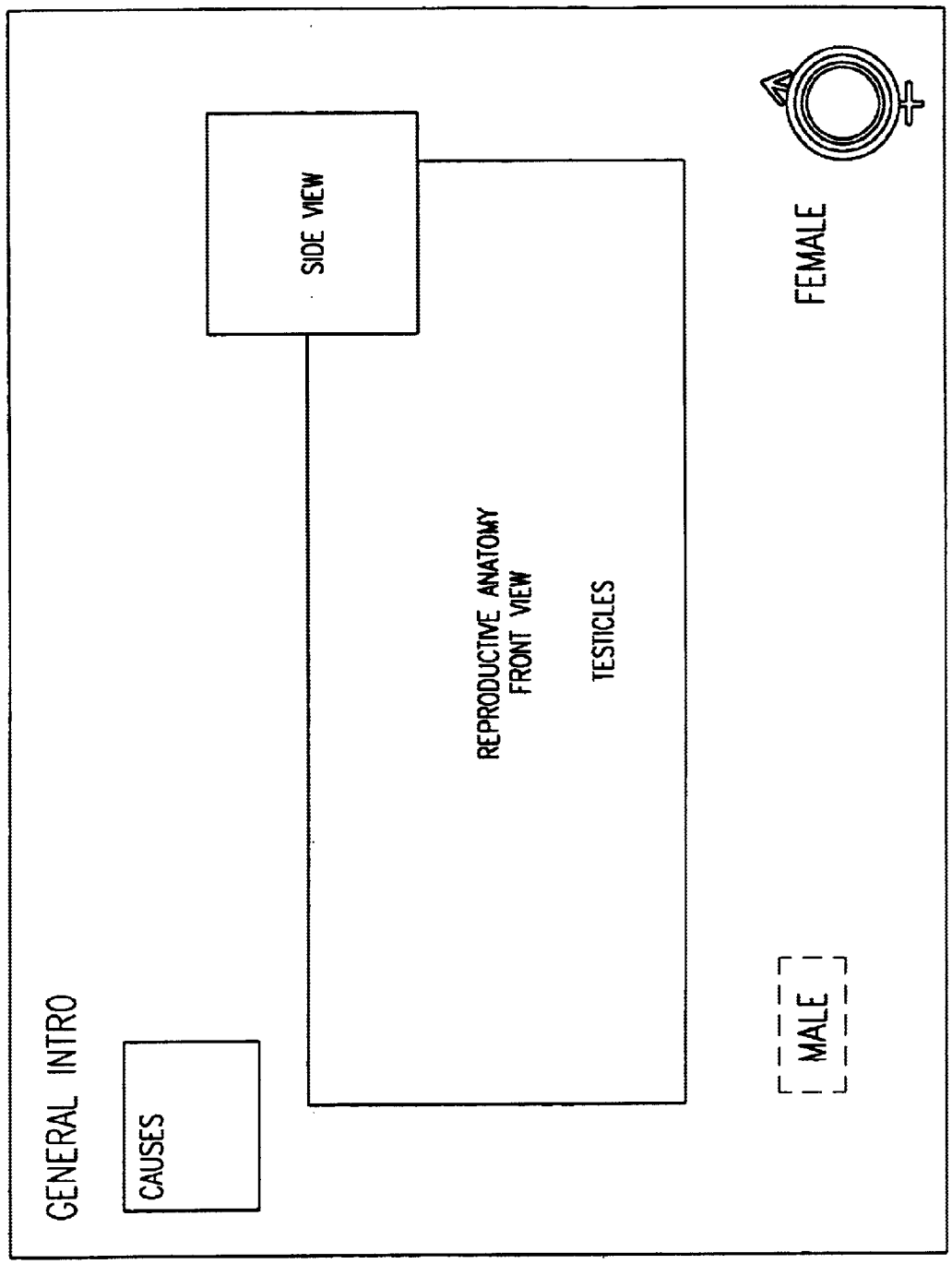
Figure 5U:
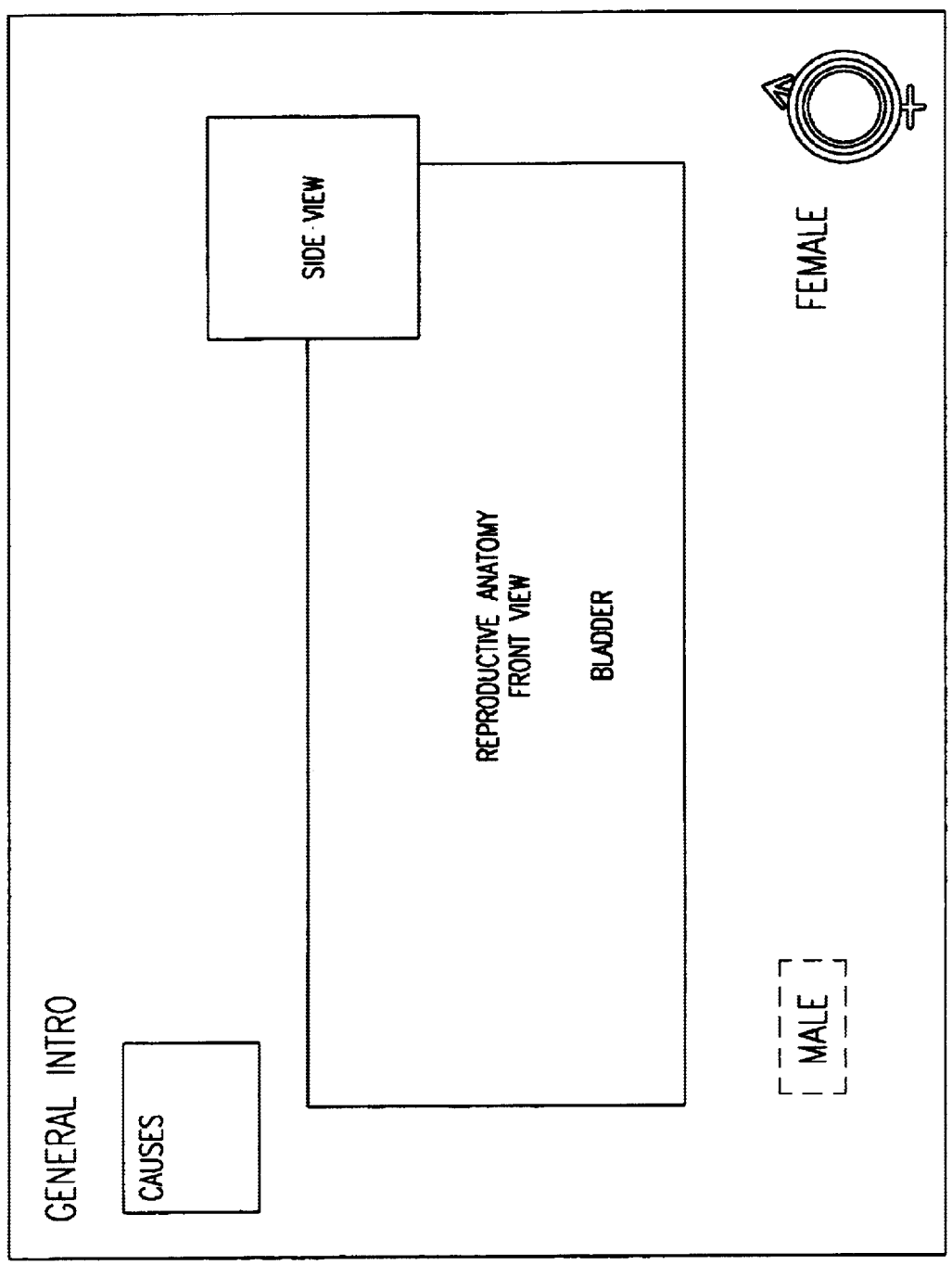

This sequence shows highlighting and labeling of anatomy. As stated above, when the cursor over hot text inside a popup text box (with VO) another layer of instructional information relevant to the topic is presented to the student. Screenshot FIG. 5Q illustrates the actuation of such hot text within the popup text box. In this case, the hot text chosen pertained to the female genitourinary system. FIG. 5R is a screenshot illustrating the actuation of hot text chosen pertaining to the male genitourinary system. The anatomical model called is context sensitive. Screenshot FIGS. 5R through 5U further illustrates that as the student rolls over any internal organ, it highlights in both the front and sagittal views. The text at the bottom of the screen selects Male or Female. Text boxes appear as the student clicks on a particular organ. The background is blurred to enhance the foreground image. The standard navigational idiom of clicking anywhere to close the illustration is in effect here.

Returning to Main Navigation Screen

This sequence shows use of all-gender device to return. Clicking the all-gender icon in the lower right corner animates back to the middle of the screen from which another choice is made.

Disease Choice/Video Interface

Returning to Main Navigation Screen

Figure 5V:
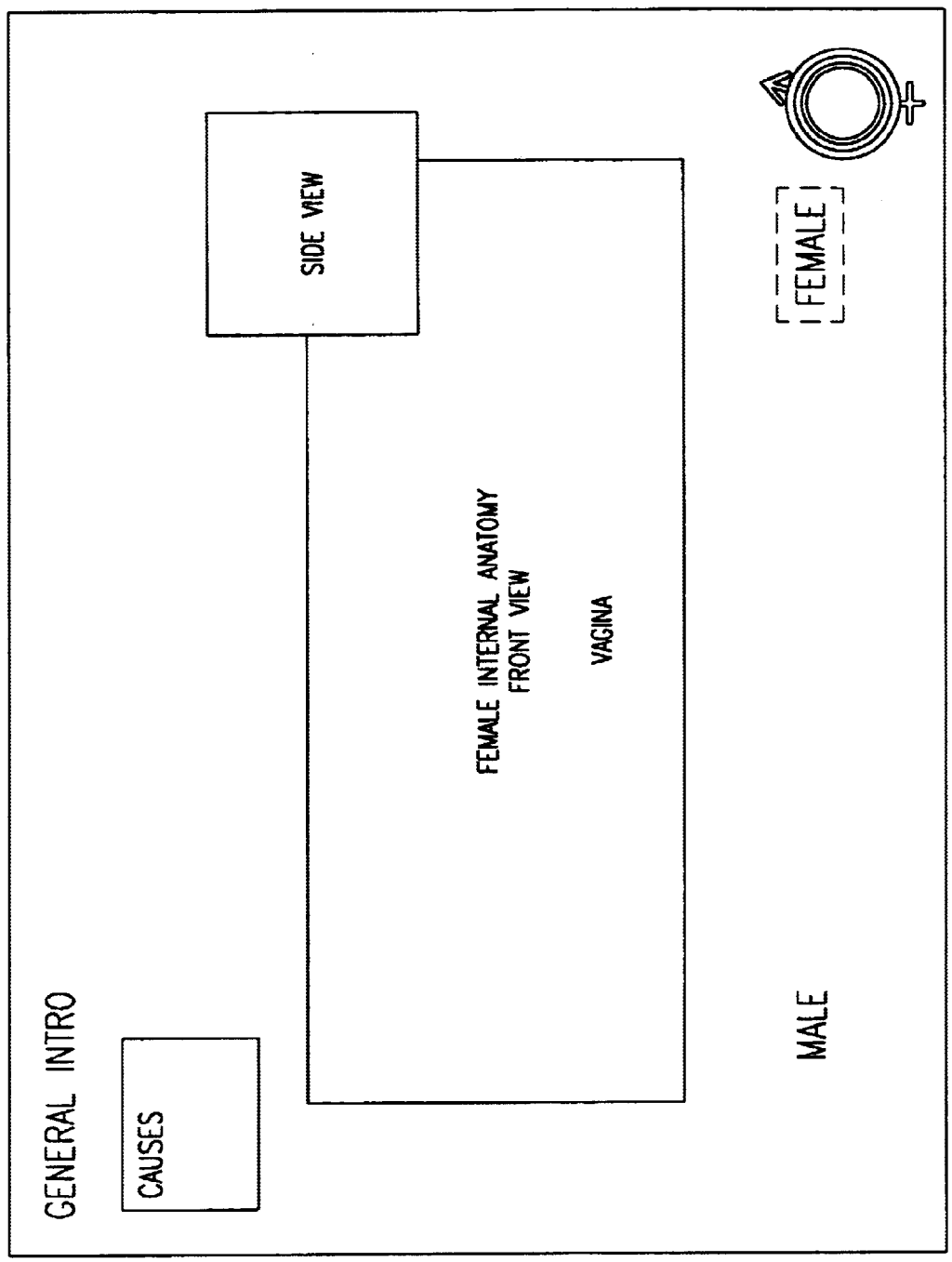
Figure 5W:
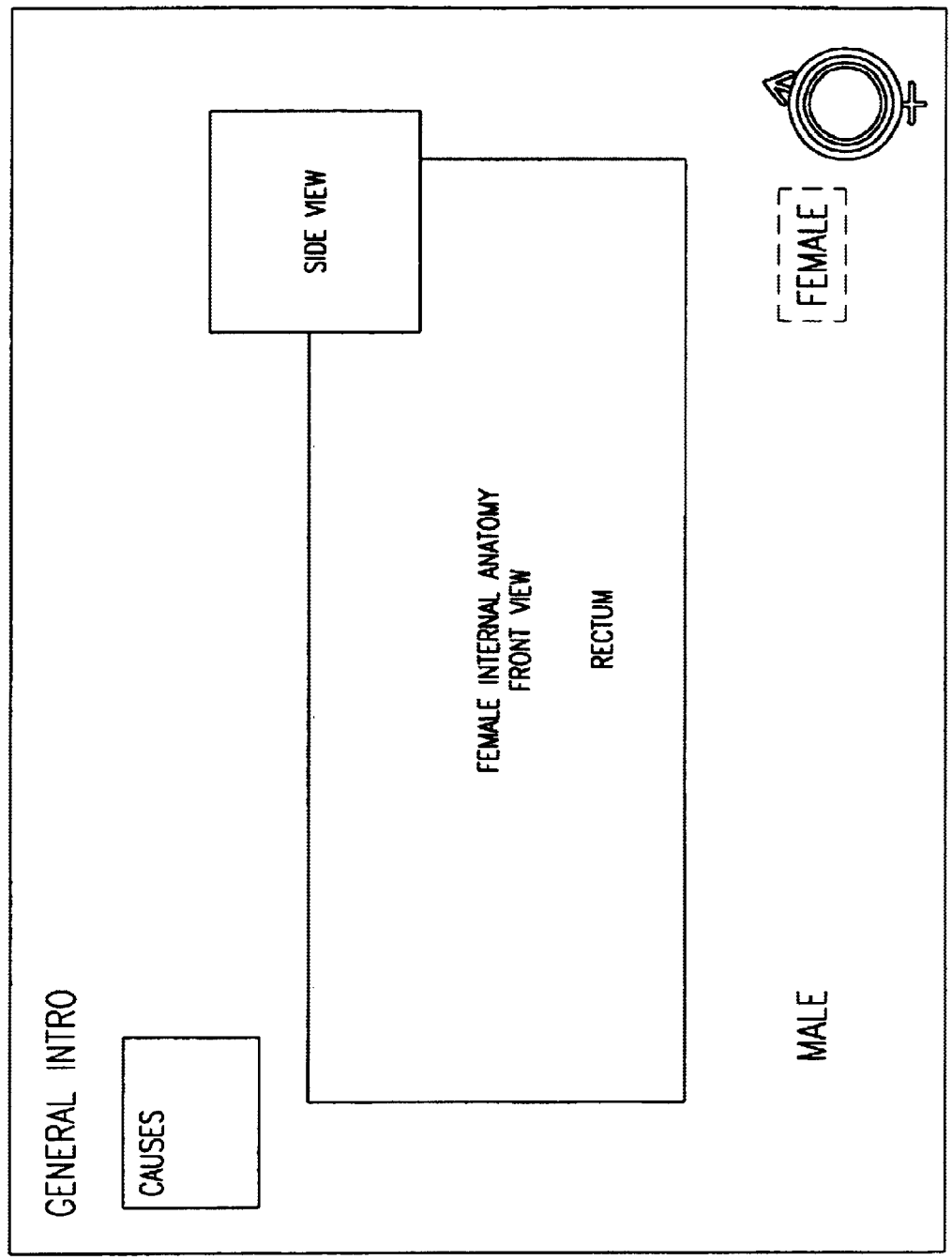
Figure 5X:
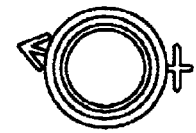
Figure 5Y:
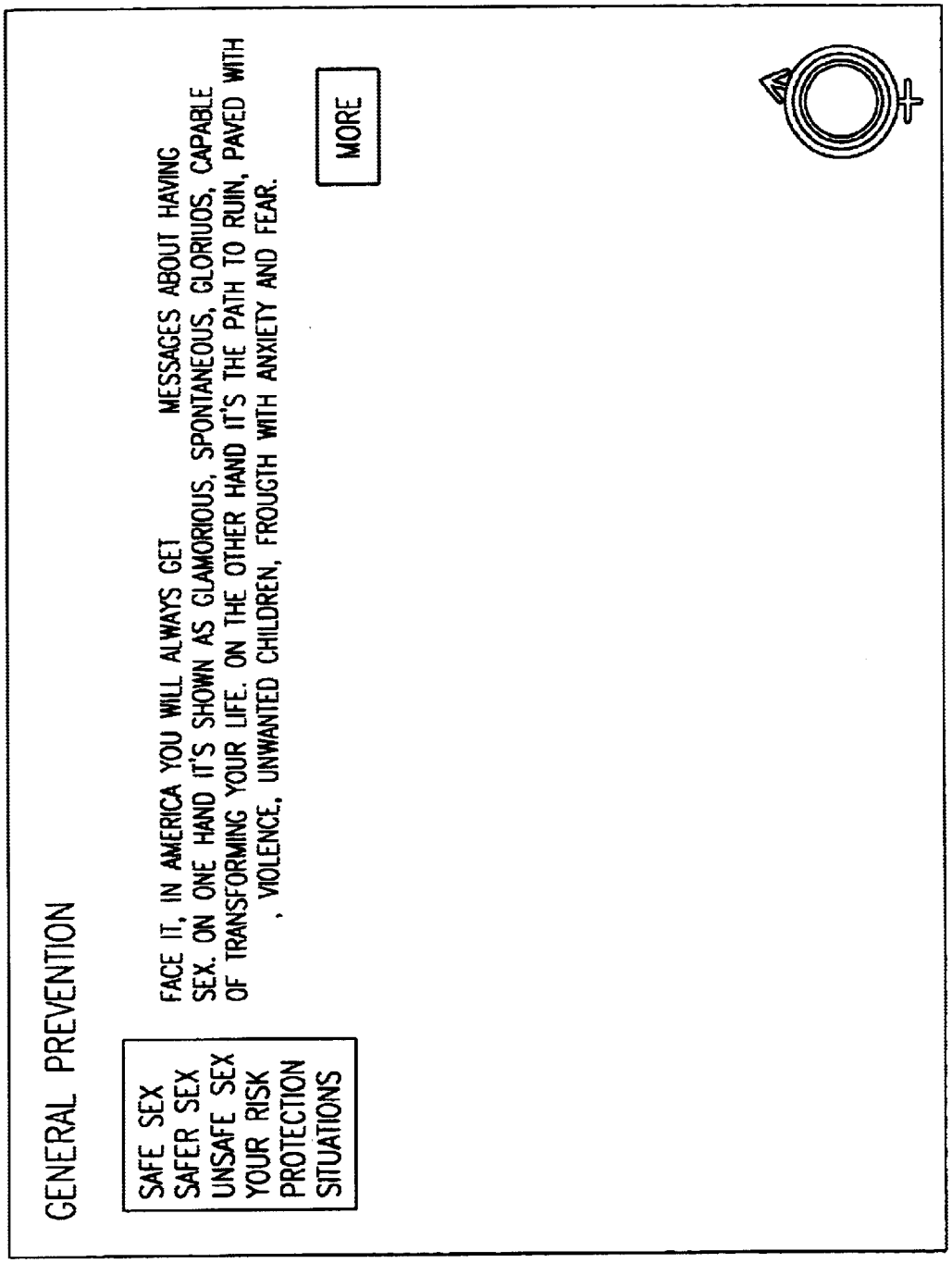
Figure 5Z:
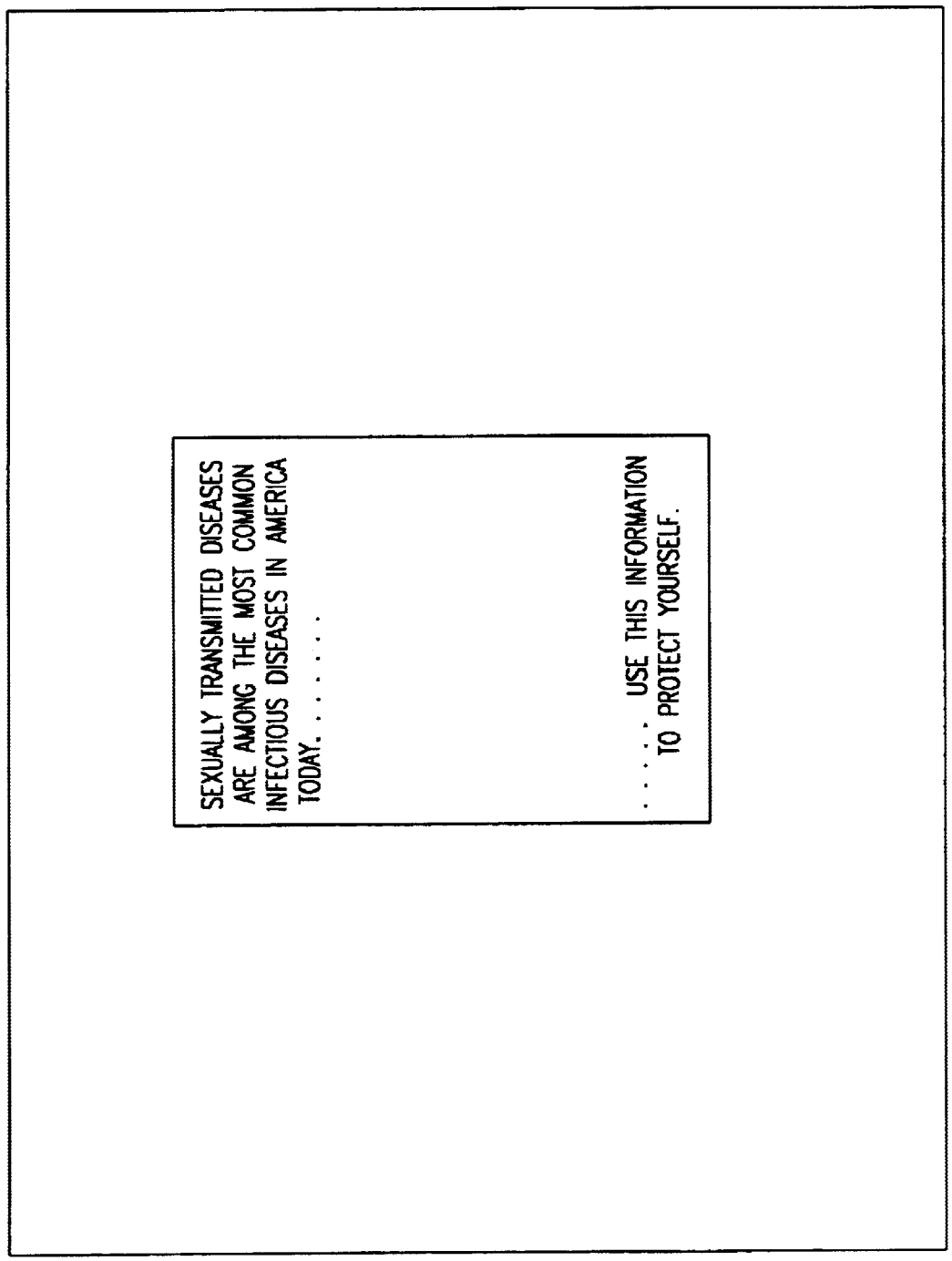
Figure 5A:
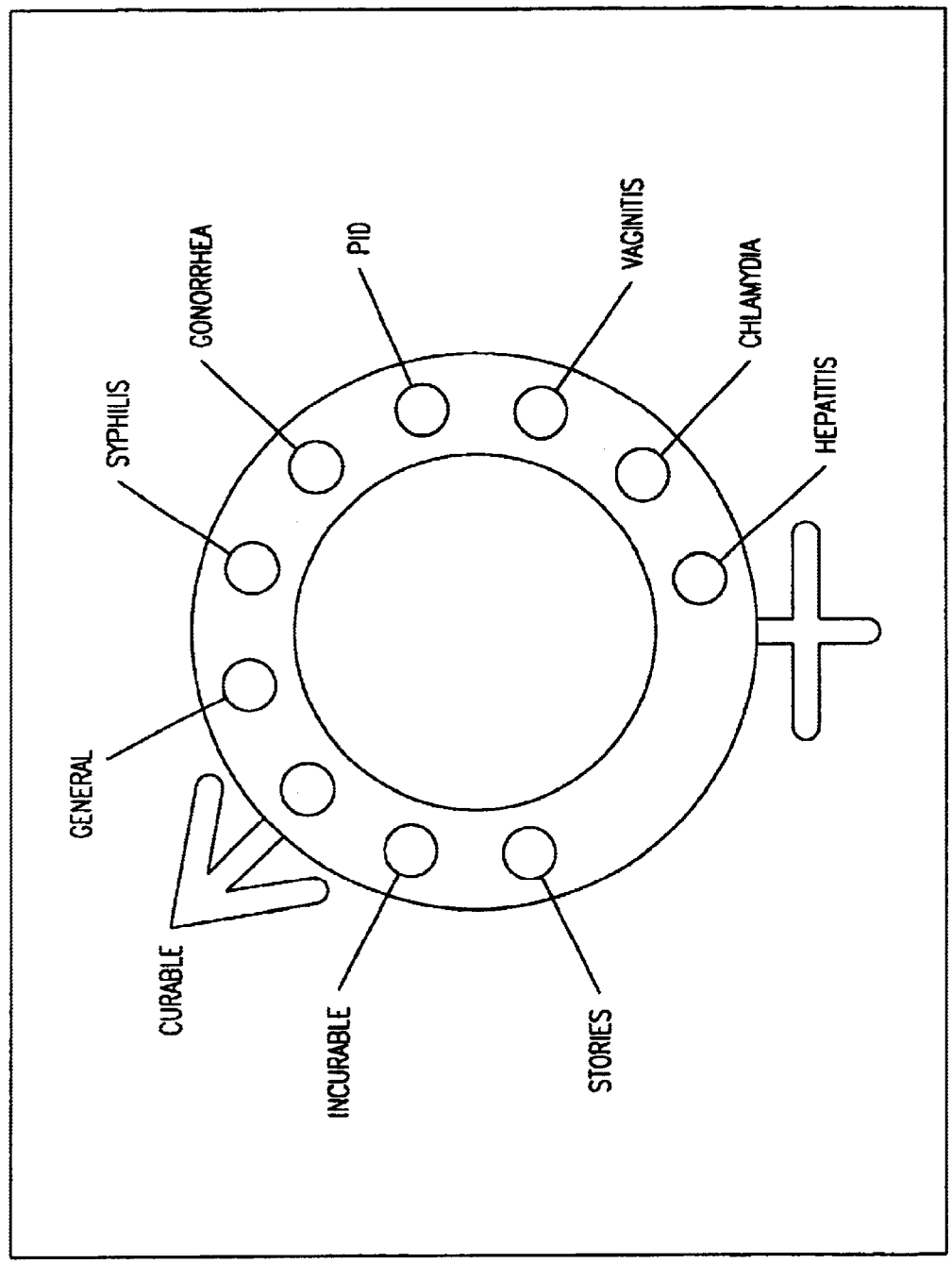
Figure 5B:
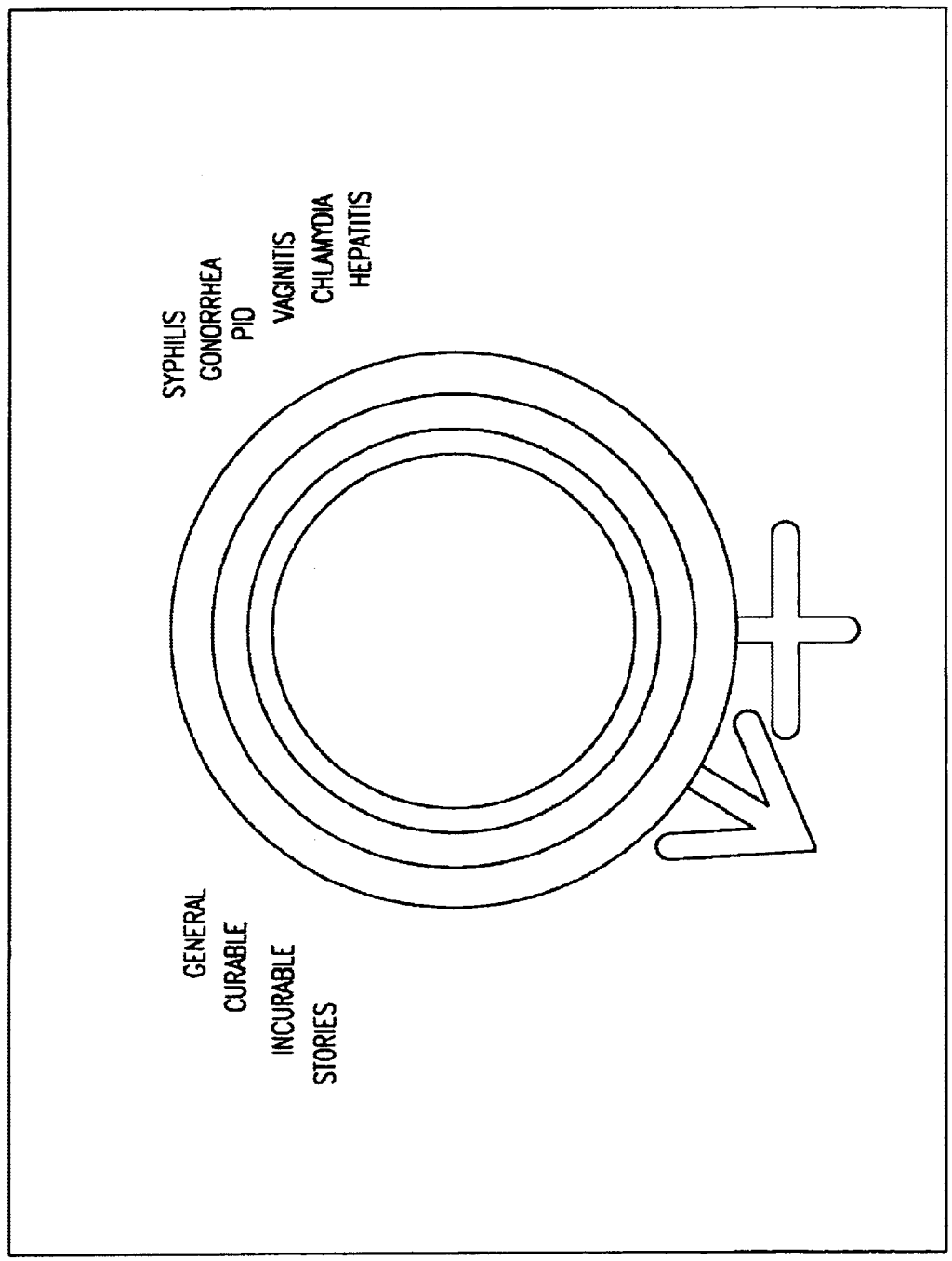
Figure 5C:
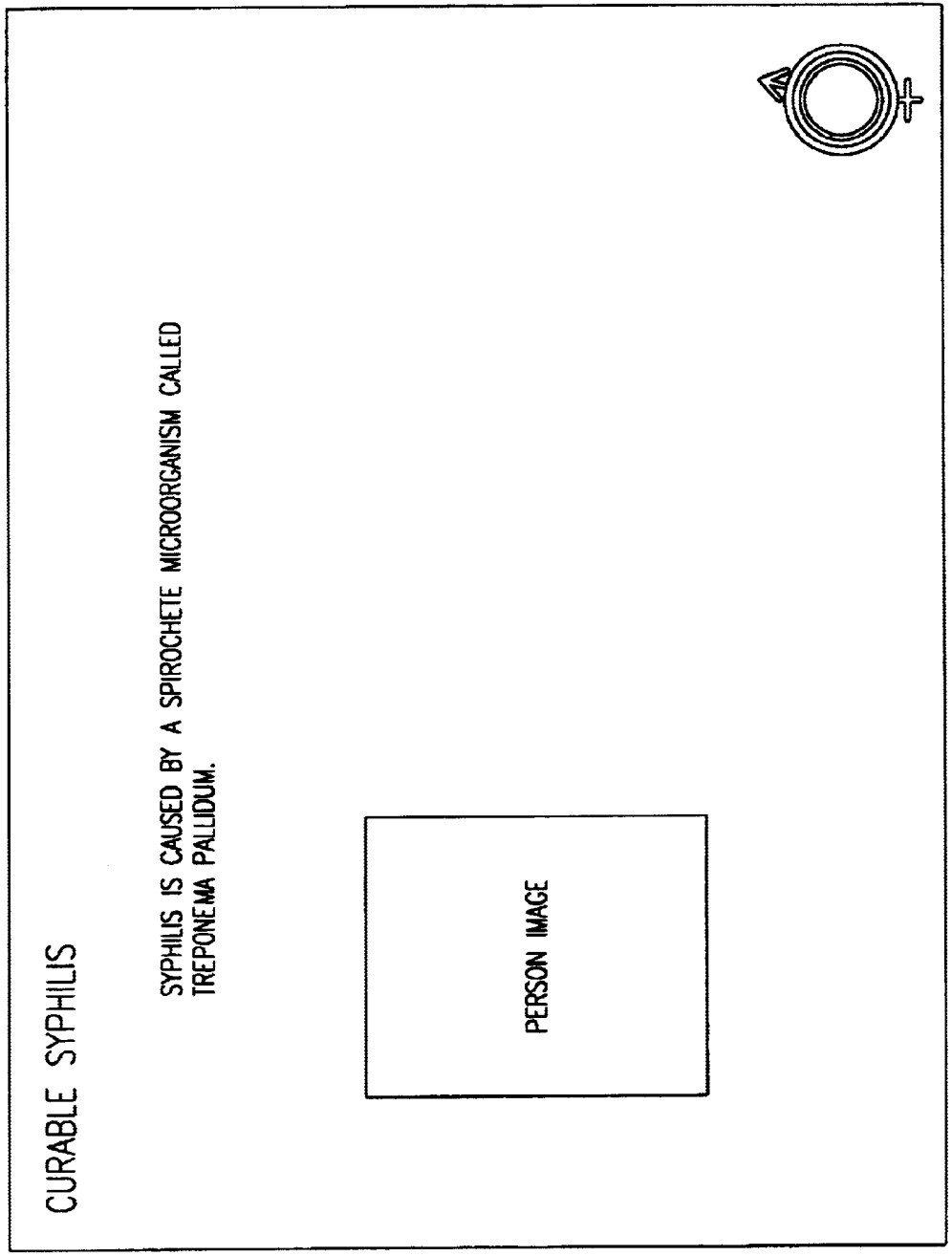
Figure 5D:
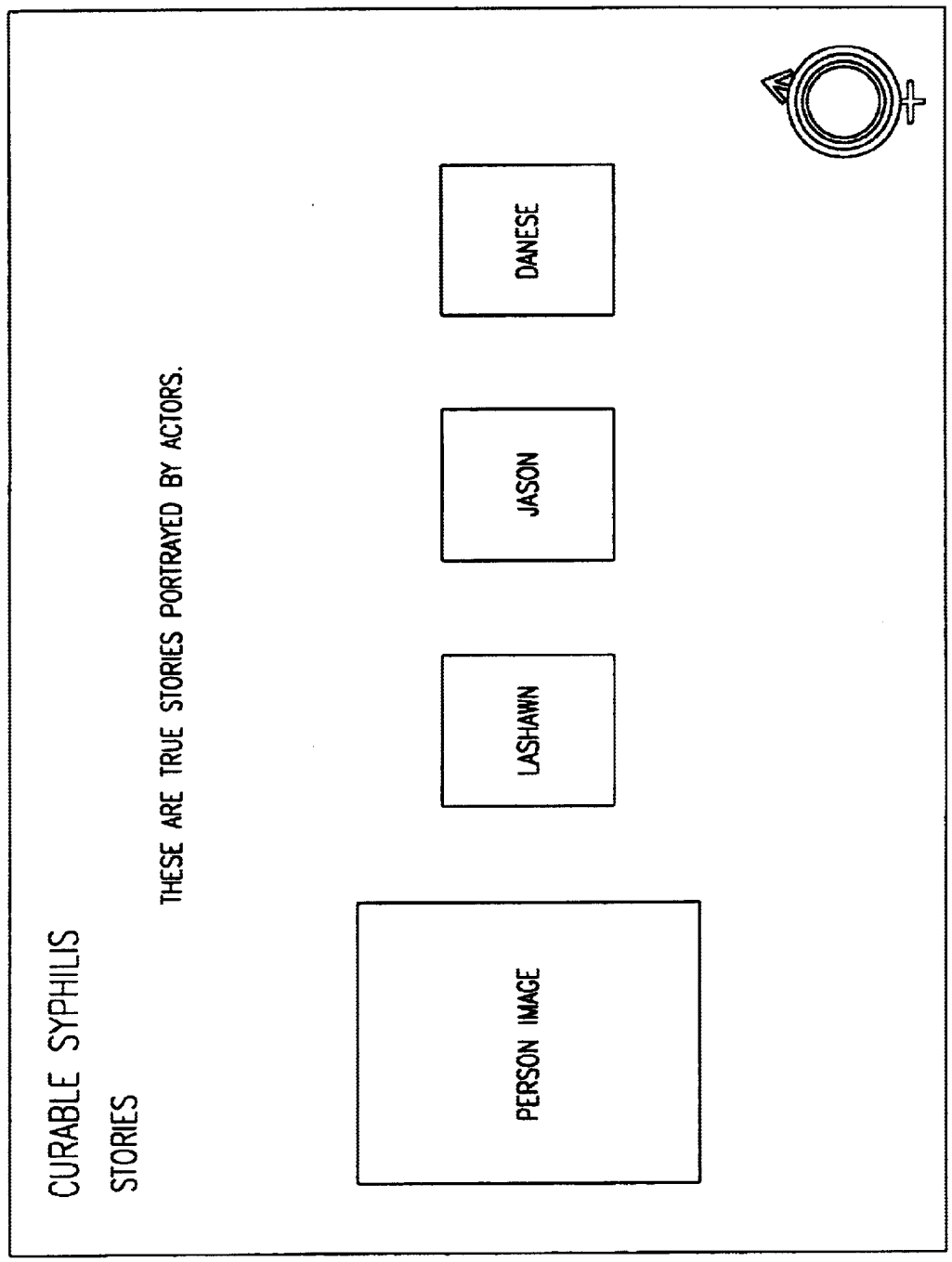
Figure 5E:
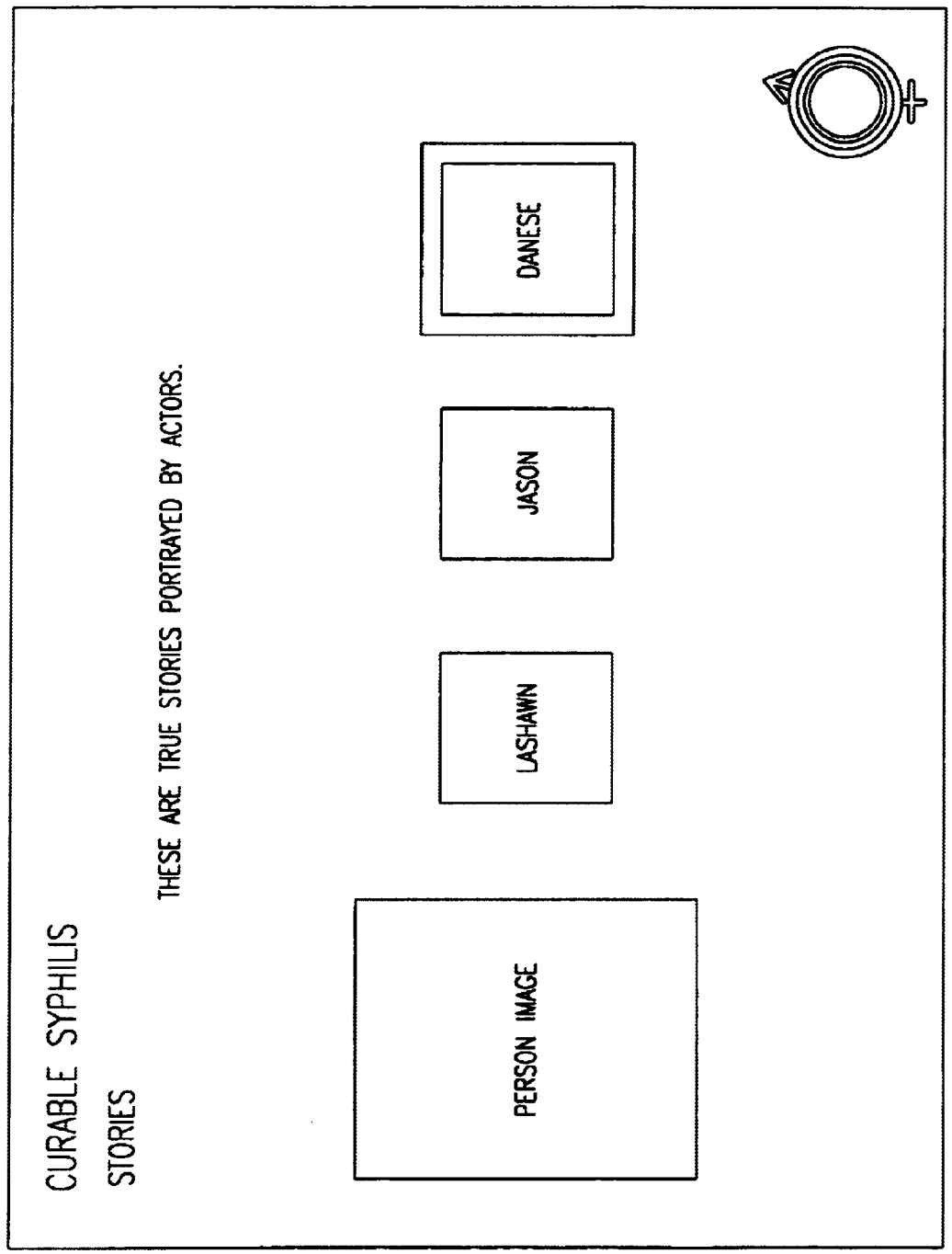
Figure 5F:
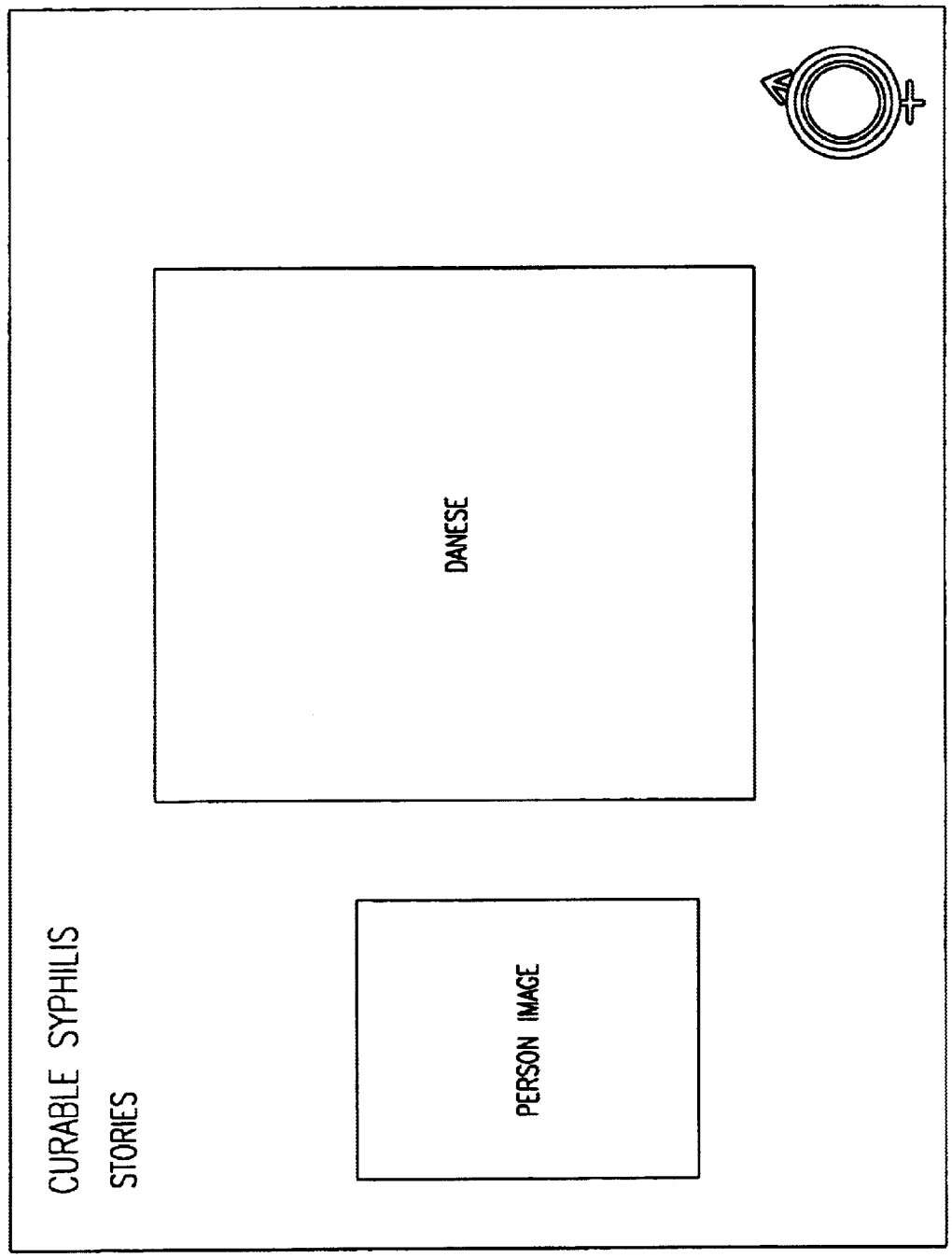
Figure 5G:
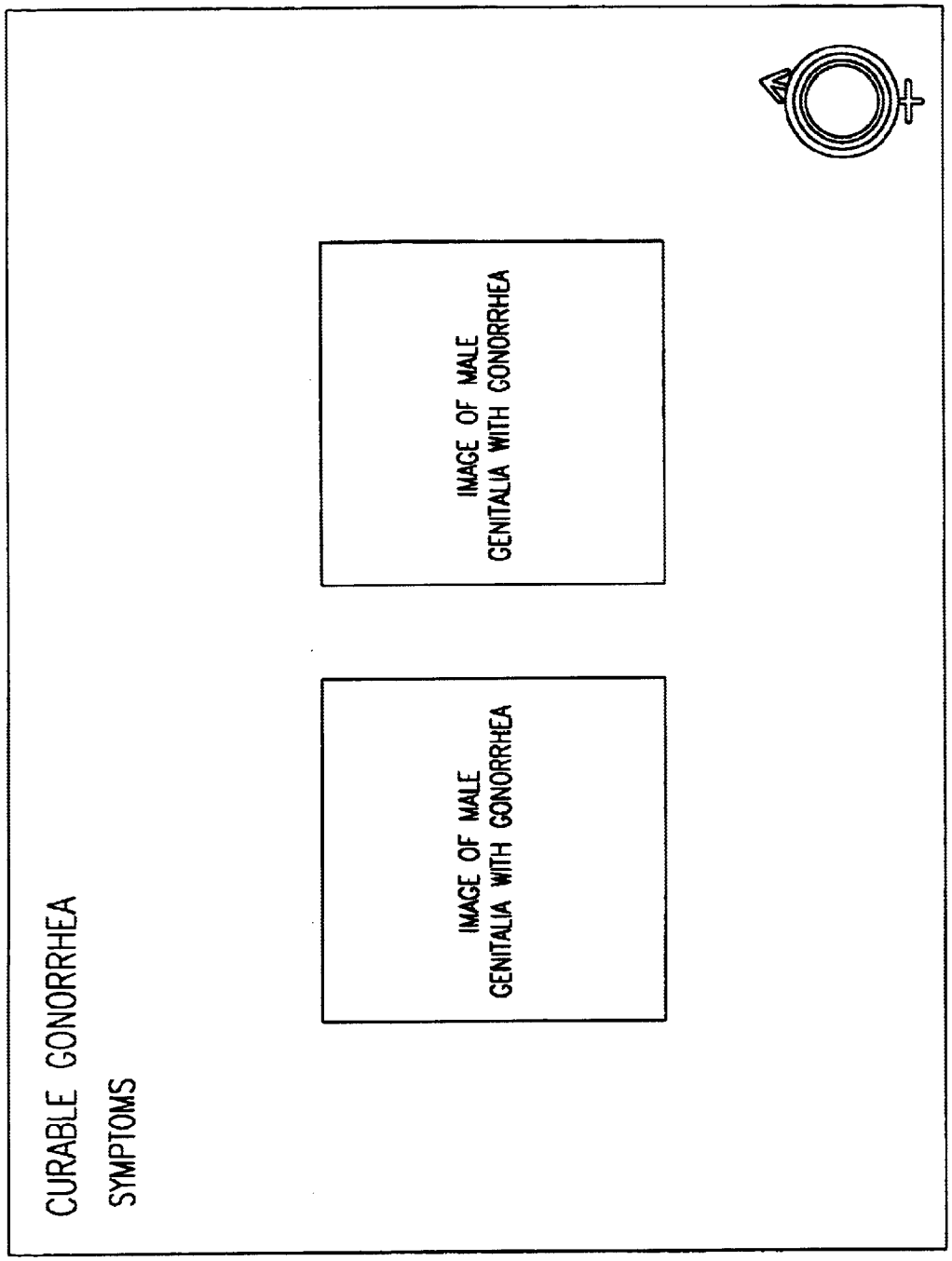
Figure 5H:
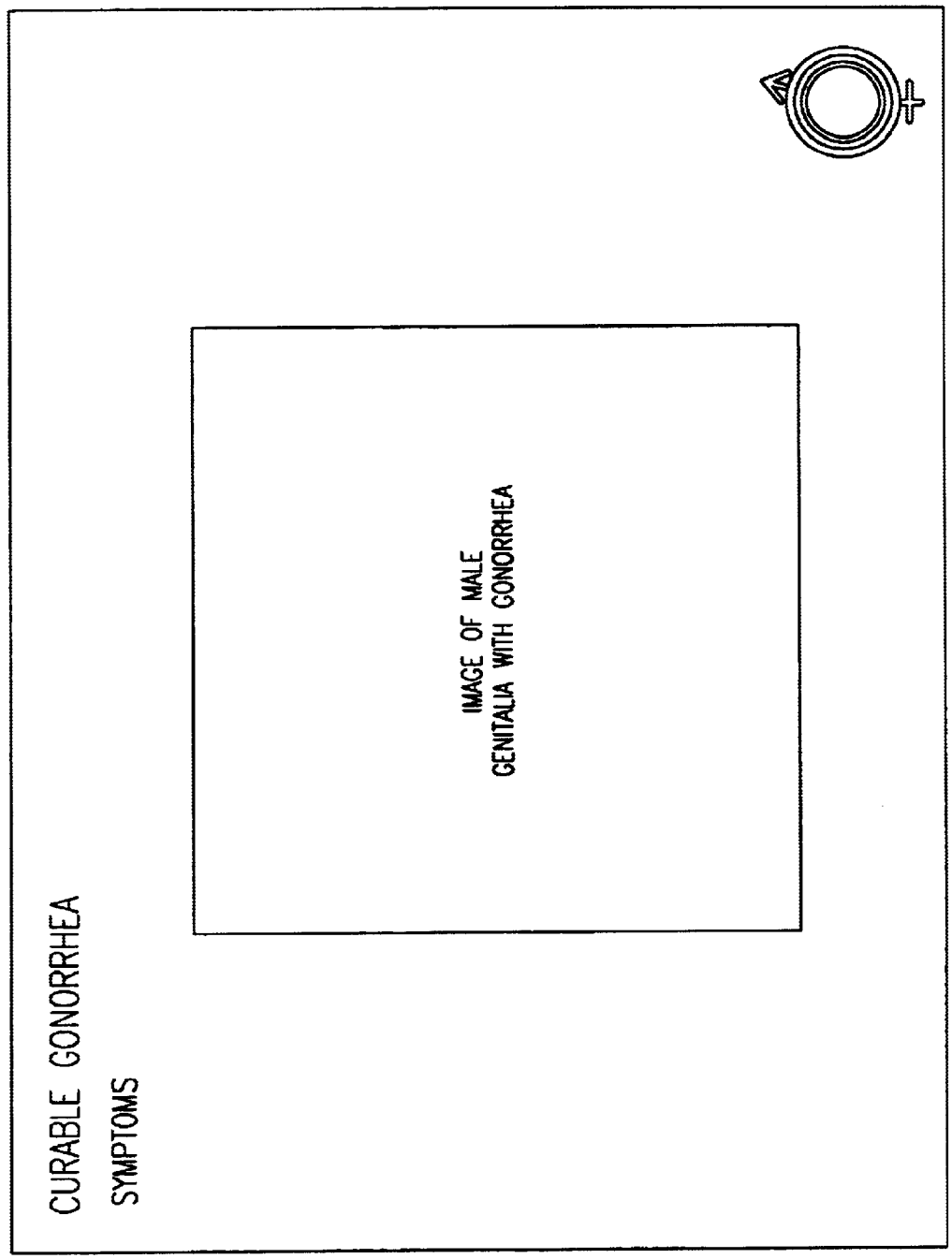

Sequence shows transition to a disease. The series of screenshots in FIGS. 5V through 5X show what clicking on the all-gender icon does. As it animates back to the middle of the screen it rotates to the previous selection or choice, in this case curable. The diseases under curable appear on the right side of the device as shown in FIG. 5Y. Screenshot FIGS. 5Z and 5AA illustrates the migration of text heads to upper left and the appearance of the main disease subject screen when one of the listed diseases is selected, in this case syphilis.

Video Selection Sequence

Video Selection from Stories Submenu

How to view stories and Stories interface. Clicking the red spot calls the full menu. A choice to view the videos is made and the videos associated with this disease appear as shown in FIG. 5BB. Screenshot FIG. 5CC shows the highlighted rollover state. FIG. 5DD illustrates the enlargement of the selected video which has the capability of changing the sound level. Clicking the sprocket holes will close the video window back to the stories screen.

Showing a Still Image

Clicking hot text calls a disease image. As shown in screenshot FIG. 5EE disease images are one of several media types called by clicking hot text. In this case the sequence shows the two images called, the highlighted or rollover state of the image enlarges the image as shown in FIG. 5FF. Notice the blurring of the background and the navigational idiom of clicking anywhere to close the window.

The above description is presented by way of example of the various embodiments of the software operating on the systems of the present invention. The same is not intended to limit the invention. One of ordinary skill in the art will further understand the additional presentation formats and sequences that are afforded by the present invention. The section on STD's is self navigational in contrast to the lessons presented in the reading section. In one embodiment, filters can be used to appropriately organized the subject matter present to the students.

Delivery Systems

As explained above in connection with FIGS. 1–3, the methodology described herein is adapted for delivery via the Internet to the student's desktop. By using the Internet, schools can take advantage of their significant investment in computers, Internet, and Intranet. The students can access the program in their computer labs, in their classrooms, as well as public libraries and at their homes.

The Internet allows delivery of the programs from a host for use either on a PC or a Mac. Using the Internet reduces the need to develop an exclusive hardware support organization. The host wants to avoid the need to be involved in the support of the user's hardware and software. When the user contacts the host website, it generally means that their systems are capable of accepting the programs.

Customer orders are entered through the host website. The teacher will enroll their students by going to the website and entering a student's name and a student identifier such as their birth date. The student will then go to the website and select the lesson that they have been enrolled in.

In some cases, such as when multiple students from one school are accessing a single program during the same school period, the Internet traffic becomes overly heavy. This slows the information flow to the student. The Internet industry refers to this as a bandwidth issue meaning too much information is being packed into too small of a pipeline. In order to insure maximum responsiveness to the student's desktop and to avoid this bandwidth issue, the host store the programs on a server that is at the school's location and connected to the school's Intranet.

One way to transmit the programs to the school's server is via satellite. The host download the programs to the server. The student still accesses the programs through the host website and the host server sends instructions to the server at the school site.

The host database allows the student access to the lesson they have been enrolled in by the teacher and then will monitor their progress. The host server bookmarks their progress for re-entry in the program and sends regular status reports to the teacher and/or administrator at the school. By using the Internet and the host database, the amount of administration and management that the teachers are required to do is significantly reduced.

The information gathered in the database is very valuable. With every student that uses the programs, more data about their capabilities and competencies will be gathered. The host will be able to compare the information gathered about each student with a history of similar children across the country. The host will be able to predict student's performance in the future by using the comparative history they have been accumulating.

What is claimed is:

1. A computerized method for providing interactive multimedia reading instruction, the computerized method comprising:

providing a set of global knowledge/vocabulary words together with a high interest expository text and graphics;

providing a contextual definition for at least one of the global knowledge/vocabulary words;

providing an additional set of vocabulary words presented as a pair of synonyms for a new stimulus word;

causing a student to select an appropriate synonym to replace the stimulus word based on another high interest expository text; and providing a game scenario including a multisensory scenario, in which the student must select an appropriate synonym or a pair of synonyms from a number of synonyms to complete a task or solve a problem to complete a game, said multisensory scenario including a video output and an audio output.

2. The method of claim 1, wherein providing an additional set of vocabulary words presented as a pair of synonyms for a new stimulus word includes providing an additional set of vocabulary words which may or may not share elements.

3. The method of claim 2, wherein providing an additional set of vocabulary words presented as a pair of synonyms for a new stimulus word includes using a new stimulus word which may or may not be drawn from the set of global knowledge/vocabulary words.

4. The method of claim 1, wherein providing an additional set of vocabulary words presented as a pair of synonyms for a new stimulus word includes presenting the pair of synonyms such that one of the pair of synonyms shares a contextual definition with the new stimulus word.

5. The method of claim 1, wherein causing a student to select an appropriate synonym to replace the stimulus word based on another high interest expository text includes presenting another high interest expository text which maintains a contextually defined theme.

6. The method of claim 1, wherein the method further includes:

presenting a number of passages using the high interest expository text and graphics for a dynamic presentation in order to encourage reading; and providing a reading comprehension question after one or more of the passages in order to confirm reading comprehension.

7. The method of claim 1, wherein the method further includes causing a student to type out words from the set of global knowledge words in order to engage participation by the student.

8. The method of claim 1, wherein providing a set of global knowledge words includes providing a set of global knowledge words taken from a text which has been normed for a particular educational level.

9. The method of claim 1, wherein the method further includes providing a series of levels, wherein each level contains a number of lessons each lesson having a set of vocabulary words, and wherein the set of vocabulary words increases in difficulty with each level.

10. The method of claim 9, wherein providing a series of levels includes providing a series of levels which have been normed at increasing educational level increments.

11. A computerized method for providing interactive multimedia reading instruction lesson, comprising:
providing a set of global knowledge/vocabulary words together with a high interest expository text and graphics, wherein the global knowledge words are intrinsic to the high interest expository text;
providing a contextual definition for at least one of the global knowledge/vocabulary words;
providing an additional set of vocabulary words presented as a pair of synonyms for a new stimulus word;
causing a student to manually enter an appropriate synonym to replace the stimulus word based on another high interest expository text; and
providing a game scenario including a multisensory scenario, in which the student must select an appropriate synonym or a pair of synonyms from a number of synonyms to complete a task or solve a problem to complete a game, said multisensory scenario including a video output and an audio output; and
tracking an elapsed time for a completion of each lesson.

12. The method of claim 11, wherein providing a set of global knowledge words includes providing the set of global knowledge words together with a voice over.

13. The method of claim 12, wherein providing the set of global knowledge words together with a voice over includes simultaneously presenting a global knowledge word with the voice over.

14. The method of claim 11, wherein providing a contextual definition for at least one of the global knowledge/vocabulary words includes providing the contextual definition together with a synchronous voice over.

15. The method of claim 11, wherein providing an additional set of vocabulary words presented as a pair of synonyms for a new stimulus word includes providing the additional set of vocabulary words presented as a pair of synonyms together with a synchronous voice over.

16. The method of claim 11, wherein the method further includes facilitating a log out function for the student, and wherein the method proceeds in a linear fashion such that the student must return to a location in the lesson at which the student logged out.

17. The method of claim 11, wherein providing a game scenario including a multisensory scenario, in which the student must select an appropriate synonym or a pair of synonyms from a number of synonyms to complete a task or solve a problem to complete a game includes an animated graphics scenario having alternate graphics for a correct and an incorrectly selected synonym.

18. The method of claim 17, wherein providing a game scenario includes providing a number of different game manipulations and engagement activities which are intrinsic to a subject matter of the high interest expository text.

19. A computerized method for providing multimedia reading instruction lesson, comprising:
providing a set of global knowledge/vocabulary words together with a high interest expository text and graphics, wherein the global knowledge words are intrinsic to the high interest expository text;
providing a contextual definition for at least one of the global knowledge/vocabulary words;
providing an additional set of vocabulary words presented as a pair of synonyms for a new stimulus word;
causing a student to manually enter an appropriate synonym to replace the stimulus word based on another high interest expository text; and
providing a game scenario including a multisensory scenario, in which the student must select an appropriate synonym or a pair of synonyms from a number of synonyms to complete a task or solve a problem to complete a game, said multisensory scenario including a video output and an auditory output; and
presenting a number of reading passages using the high interest expository text and graphics for a dynamic presentation in order to evaluate reading comprehension.

20. The method of claim 19, wherein presenting a number of reading passages using the high interest expository text and graphics for a dynamic presentation includes individually presenting lines of each passage, and wherein the audio output comprises a voice over presented with the lines of each passage.

21. The method of claim 20, wherein presenting a number of passages using the high interest expository text and graphics for a dynamic presentation further includes removing each passage after it is provided and redisplaying the passage by individually presenting lines of the passage without the voice over.

22. The method of claim 20, wherein causing a student to type out one or more words or phrases drawing upon the set of global knowledge words includes providing feedback to the student for an incorrectly typed word or phrase.

23. The method of claim 21, wherein the method further includes providing one or more reading comprehension questions after one or more of the passages, and providing the reading comprehension question together with a synchronous voice over.

24. The method of claim 23, wherein the method further includes providing a series of progressive levels, and wherein providing one or more reading comprehension questions after one or more of the passages includes providing questions which change in character to increase in difficulty with each progressive level.

25. The method of claim 24, wherein the providing a reading comprehension question after one or more of the passages includes providing a feedback to the student for a correct and an incorrect response.

26. The method of claim 19, wherein the method further includes providing a series of progressive levels, and wherein presenting a number of reading passages using the high interest expository text includes a voice over and an increasing time interval to a presentation of a reading passage with each progressive level.

27. The method of claim 19, wherein the method further includes causing a student to type out one or more words or phrases drawing upon the set of global knowledge words.

28. The method of claim 19, wherein causing a student to select an appropriate synonym to replace the defined global knowledge word based on another high interest expository text includes providing feedback to the student for an incorrectly selected synonym.

29. A system for providing multimedia education, comprising:
a host server having a processor;
a communication link adapted to connect the host server to a remote computer, and
software means operable on the host server and the remote computer for:
providing a set of global knowledge/vocabulary words together with a high interest expository text and graphics;

providing a contextual definition for at least one of the global knowledge/vocabulary words;

providing an additional set of vocabulary words presented as a pair of synonyms for a new stimulus word;

causing a student to select an appropriate synonym to replace the stimulus word based on another high interest expository text; and providing a game scenario including a multisensory scenario, in which the student must select an appropriate synonym or a pair of synonyms from a number of synonyms to complete a task or solve a problem to complete a game, said multisensory scenario including a video output and an audio output.

30. The system of claim 29, wherein the software means is further operable for:

presenting a number of passages using the high interest expository text and graphics for a dynamic presentation in order to encourage reading; and providing a reading comprehension question after one or more of the passages in order to confirm reading comprehension.

31. The system of claim 29, wherein the software means is further operable for instructing a student to type out words from the set of global knowledge/vocabulary words in order to engage participation by the student.

32. The system of claim 29, wherein providing a set of global knowledge/vocabulary words together with a high interest expository text and graphics includes providing a set of global knowledge/vocabulary words which have been normed for a particular educational level.

33. The system of claim 29, wherein the software means is further operable for providing a series of levels, wherein each level contains a number of lessons each lesson having a set of global knowledge/vocabulary words, and wherein the set of global knowledge/vocabulary words increases in difficulty with each level.

34. The system of claim 29, wherein the software means is further operable for:

providing a self guided instructional lesson covering a number of diseases and related health issues including defined terms and factual data; and providing a number of personalized testimonials for one or more of the number of health issues using a number of role models relevant to a student developmental level.

35. A system for providing interactive multimedia education, comprising:

a host server having a processor;

a communication link adapted to connect the host server to a remote computer; and software means operable on the host server and the remote computer for:

providing a self guided instructional lesson covering a number of diseases and related health issues including defined terms and factual data;

wherein providing a self guided instructional lesson includes providing a self guided instructional lesson which is targeted to developing a student's self awareness and interest by providing a number of relevant decision making issues and a number of potential consequences; and providing a number of personalized testimonials for one or more of the number of health issues using a number of role models relevant to a student developmental level; and wherein the software means is further operable for:

providing a set of global knowledge/vocabulary words together with a high interest expository text and graphics;

providing a contextual definition for at least one of the global knowledge/vocabulary words;

providing an additional set of vocabulary words presented as a pair of synonyms for a new stimulus word;

causing a student to select an appropriate synonym to replace the stimulus word based on another high interest expository text; and providing a game scenario including a multisensory scenario, in which the student must select an appropriate synonym or a pair of synonyms from a number of synonyms to complete a task or solve a problem to complete a game, said multisensory scenario including a video output and an audio output.

36. A method of providing interactive multimedia education, comprising:

maintaining identification data for a remote student on a host server;

maintaining historical data for the student on the host server;

delivering a multimedia learning module to the remote student from the host server, said delivering including:

providing a set of global words together with a high interest expository text and graphics, providing a contextual definition for at least one of the global words, providing an additional set of vocabulary words presented as a pair of synonyms for a new stimulus word, causing a student to select an appropriate synonym to replace the stimulus word based on another high interest expository text, and providing a game scenario including a multisensory scenario, in which the student must select an appropriate synonym or a pair of synonyms from a number of synonyms to complete a task or solve a problem to complete a game; and wherein maintaining historical data includes maintaining historical data based on a student's progress and competency in the multimedia learning module.

37. The method of claim 36, delivering a multimedia learning module further comprises delivering a multimedia learning module via a communication link selected from the group consisting of an Internet link and a satellite link.

38. The method of claim 36, wherein delivering a multimedia learning module further comprises storing at least a portion of the learning module on a local server.

39. A system for providing multimedia education, comprising:

a host server having a processor;

a communication link adapted to connect the host server to a remote computer; and a machine-readable medium having instructions stored thereon capable of causing the processor to:

deliver a learning module to a remote student, maintain identification data for the remote student, maintain historical data for the remote student, wherein the historical data includes tracking historical reading instruction, provide a set of global words together with a high interest expository text and graphics, provide a contextual definition for at least one of the global words, provide an additional set of vocabulary words presented as a pair of synonyms for a new stimulus word, cause a student to select an appropriate synonym to replace the stimulus word based on another high interest expository text, and provide a game scenario including a multisensory scenario, in which the student must select an appropriate synonym or a pair of synonyms from a number of synonyms to complete a task or solve a problem to complete a game.

40. The system of claim 39, wherein the communication link is an Internet link.

41. The system of claim 39, wherein the communication link is a satellite link.

42. The system of claim 39, wherein the historical reading instruction is created from a computerized method implementing a game scenario for teaching a student.

43. The system of claim 39, wherein the historical reading instruction includes assessment of a student's reading progress and reading competency.

44. A computer-readable medium having computer executable instructions for performing a method for interactive reading instruction, the method comprising:

providing a set of global words together with a high interest expository text and graphics;

providing a contextual definition for at least one of the global words;

providing an additional set of vocabulary words presented as a pair of synonyms for a new stimulus word;

causing a student to select an appropriate synonym to replace the stimulus word based on another high interest expository text; and providing a game scenario including a multisensory scenario, in which the student must select an appropriate synonym or a pair of synonyms from a number of synonyms to complete a task or solve a problem to complete a game.

* * * * *